US006957808B2

(12) United States Patent
Varzino et al.

(10) Patent No.: US 6,957,808 B2
(45) Date of Patent: Oct. 25, 2005

(54) APPARATUS FOR SECURING A WORKPIECE

(75) Inventors: Robert E. Varzino, Batavia, IL (US); Mark R. Lytell, Glendale Heights, IL (US)

(73) Assignee: WMH Tool Group, Inc., Elgin, IL (US)

( * ) Notice: Subject to any disclaimer, the term of this patent is extended or adjusted under 35 U.S.C. 154(b) by 167 days.

(21) Appl. No.: 10/189,938

(22) Filed: Jul. 3, 2002

(65) Prior Publication Data

US 2003/0090048 A1 May 15, 2003

Related U.S. Application Data

(60) Provisional application No. 60/332,130, filed on Nov. 13, 2001.

(51) Int. Cl.[7] .................................................. B23Q 3/02

(52) U.S. Cl. ................................ 269/95; 269/3; 269/6; 269/170

(58) Field of Search ...................... 269/95, 6, 3, 44–45, 269/244, 166, 147, 171.5, 170

(56) References Cited

U.S. PATENT DOCUMENTS

| | | |
|---|---|---|
| 449,987 A | 4/1891 | Wies |
| 457,710 A | 8/1891 | Emmert |
| 693,811 A | 2/1902 | Yonge |

(Continued)

FOREIGN PATENT DOCUMENTS

| | | |
|---|---|---|
| CH | 252404 | 9/1948 |
| DE | 328149 | 10/1920 |
| DE | 332373 | 2/1921 |

(Continued)

OTHER PUBLICATIONS

Rhombus Tools Limited, United Kingdom Publication entitled *A Sliding Jaw Clamp*, Nov. 9, 1988 (2 pages).

Phil McCafferty, *One–hand clamp*, Popular Science, Aug. 1989, (at p. 79).

Wilton Corporation 2001 Catalog (21 pages).

*Primary Examiner*—Lee D. Wilson

(74) *Attorney, Agent, or Firm*—Fitch, Even, Tabin & Flannery

(57) ABSTRACT

An apparatus for securing a workpiece comprising first and second clamp members, a transportable elongate member to which the clamp members are mounted for being shifted between clamped and unclamped positions to allow a clamped workpiece to be transported, and a base having a base securing mechanism for securing the base to a work surface and an elongate member securing mechanism which allows the transportable elongate member to be connected in a fixed position relative to the base to keep the secured workpiece fixed relative to the work surface. With this configuration, the elongate member and clamp members may be used in conjunction with the base and/or removed from the base and used remotely thereto.

33 Claims, 33 Drawing Sheets

U.S. PATENT DOCUMENTS

| | | | | | |
|---|---|---|---|---|---|
| 703,376 | A | | 7/1902 | Bingham | |
| 753,837 | A | | 3/1904 | Barcus | |
| 777,611 | A | | 12/1904 | Dodge | |
| 979,305 | A | * | 12/1910 | Hunt | 269/9 |
| 1,106,096 | A | | 8/1914 | Hunt | |
| 1,335,721 | A | | 4/1920 | Bergstrom | |
| 1,497,107 | A | | 6/1924 | Lasell | |
| 1,739,488 | A | | 12/1929 | Thayer | |
| 1,811,518 | A | | 6/1931 | Palmer | |
| 1,890,114 | A | | 12/1932 | Fulton | |
| 2,149,541 | A | | 3/1939 | Nagle | |
| D145,641 | S | | 9/1946 | Thomson | |
| 2,430,458 | A | | 11/1947 | Farrell | |
| 2,559,925 | A | | 7/1951 | Barker | |
| 2,592,076 | A | | 4/1952 | Spinnler | |
| 2,669,958 | A | | 2/1954 | Sweeney | |
| 2,704,951 | A | | 3/1955 | Petersen | |
| 2,734,409 | A | | 2/1956 | Schum et al. | |
| 2,788,688 | A | | 4/1957 | Atkins | |
| D181,115 | S | | 10/1957 | Vogl | |
| 3,007,358 | A | | 11/1961 | Vogl et al. | |
| 3,096,975 | A | | 7/1963 | Irwin | |
| 3,193,277 | A | | 7/1965 | Nagamori | |
| 3,224,752 | A | | 12/1965 | Benbow | |
| 3,281,140 | A | | 10/1966 | Smierciak | |
| 3,307,843 | A | | 3/1967 | Torossian | |
| 3,377,061 | A | | 4/1968 | Watson | |
| 3,492,886 | A | | 2/1970 | Naureckas | |
| 3,663,005 | A | | 5/1972 | Peddinghaus | |
| 3,669,440 | A | | 6/1972 | Kartasuk et al. | |
| 3,675,916 | A | | 7/1972 | Kartasuk et al. | |
| 3,768,797 | A | | 10/1973 | Kartasuk et al. | |
| 3,883,128 | A | | 5/1975 | Breese | |
| 4,040,613 | A | | 8/1977 | Kartasuk et al. | |
| 4,042,264 | A | | 8/1977 | Shumer | |
| 4,057,239 | A | | 11/1977 | Hopf et al. | |
| 4,081,112 | A | | 3/1978 | Chang | |
| 4,185,811 | A | | 1/1980 | Long | |
| 4,220,322 | A | | 9/1980 | Hobday | |
| 4,253,648 | A | * | 3/1981 | Meeks | 269/4 |
| 4,339,113 | A | | 7/1982 | Vosper | |
| 4,436,294 | A | | 3/1984 | Irelan | |
| 4,534,547 | A | | 8/1985 | Cox | |
| 4,563,921 | A | | 1/1986 | Wallace | |
| 4,830,350 | A | | 5/1989 | Kuei | |
| 4,893,801 | A | | 1/1990 | Flinn | |
| 4,921,234 | A | | 5/1990 | Peterson | |
| 4,926,722 | A | | 5/1990 | Sorensen et al. | |
| 4,932,638 | A | | 6/1990 | Chen | |
| 4,989,847 | A | | 2/1991 | Chapman | |
| 5,005,449 | A | | 4/1991 | Sorensen et al. | |
| 5,009,134 | A | | 4/1991 | Sorensen et al. | |
| 5,022,137 | A | | 6/1991 | Sorensen et al. | |
| D320,919 | S | | 10/1991 | Sorensen | |
| 5,094,131 | A | | 3/1992 | Sorensen et al. | |
| D328,846 | S | | 8/1992 | Sorensen et al. | |
| 5,161,787 | A | | 11/1992 | Hobday | |
| D333,602 | S | | 3/1993 | Gatzemeyer et al. | |
| 5,197,360 | A | | 3/1993 | Wooster, Jr. | |
| 5,222,420 | A | | 6/1993 | Sorensen et al. | |
| 5,312,094 | A | | 5/1994 | Zera | |
| 5,348,276 | A | | 9/1994 | Blacker | |
| 5,400,844 | A | | 3/1995 | Pollock | |
| 5,421,384 | A | | 6/1995 | Nuwordu | |
| 5,454,551 | A | | 10/1995 | Hobday | |
| D366,820 | S | | 2/1996 | Wooster, Jr. et al. | |
| 5,568,916 | A | | 10/1996 | Gibbons et al. | |
| 5,593,147 | A | | 1/1997 | Read | |
| 5,692,734 | A | | 12/1997 | Aldredge, Sr. | |
| 5,775,680 | A | | 7/1998 | Sorensen et al. | |
| 5,826,310 | A | | 10/1998 | Hobday | |
| 5,830,091 | A | | 11/1998 | Romanick | |
| 5,853,168 | A | | 12/1998 | Drake | |
| D417,377 | S | | 12/1999 | Blank et al. | |
| 6,113,085 | A | | 9/2000 | Lindenthal et al. | |
| 6,135,435 | A | | 10/2000 | Schmitz | |
| 6,161,823 | A | * | 12/2000 | Bradford | 269/3 |
| 6,220,589 | B1 | | 4/2001 | Smith, III et al. | |
| 6,347,792 | B1 | | 2/2002 | O'Brien | |
| 6,412,158 | B1 | * | 7/2002 | Moore | 29/249 |
| 6,412,767 | B1 | | 7/2002 | Beckmann et al. | |
| 6,450,489 | B1 | * | 9/2002 | Wang | 269/6 |
| D471,070 | S | | 3/2003 | Howell | |
| 6,530,565 | B1 | | 3/2003 | Simpson | |
| 6,676,120 | B1 | | 1/2004 | Hallbeck et al. | |
| 2002/0043752 | A1 | * | 4/2002 | Reed et al. | 269/166 |

FOREIGN PATENT DOCUMENTS

| | | | |
|---|---|---|---|
| DE | 1 099 478 | | 2/1961 |
| DE | 332373 | | 2/1971 |
| DE | 2 149 012 | | 4/1972 |
| DE | 2 326 546 | | 12/1974 |
| DE | 24 03 830 | | 3/1975 |
| DE | 28 06 555 | | 8/1979 |
| DE | 30 49 462 | A1 | 7/1982 |
| DE | 87 03 379.8 | | 9/1987 |
| DE | 8907067 | | 10/1989 |
| EP | 0 010 260 | B1 | 4/1980 |
| GB | 344317 | | 3/1931 |
| GB | 443381 | | 2/1936 |
| GB | 637632 | | 5/1950 |
| GB | 819506 | | 9/1959 |
| GB | 888584 | | 1/1962 |
| GB | 956390 | | 4/1964 |
| GB | 973387 | | 10/1964 |
| GB | 1 371 603 | | 10/1974 |
| GB | 1 376 105 | | 12/1974 |
| GB | 1 408 886 | | 10/1975 |
| GB | 1 555 455 | | 11/1979 |
| GB | 2 063 111 | | 6/1981 |
| GB | 2 103 122 | A | 2/1983 |
| GB | 2 178 689 | A | 2/1987 |
| GB | 2 182 271 | | 5/1987 |
| GB | 2 204 260 | A | 11/1988 |
| GB | 2 204 263 | A | 11/1988 |
| GB | 2 204 264 | A | 11/1988 |
| GB | 2 214 109 | A | 8/1989 |
| GB | 2 221 634 | | 2/1990 |
| GB | 2 369 593 | A | 6/2002 |
| WO | WO 88/07434 | | 10/1988 |
| WO | WO 02/30622 | A2 | 4/2002 |
| WO | WO 02/30622 | A3 | 4/2002 |

* cited by examiner

APPARATUS FOR SECURING A WORKPIECE

CROSS REFERENCE TO RELATED APPLICATION

This application claims the benefit of U.S. Provisional Application No. 60/332,130, filed Nov. 13, 2001.

BACKGROUND OF THE INVENTION

This invention relates generally to an apparatus for securing a workpiece and more particularly to a bar clamp that has a mating base to which the bar clamp may be mounted for performing additional workpiece securing applications.

Presently, the tool industry offers a variety of tools for securing workpieces such as vises, bar clamps, C-clamps and the like. Each of these tools offer advantages over their alternatives. For example, a vise may be mounted to a work surface, such as a benchtop, in order to provide a strong and sturdy apparatus for securing a workpiece. Unfortunately, however, traditional vises are not designed to be readily transported from one place to another so that the vise may be used in locations remote from the benchtop. This may be due in part to the weight of the vise (which is often heavy), or in the alternative due to the way in which it is mounted to the benchtop (which typically requires a base of the vise to be bolted to a work surface).

Bar clamps and C-clamps serve as alternatives to the vise in applications which are remote from a benchtop and require an apparatus for securing a workpiece. An additional advantage of bar clamps is their ability to be used as both a clamp and a spreader. Applications in which bar clamps and C-clamps are, however, limited due to their inability to be used in applications which require a stationary benchtop mounted apparatus for securing a workpiece.

Thus, a need exists for an apparatus for securing a workpiece which can be used in a variety of locations, e.g., mounted to a benchtop, remote from a benchtop, etc., for a variety of different applications, such as a vise, clamp, spreader, work station, etc., and which overcomes the aforementioned limitations and further provides capabilities, features and functions, not available in current devices.

SUMMARY OF THE INVENTION

An apparatus for securing a workpiece in accordance with the invention comprises first and second clamp members, a transportable elongate member to which the clamp members are mounted for being shifted between clamped and unclamped positions to allow a clamped workpiece to be transported, and a base having a base securing mechanism for securing the base to a work surface and an elongate member securing mechanism which allows the transportable elongate member to be connected in a fixed position relative to the base to keep the secured workpiece fixed relative to the work surface. With this configuration, the elongate member and clamp members may be used in conjunction with the base and/or removed from the base and used remotely thereto.

In one embodiment of the invention, the apparatus may comprise a bar clamp having a first clamp member, a second clamp member, and a bar, wherein the clamp members are disposed about the bar and wherein the bar clamp can be configured to operate in at least one of a clamp mode and a spreader mode. The apparatus further has a base having a mating structure for mating with the bar clamp wherein one of the bar clamp and the base are removable from the other of said bar clamp and said base and wherein the bar clamp remains operable when removed from said base. In a preferred form, the clamp members have generally flat standing surfaces which allow the bar clamp to be free standing and remain operable when removed from the base. The first clamp member, second clamp member, and base may be contoured so as to rest generally flush against each other in order to provide additional support for the apparatus, and a support structure may be provided for supporting at least one of the clamp members when the bar clamp is inserted on the base so that the supported clamp member can make contact with the work surface, thereby offering additional support to the apparatus. Similar to the items discussed above, the support structure may be contoured so as to rest generally flush against at least one of the first clamp member, second clamp member, and base.

In this embodiment, the first clamp member may include a gripping portion located above the bar having a longitudinal axis generally parallel to the bar, and a trigger portion extending from the first clamp member below the bar and pivoting with respect to the first clamp member. The first clamp member has a clamp jaw located above the bar for engaging a surface of a workpiece, and a brake that limits shifting of the first clamp member along the bar in at least one direction. A user operated actuator is provided for the brake and is located above the bar proximate to the gripping portion. The user operated actuator is operable to release the brake to allow the clamp to slide along the bar.

The second clamp member has a brake that limits shifting of the second clamp member along the bar in at least one direction and a user operated actuator therefor located above the bar proximate a gripping position and operable to release the brake to allow the clamp to slide along the bar. The gripping portion and the user operated actuator of the second clamp member are configured so that the stationary clamp structure can be grasped and the user operator actuator can be simultaneously actuated so that the stationary clamp structure can be moved about the bar.

A preferred form of the base includes a generally flat support surface which allows the base to support at least a portion of a workpiece. The base may have a lower base portion for mounting the base to the work surface, and an upper base portion for connecting the base and the bar clamp. The upper base portion is preferably rotationally coupled to the lower base portion so that the upper base portion can rotate with respect to the lower base portion. The rotational coupling of the upper and lower base portions may be accomplished via an indexing mechanism which is capable of orienting the base in a plurality of different positions. With such a configuration, the base may have a rotation release mechanism for at least momentarily releasing the upper base portion from the lower base portion so the upper base portion is freely rotatable with respect to the lower base portion.

The upper base portion has a bar securing mechanism which can be shifted from a bar securing position wherein the bar is secured to the base, to a bar releasing position wherein the bar is released from the base. The bar securing mechanism is shifted about these positions by moving an actuating lever from a first position to a second position. The bar securing mechanism may also include a friction pad for frictionally engaging the bar when the actuating lever is in the second position, and a bar retention mechanism for retaining the bar and the base in engagement when the actuating lever is in the second position. The friction pad and the retention mechanism cooperate with one another in order to secure the bar to the base. The bar securing mechanism may also have a means for compensating over clamping of the bar so that the actuator may be moved all the way to its bar securing position.

The lower base portion of the apparatus includes a base securing mechanism for securing the base to a work surface so that the base is generally fixed thereto. In one form, the base securing mechanism may include a threaded screw having a work surface engaging portion for contacting a lower surface of the work surface, and a corresponding nut which is at least partially threaded. The screw is thread through the nut and can be rotated to move the work surface engaging portion into, and out of, contact with the lower surface of the work surface. With this configuration the lower base portion also includes a base securing release mechanism for releasing the threaded screw by disengaging the nut from the threaded screw so that the base securing mechanism will rapidly be returned to its non-securing position. The base securing mechanism may also have a compensating mechanism which compensates for over travel of the threaded bolt in order to prevent stripping of the bolt and/or nut.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENTS

Figure 1:
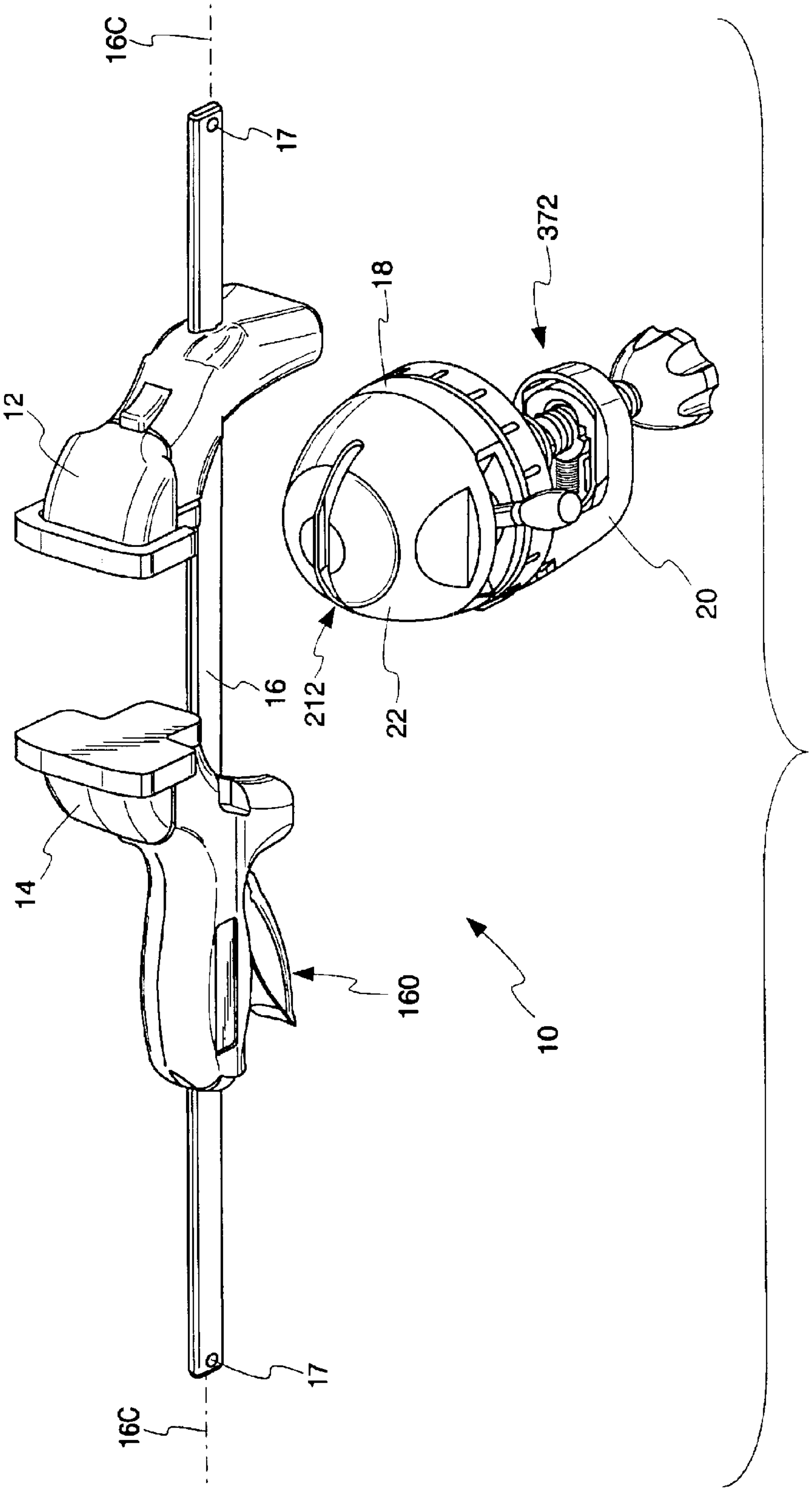
FIG. 1 is a perspective view of an apparatus for securing a workpiece in accordance with the invention showing a removable bar clamp assembly exploded from a movable base.

Referring now to the drawings, and especially FIG. 1, an apparatus for securing a workpiece is shown and is generally identified by reference numeral 10. The apparatus 10 includes a pair of clamp members 12 and 14, and a transportable elongate member, such as a bar 16, to which the clamp members 12 and 14 are adjustably mounted for being shifted between clamped and unclamped positions to secure a workpiece. As shown, clamp member 12 remains stationary on member 16 during a workpiece clamping operation while the other clamp member 14 is advanced therealong by a trigger mechanism 160 thereof to form a bar clamp portion 30 of the preferred apparatus 10 herein. The apparatus further includes a base 18 having a lower portion 20 for mounting the base 10 as by a screw clamp mechanism 372 to a support surface such as a table top, and an upper portion 22 for connecting the elongate member 16 to the base 18. In this manner the bar clamp portion 30 can be mobile when detached from the base 18, or it can be attached to the base 18 to allow the apparatus herein to function more akin to a tabletop clamp or vise. The base connecting portion 22 preferably includes a bar capturing mechanism 212 that is operable to fix the bar 16 to the base 18 at various positions along its length. This allows the bar to be mounted to the base so that various lengths of the bar 16 may extend beyond the base 18 on either side thereof to provide a user flexibility in using the apparatus 10 herein. Accordingly, if there is more room on one side of the base, the bar can be fixed thereto by the capturing mechanism 212 so that a greater amount of the bar 16 extends on this side of the base than the other. Also, a preferred form of the base 18 incorporates an indexing mechanism 362 (FIG. 16) that allows a user to select a plurality of predetermined rotary positions at which the base connecting portion 22 can be fixed to the lower mounting portion 20. This also enhances flexibility in using the apparatus so that the clamp members 12 and 14 can be disposed in the precise orientation that affords the user the greatest freedom to operate without interference from surrounding walls, tools, or other equipment that may be present near the bench top to which the lower mounting portion 20 is clamped.

Figure 2:
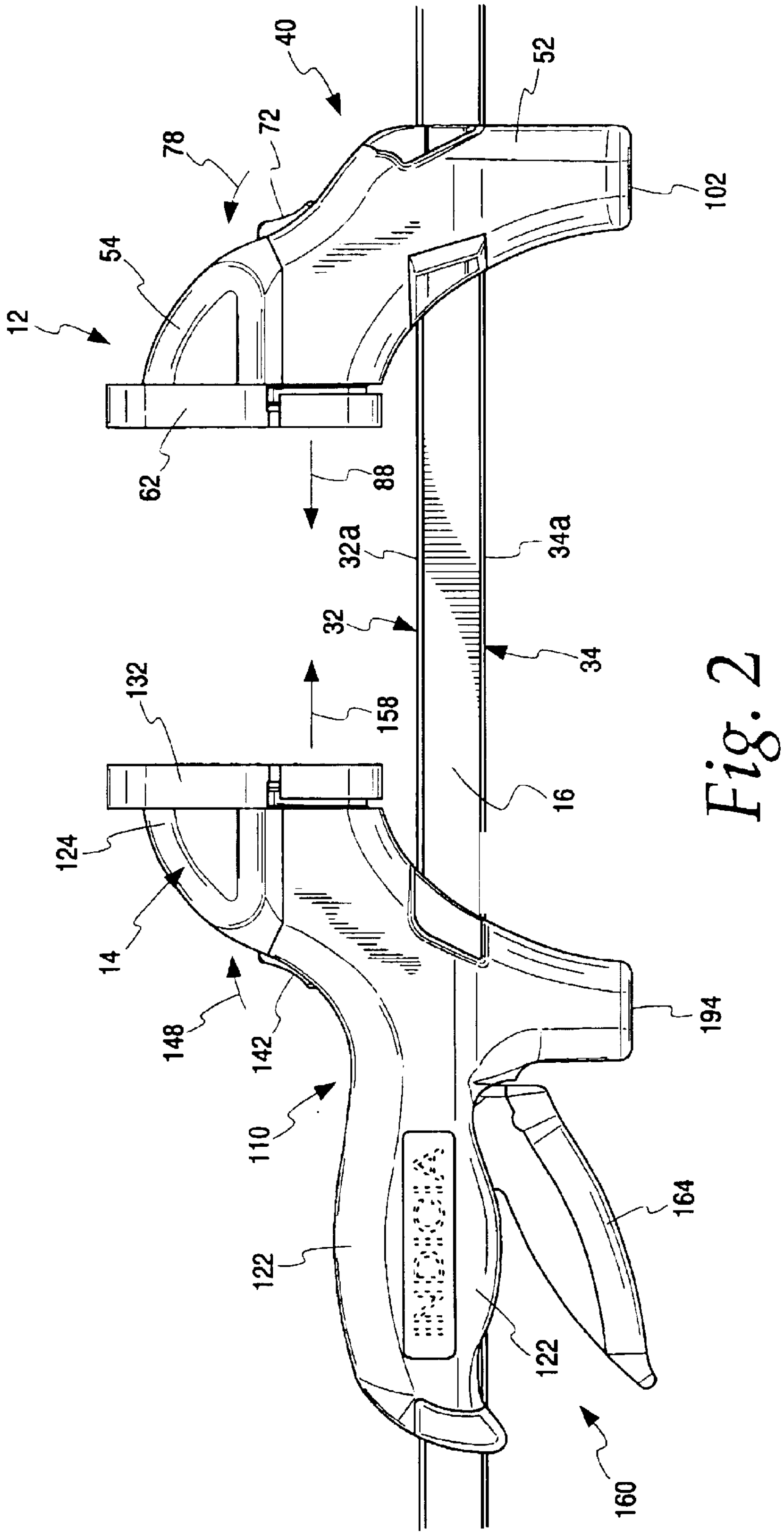
FIG. 2 is a side elevational view of a bar clamp assembly wherein the clamp structures are positioned about an elongate bar member for applying a clamping force.

Turning next to FIG. 2, it can be seen that the preferred elongate member 16 is a generally rectangular shaped bar member 16 having a width that is approximately one-fourth (¼th) its height. The length of the elongate member 16 may vary, however, in a preferred form the member 16 is of a sufficient length to allow the first and second clamp members 12 and 14 to be adjusted so that sufficient space is present for clamping of workpiece portions therebetween having a dimension of up to three feet extending along the length of the bar member 16. The top 32 and bottom 34 of the elongate member 16 can be cornered or rounded, and have substantially flat and parallel uppermost and lowermost surfaces 32*a* and 34*a* so that the flat surface 32*a* can provide additional support for workpieces being secured by the clamp members 12 and 14. In other words, a surface of the workpiece may be rested on the bar member's upper surface 32*a* as it is being clamped between the clamp members 12 and 14. The rounded ends of bar 16 allow the clamp members 12 and 14 to slide along the bar 16 more easily without hang-ups due to the absence of sharp corners between sides 16*a* and 16*b* (FIG. 8) of the bar 16 and the upper and lower surfaces 32*a* and 34*a* thereof.

The bar 16 can have a stop 17 (FIG. 1) at either end thereof (or on both ends) that cooperates with at least one of the clamp members 12 and 14 so that it cannot be slid off the end of the bar 16 at which the stop is disposed. As shown, it is clamp member 14 that abuts the stop when shifted to the end of the bar 16 at which the stop is disposed, while clamp member 12 is provided with an opening sufficient in clearance with respect to the stop to allow it to be removed from the end of the bar 16. This allows the clamp member 12 to be reoriented on the bar 16 relative to the clamp member 14 so that clamping faces of the members 12 and 14 face in opposite directions and can function as a spreader.

Figure 3:
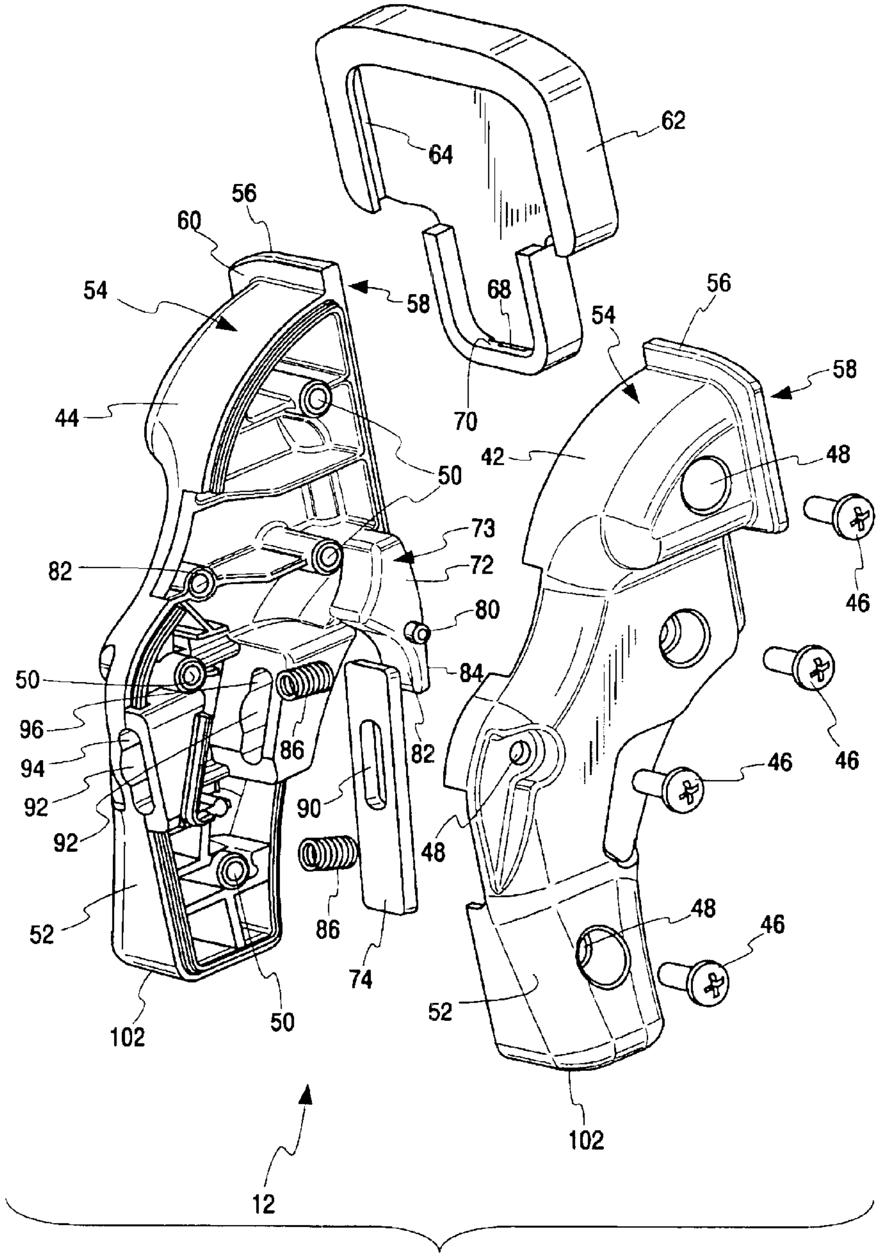
FIG. 3 is an exploded view of a first clamp structure or stationary clamp structure in accordance with the invention.

An exploded view of the first clamp member 12 is shown in FIG. 3, and together with FIG. 2 shows that the preferred first clamp member 12 has a clam shell housing 40, including a first housing portion 42 and a second housing portion 44 which are connected to one another via fasteners such as screws 46. The threaded portions of fasteners 46 pass through recessed openings 48 in the first housing portion and screw into corresponding bores 50 located on the second housing portion 44. The openings 48 are recessed so that the heads of the fasteners 46 do not protrude from the first housing portion 42. This configuration allows the first clamp member 12 to maintain a generally smooth gripping surface 52 for comfort in use of the apparatus 10.

The gripping portion 52 depends from the bar 16 and provides a "pistol grip" like gripping portion 52, and includes a jaw support 54 above the bar 16. The jaw support 54 includes a jaw plate portion 56 having a flat face 58 which is used to exert a clamping or spreading force on a workpiece. In a preferred form of apparatus 10, the jaw 56 is T-shaped and has an outer lip 60 which protrudes from the jaw support 54 so that a removable jaw pad 62 can be applied over the jaw 56. The jaw pad 62 may be made of a resilient material capable of being pressed into clamping or spreading engagement with a workpiece with minimal marking thereof, or other change thereto. In some applications a flat jaw pad 62 may be desirable for engaging the workpiece, as shown in FIG. 2. In other applications, however, the jaw pad 62 may include additional shapes or patterns for better engaging the workpiece. For example, the jaw pad 62 may include a curved surface which is capable of engaging rounded workpieces, such as tubes or pipes, better than a flat jaw pad. In other instances, the jaw pads 62 may include ribs or angled indentations which are better capable of engaging workpieces with sharp or pointy edges.

Figure 5A:
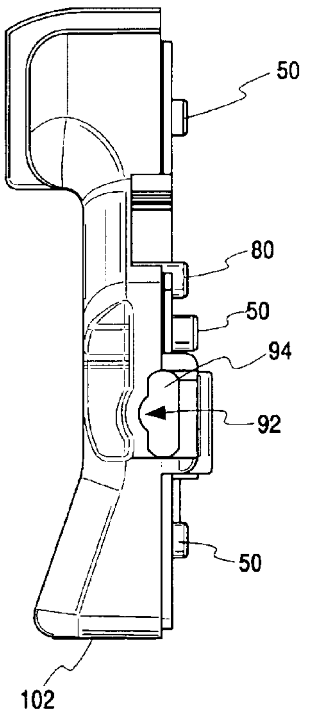
FIGS. 5A–C are side and rear elevational views and a bottom plan view of the second housing portion of the stationary clamp, respectively.
Figure 5B:
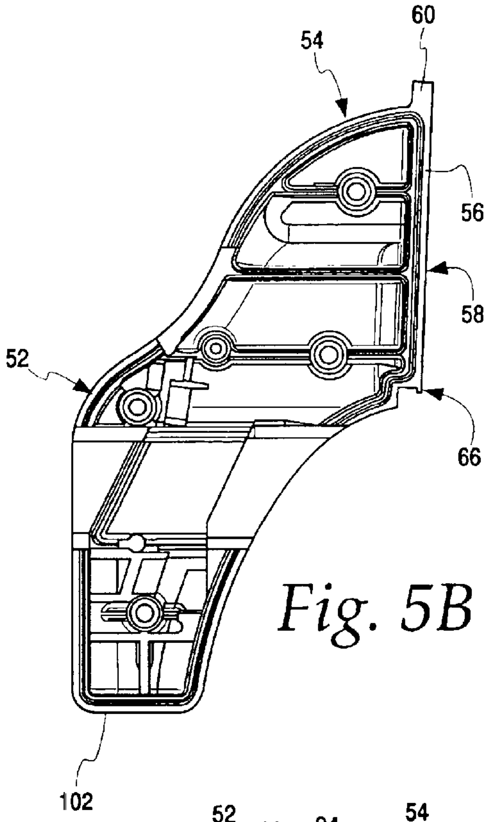
Figure 5C:
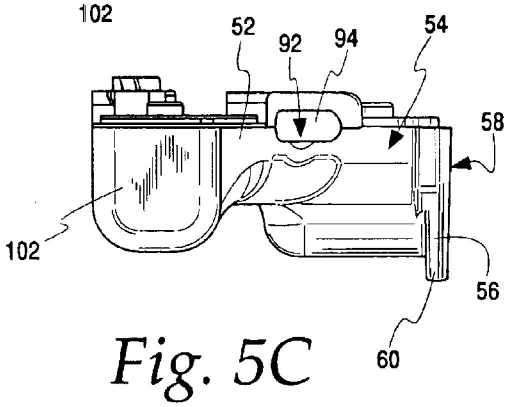

Preferably, the jaw pad 62 will correspond in shape to the jaw 56 and have a bent over or u-shaped peripheral rim portion 63 to form a channel 64 at the rear of the pad for receiving the outer lip 60 of jaw 56. The jaw pad 62 can be secured onto the jaw 56 by having a tab portion 66 (see FIGS. 5B, 6, and 7B) extending from the bottom of the jaw 56 and having a corresponding receiving slot 68 located at the bottom of the rim portion 63 of the jaw pad 62. With such a configuration, the jaw pad 62 can be attached to the jaw 56 by simply pushing the jaw pad 62 onto the jaw 56 with the pad flexing until the outer lip 60 snaps into the channel 64 and pressing the lower rim 70 of jaw pad 62 over the tab portion 66 until the tab portion 66 rests in the receiving slot 68. Conversely, the jaw pad 62 can be removed by simply pulling the lower rim 70 away from the jaw 56, thereby removing the tab portion 66 from the receiving slot 68, and sliding pad 62 up off of the outer lip 60 and jaw 56.

The first clamp member 12 preferably includes a brake release mechanism 72 for releasing a brake 74 coupled to the first clamp member 12 so that the position of the first clamp member 12 on the elongate member 16 can be adjusted. The brake release mechanism 72 includes an upper user operated portion 73 pivotally mounted to project through a slot opening in the gripping portion 52 so that an operator can conveniently actuate the mechanism 72 such as with their thumb while holding the gripping portion 52. A pressing or engagement surface 76 is contoured with a concave configuration so that pushing on the surface causes pivoting in the direction shown by arrow 78.

The brake release mechanism 72 has pivot trunnion mounts 80 extending out from opposite sides of mechanism 72 which define an axis about which the mechanism 72 is pivoted. The pivot trunnion mounts 80 extend into integral cylindrical bosses 82 of the first and second housing portions 42 and 44 of clamp member 12. A brake engagement or lever portion 84 in the housing extends below the trunnions 80 so that pushing on the engagement surface 76 pivots the portion 84 back toward the rear of the housing 40.

Figure 4:
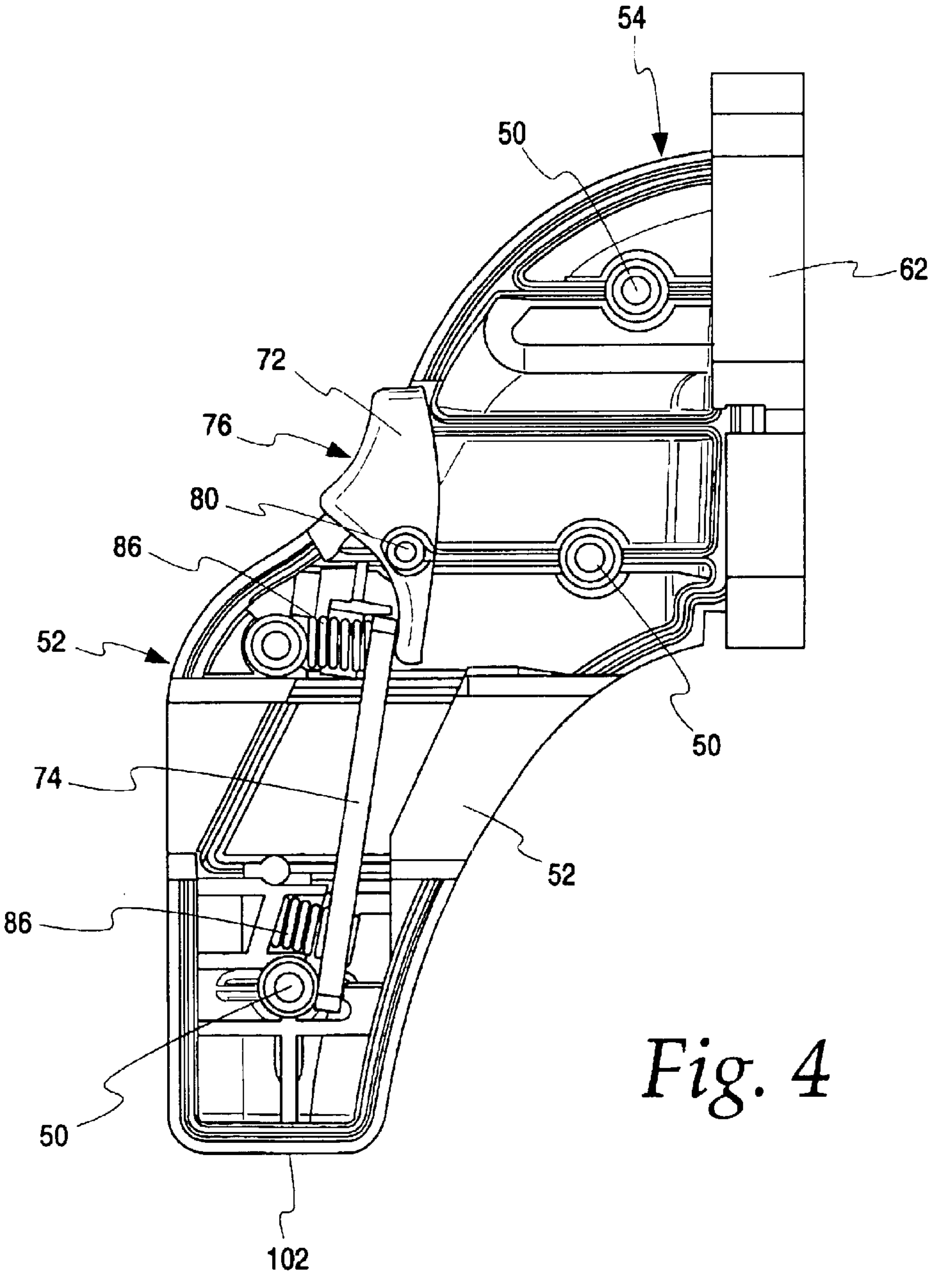
FIG. 4 is a side elevational view of the second housing portion of the stationary clamp illustrating the position of the brake release mechanism, brake and jaw pad among other items.

As can be seen in FIG. 4, the brake 74 is preferably in the form of a slotted plate having a central slot opening through which the bar extends. Normally, the plate is biased as by springs into tight engagement with the bar 16 at upper and lower edges defining the slot or opening. To this end, the slot opening is configured to be larger than the bar such that when in braking engagement therewith, the plate is extending at other than a perpendicular angle to the axis 16*c* (FIG. 1) of the bar so that the play between the larger slot opening and the bar is taken up. As shown, brake plate 74 is inclined so that the slot upper edge is closer to the jaw 56 than the lower edge. The non-perpendicular orientation is such that it only limits the clamp member 12 from moving along the bar 16 in the opposite direction in which it is inclined, (e.g., it limits movement away from the clamp head 58), and not in the other direction. In this way, the first clamp member 12 can slide along the bar in the direction shown by arrow 88 (FIG. 2), but cannot be slid along the bar in the opposite direction unless the brake release member 72 is actuated. Pressing the brake release member 72, causes brake release mechanism 72 to pivot about its pivot axis to pivot the engagement portion 84 against the top of brake plate 74. The release lever 84 tilts the brake plate 74 against its bias into a more upright position perpendicular to bar axis 16*c* so that the slot 90 now is in a clearance fit or orientation for sliding of the bar 16 therethrough. In this manner, when a user is gripping portion 52, they can simultaneously depress the actuator button portion 73 to push the clamp 12 along the bar 16 in either direction thereon.

As earlier mentioned it is preferred that the first clamp member 12 be able to be fully removed from the bar 16. The clamp member 12 includes a pair of guide block portions in the interior thereof such as formed on the interior of the housing portion. The guided blocks have through bores configured with substantially the same configuration as that of the oblong or obround bar albeit with one of the flat sides enlarged or bulged outward to accommodate passing of the stop 17 which projects from a corresponding flat side face of the bar 16. The slot opening 90 of the brake plate 74 can have a similar configuration, although enlarged portions can be provided symmetrically on both sides (FIG. 12A) for ease in assembly thereof (e.g., by making brake plate orientation irrelevant during assembly). Accordingly, the clamp member 12 is supported for sliding movement along the bar by the guide block portions through which the bar extends.

Figure 6:
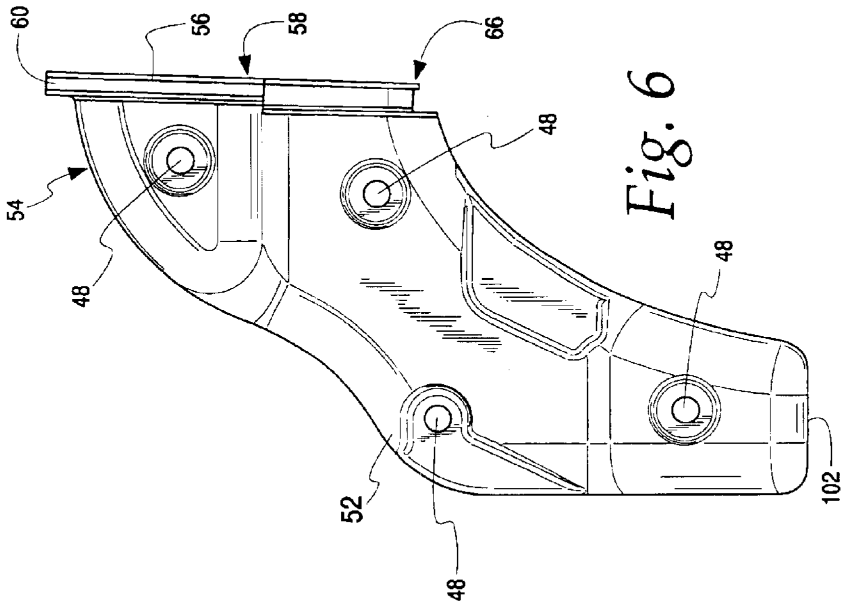
FIG. 6 is a side elevational view of the first housing portion of the stationary clamp illustrating its exterior surface.
Figure 7A:
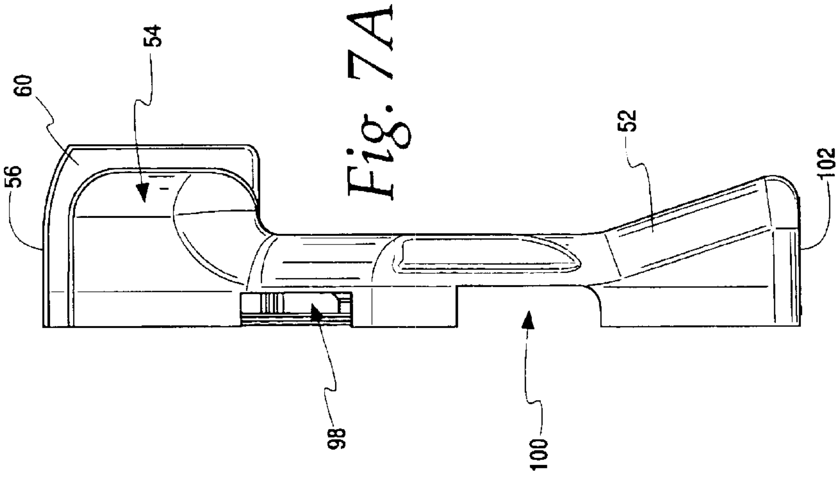
FIGS. 7A–C are rear and side elevational vies and a bottom plan view of the first housing portion of the stationary clamp, respectively.
Figure 7B:
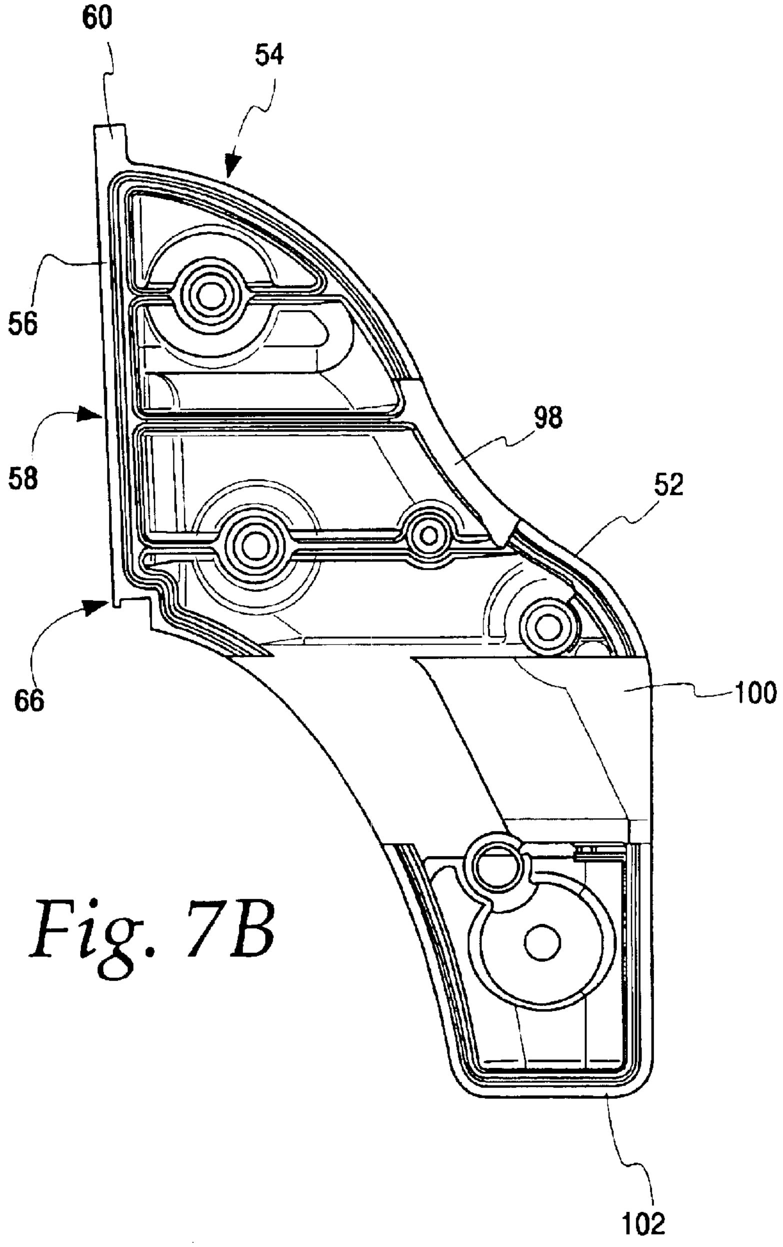
Figure 7C:
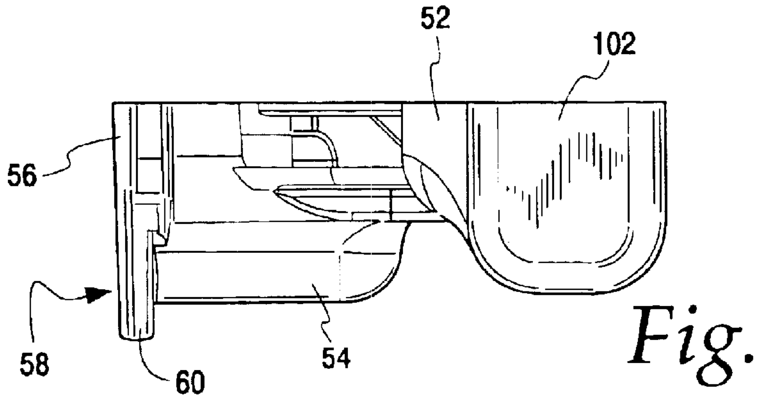

With the brake 74 and springs 86 and elongate member 16 coupled to the second housing portion 44 of clamp member 12, the first housing portion 42 serves as a cover to 20 enclose these components within the interior region of the clamp member 12. FIG. 6 is a view of the exterior surface of first housing portion 42. The first housing portion 42 is attached to the second housing portion 44 in a clam shell arrangement via fasteners 46. Threaded portions of fasteners 46 can be inserted through the recessed openings 48 in first housing portion 42 and inserted into corresponding internally threaded bosses 50 located on second housing portion 44. Once these portions 42 and 44 are connected, a jaw pad 62 is attached onto the clamp member 12 by sliding the lip 60 into channel 64 in the jaw pad 62 and pressing the lower rim 70 of the jaw pad over the tab portion 66 until the tab portion extends into receiving slot 68.

The first and second housing portions 42 and 44 include large and generally flat bottom surfaces 102 which allow the clamp 12 to stand upright. To this end, the surfaces taken together comprise a generally rectangular surface which is approximately as wide as the remainder of the clamp 12 and is sufficient to allow the clamp member 12 to be self-standing on a flat support surface such as a bench top. In a preferred form of apparatus 10, the flat surface 102 can be used to stand the clamp 12 upright when the clamp members 12 and 14, and elongate member 16 are used apart from the base 18, as will be discussed more fully herein.

Figure 8:
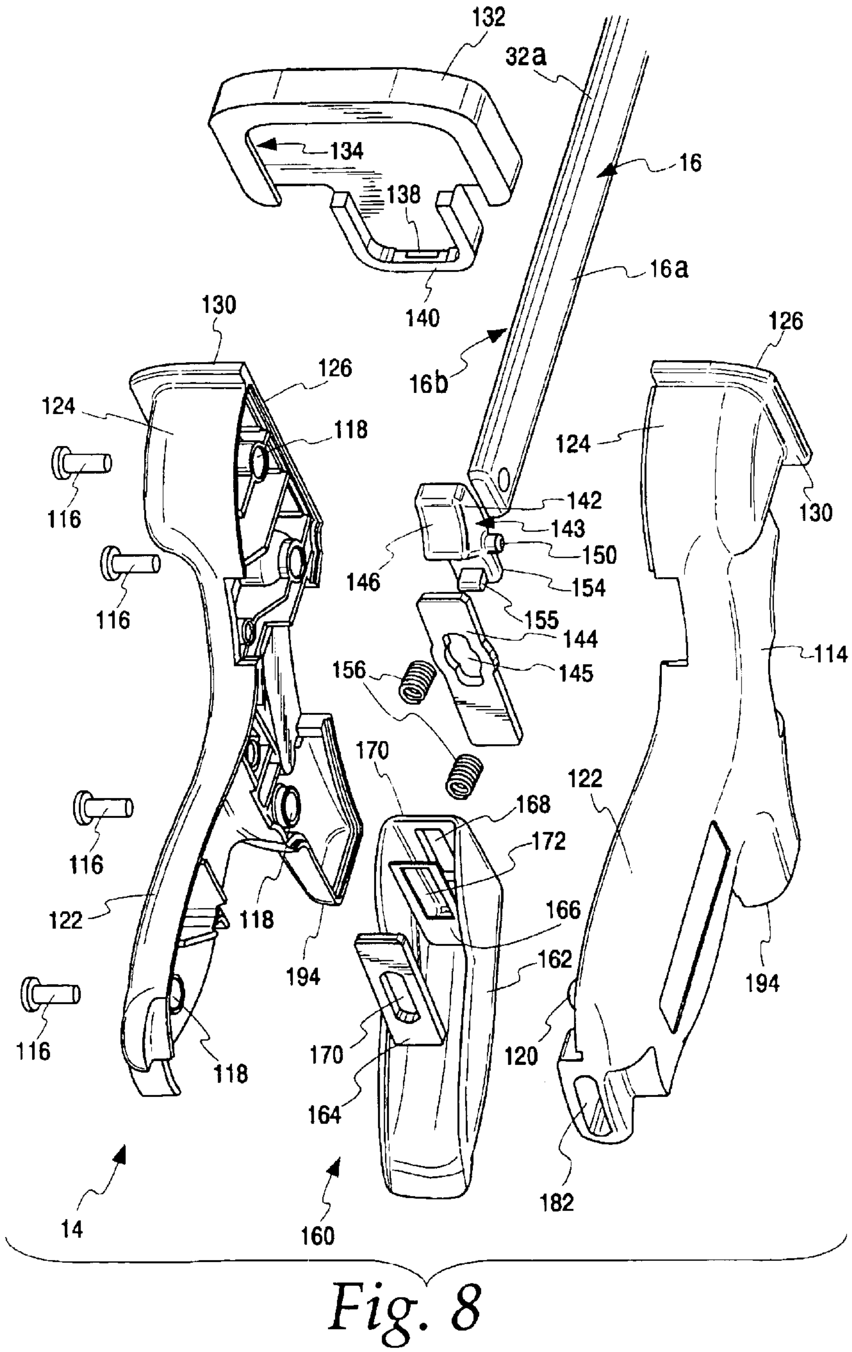
FIG. 8 is an exploded view of a second clamp structure or movable clamp structure in accordance with the invention.
Figure 10A:
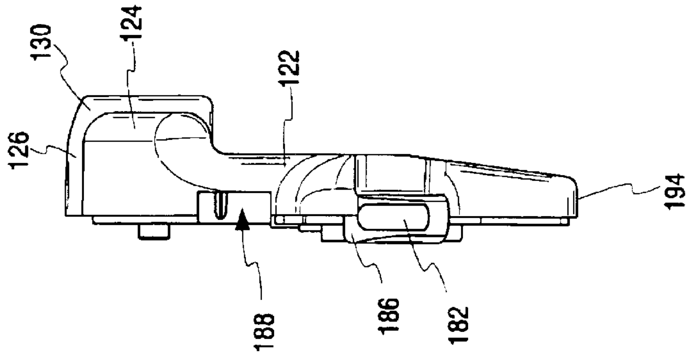
FIGS. 10A–C are rear and side elevational views and a bottom plan view of the second housing portion of the movable clamp, respectively.
Figure 10B:
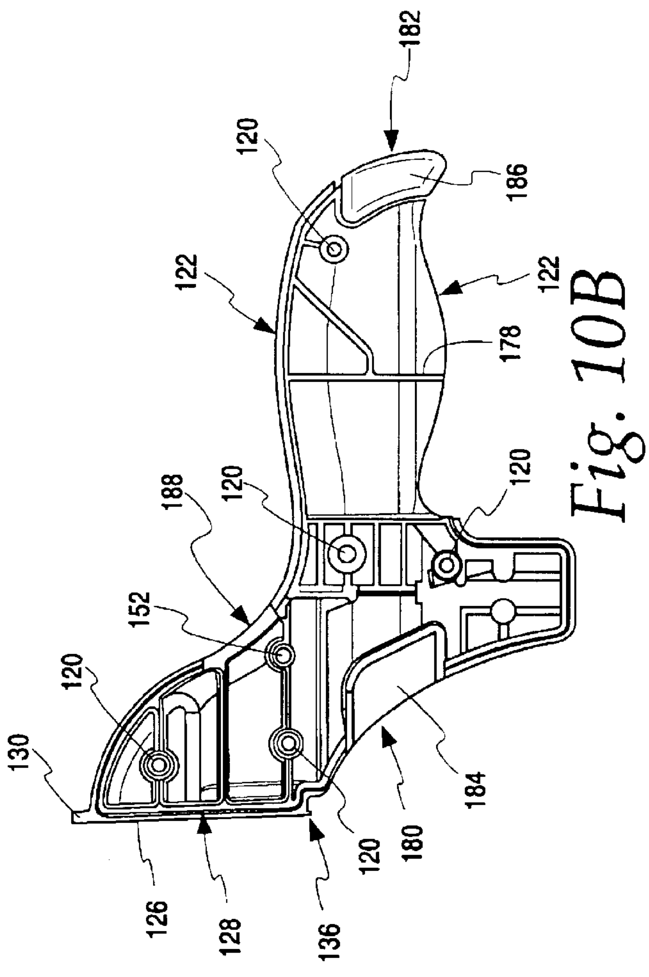

Referring now to FIGS. 2 and 8, and in particular FIG. 8, an exploded view of the second clamp member 14 is shown having a clam shell housing 110 made up of a first housing portion 112 and a second housing portion 114. The first housing portion 112 is attached to the second housing portion 114 via fasteners 116 which are inserted through recessed openings 118 and threaded into corresponding bores 120 (FIG. 10B) located on the second housing portion 114. The openings 118 are recessed so that the heads of the fasteners 116, or portions of fasteners 116 that do not pass through the openings 118, do not protrude out from the first housing portion 112 in order to maintain a generally smooth gripping surface 122.

The gripping portion 122 of first and second housing portions 112 and 114 extends outward from the main body of clamp member 14 and has a longitudinal axis that extends generally parallel to the elongate member 16. The outer surface of the gripping portion 122 is ergonomically curved to fit the palm of a persons hand so that the clamp 14 is comfortable for an operator to use and grasp. The clamp member 14 further includes a jaw support 124 located above the elongate member 16, which supports an enlarged jaw plate portion 126 (FIGS. 10B–C and 11B–C) having a flat face 128 which is used to exert a clamping or spreading force on a workpiece. In a preferred form of apparatus 10, the jaw 126 is T-shaped to match the preferred configuration of the jaw 56 of the first clamp member 12. The jaw 126 of second clamp member 14 has an outer lip 130 which protrudes, or extends, from the jaw support 124 so that a jaw pad 132 can be applied over the jaw 56. With such a configuration, the jaw pad 132 may be pressed into engagement with a workpiecc via the jaw 126 and jaw support 124. As mentioned above, in some applications a flat jaw pad 132, as shown in FIGS. 2 and 8, may be preferred for engaging a workpiece. In other applications, jaw pads 132 having shaped jaw pad surfaces may be desired for engaging specific types of workpieces. For example, a jaw pad 132 having a curved jaw pad surface may be used when engaging a rounded workpiece such as a pipe. In the preferred form of apparatus 10 discussed above, the jaw pad 132 corresponds in shape to the jaw 126 and is therefore similarly T-shaped. The jaw pad 132 includes a channel 134 for receiving outer lip 130 of jaw 126.

The jaw pad 132 may be secured onto the jaw 126 by having a tab portion 136 extending from the bottom of the jaw 126 and having a corresponding receiving slot 138 located in a lower rim 140 of pad 132. The jaw pad is attached to the jaw 126 by guiding the outer lip 130 of the jaw 126 into the channel 134 of the jaw pad 132 and by pressing the lower rim 140 of the jaw pad 132 over the tab portion 136 until the tab portion rests at least partially in the receiving slot 138 of pad 132. Conversely, the jaw pad 132 can be removed by pulling the lower rim 140 off of the jaw 126, thereby removing the tab portion 136 from the slot 132, and then sliding the pad 132 off of the jaw 126 until the outer lip 130 of jaw 126 is fully removed from the channel 134.

Figure 9:
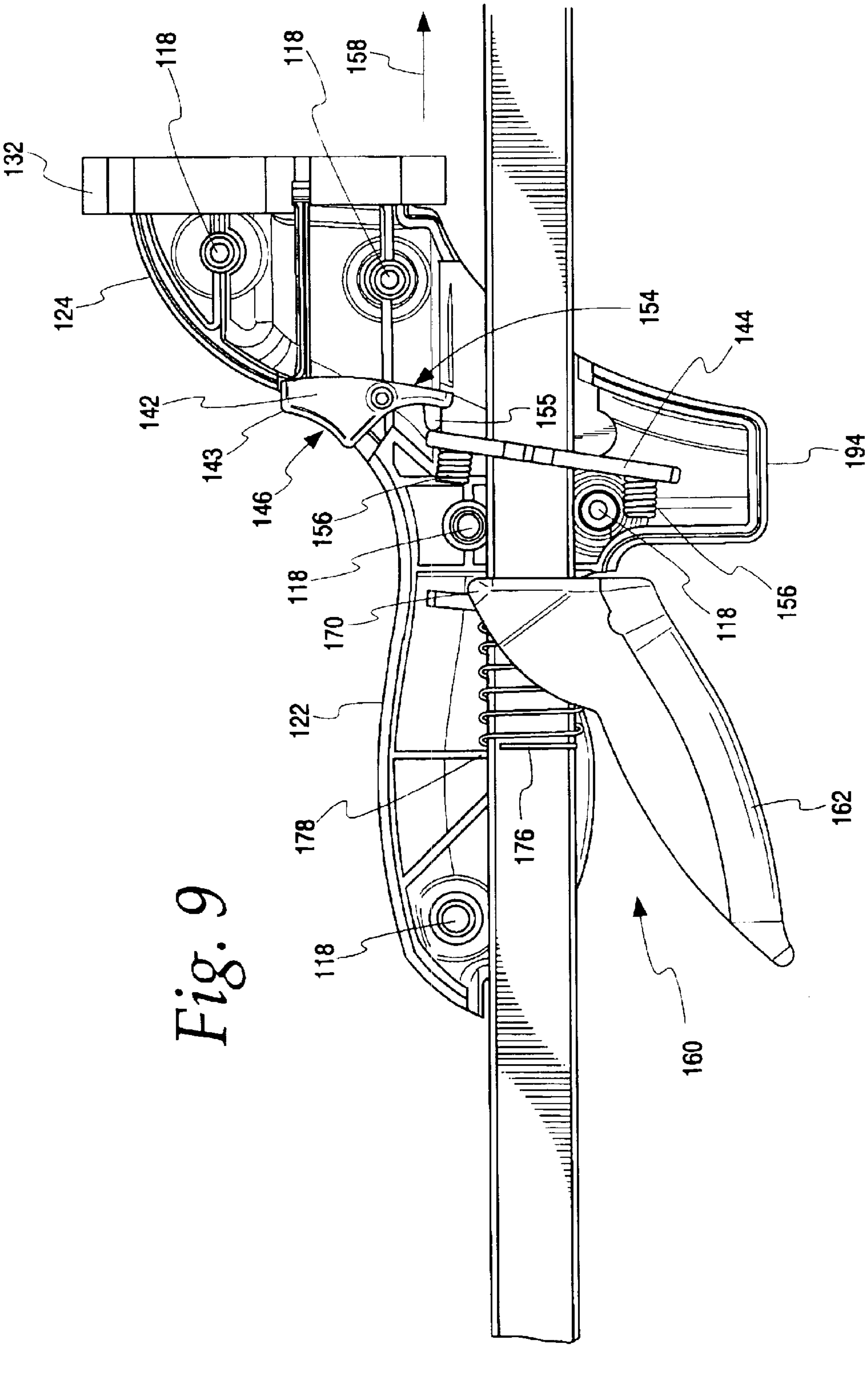
FIG. 9 is a side elevational view of the first housing portion of the movable clamp illustrating the position of the clutch release mechanism, clutch, trigger clutch, trigger clutch bearing plate, and jaw pad among other items.

Similar to the first clamp member 12, the second clamp member 14 (as shown in FIG. 9) preferably includes a brake or clutch release mechanism 142 for releasing or disengaging a clutch 144 so that the position of the second clamp member 14 on the elongate member 16 can be adjusted. The clutch release mechanism 142 includes an upper user operated portion 143 pivotally mounted to project through a slot opening in the clamp housing 110 proximate to the gripping portion 122 so that an operator can conveniently actuate the mechanism 142 such as with their thumb while holding the gripping portion 122. A pressing or engagement surface 146 is contoured with a concave configuration so that pushing on the surface causes pivoting in the direction shown by arrow 148 (FIG. 2).

The clutch release mechanism 142 has pivot trunnion mounts 150 extending out from opposite sides of mechanism 142 which define an axis about which the mechanism 142 is pivoted. The pivot trunnion mounts 150 extend into integral cylindrical bosses 152 located on the first and second housing portions 112 and 114 of clamp member 14. A clutch engagement or lever portion 154 in the housing extends below the trunnion mounts 150 so that pivoting on the engagement surface 146 pivots the portion 154 back toward the rear of the housing 110. More particularly, a strike member 155 protruding from the lever portion 154 is pivoted into engagement with the clutch 144 causing the clutch 144 to move from a position of angular engagement with the elongate portion 16, to a more upright generally disengaged position with the elongate member 16.

As can be seen in FIGS. 8–9, the clutch 144 is preferably in the form of a slotted plate having a central slot opening through which bar 16 extends. Similar to the brake system described above with respect to clamp 12, the clutch 144 is normally held in an angular alignment with the elongate member 16 via springs 156, which make the clutch 144 exert a frictional force against the elongate member 16. The angular alignment is such, however, that the frictional force applied to the elongate member 16 only prevents the clamp member 14 from moving about the elongate member 16 in one direction, and not the other. In this way, the second clamp member 14 can be slid along the bar in the direction shown by arrow 158 (FIG. 2), but cannot be slid along the bar in the opposite direction unless the clutch release mechanism 142 is actuated. Actuating, or pressing, the clutch release mechanism 142, causes the mechanism 142 to pivot about the axis defined by pivot trunnion mounts 150, and drives the strike member 155 of clutch release lever portion 154 into the top of clutch 144. The strike member 155 tilts the clutch 144 into a more upright position, compressing upper spring 156 and thereby reducing the angular alignment (or engagement) of the clutch 144 and elongate member 16. While in this more upright position, the second clamp member 14 is capable of freely moving about the elongate member 16 because the clutch 144 is no longer in frictional engagement with the elongate member 16. Once the clutch release mechanism 142 is released, the clutch 144 returns to an angular alignment and the frictional engagement created thereby prevents the member 14 from being pushed in a direction other than that shown by arrow 158.

The second clamp member 14 further includes a trigger mechanism 160 having a trigger lever 162 and an additional trigger clutch 164 and trigger clutch bearing plate 166, as shown in FIGS. 8 and 9. The trigger mechanism 160 may be used to advance the clamp member 14 towards a workpiece so that a strong clamping force or strong spreader force (depending on the clamp configuration) can be applied to the workpiece. The trigger lever 162 includes an opening 168 through which the elongate member 16 passes, and pivots about an axis 170 defined by the trigger portion located above the opening 168. Similarly, the trigger clutch 164 and trigger clutch bearing plate 166 include openings 170 and 172, respectively, through which the elongate member 16 passes. The trigger clutch 164 and trigger clutch bearing plate 166 are held in a normally upright position proximate to the trigger lever opening 168 via spring 176. When the trigger lever 162 is actuated, causing it to pivot about the axis 170 and driving the distal end of lever 162 towards the elongate member 16, the trigger clutch 164 and trigger clutch bearing plate 166 are tilted into an angular alignment with the elongate member 16. This angular alignment allows the trigger clutch and trigger clutch bearing plate 166 to frictionally engage the elongate member 16. Further pulling of the trigger lever 162 causes the trigger clutch 164 and trigger bearing plate 166 to shift away from the trigger lever opening 168 thereby compressing spring 176. This movement of the trigger clutch 164 and bearing plate 166, combined with the frictional engagement between these components and the elongate member 16, causes the elongate member 16 to be pulled through the openings 168, 170 and 172, or causes the clamp member 14 to advance on the elongate member 16 in the direction indicated by arrow 158. The spring 176 compresses when the trigger clutch 164 and bearing plate 166 are shifted away from the trigger lever opening 168 because backstop 178 prevents the entire spring 176 from moving in the same direction as the trigger clutch 164 and bearing plate 166.

Once the trigger lever 162 is released, the spring 176 forces the trigger clutch 164 and bearing 166 back towards the trigger lever opening 168 and back into an upright alignment with respect to elongate member 16. With such a configuration, the clamp member 14 remains freely movable over the elongate member 16 in the direction indicated by arrow 158. More particularly, the trigger clutch 164 and bearing plate 166 are normally biased in an upright position which does not frictionally engage elongate member 16. Thus, operation of the clutch mechanism 142 is all that is required in order to freely position the clamp 14 in either direction on the elongate member 16.

In a preferred form of apparatus 10, the second clamp member 14 cannot be fully removed from the elongate member 16. For example, the clutch opening 160 may be enlarged or broached as discussed above, and shown in FIG. 8, to allow the clamp to be moved as far as possible on the elongate member 16, but the trigger clutch opening 172 and bearing plate opening 174 will not be broached or altered to allow the stop 17 or protrusion from the sidewall of the bar 16 to pass there through because the integral components of clamp 14, including spring 176 and trigger lever 162, could become jostled or fall out once the elongate member 16 is removed. Preferably, the openings 180 and 182 of the second housing portion 114, which define the passageways through which the elongate member 16 passes, are of such a size that the stop 17 or protrusions from the sidewall of elongate member 16 cannot pass through.

Figure 10C:
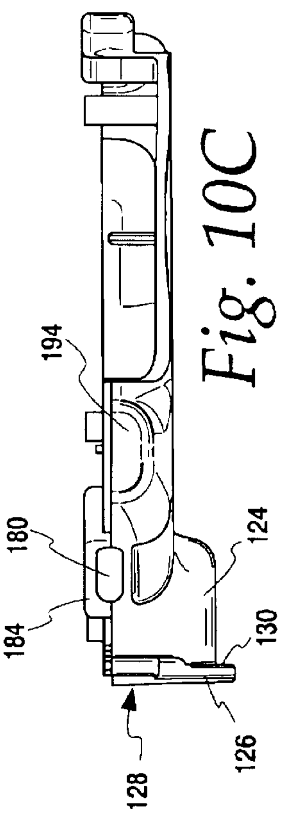

Although FIG. 9 shows the clutch 144, springs 156 and trigger mechanism 160 with its trigger lever 162, trigger clutch 164, trigger clutch bearing plate 166 and spring 176, in the position each component would be in when the first and second housing portions 112 and 114 are connected, these components are actually coupled to the second housing portion 114. For example, in FIGS. 10A–C, portions 184 and 186 of second housing portion 114 define the openings 180 and 182 through which the elongate member 16 passes through, and backstop 178 prevents spring 176 from moving when the trigger mechanism 160 is actuated. The second housing portion 114 further contains a cutout portion 188 which makes up a portion of the slot in clamp 14 filled by clutch release mechanism 142, internally threaded bores 120, and one of the integral cylindrical bosses 152 used to receive one of the pivot trunnion mounts 150 of clutch release mechanism 142. FIG. 10C is a bottom plan view of the second housing portion 114, showing the first opening 180 through which the elongate member 16 passes which is defined by portion 184.

Figures 11A, 11B, 11C:
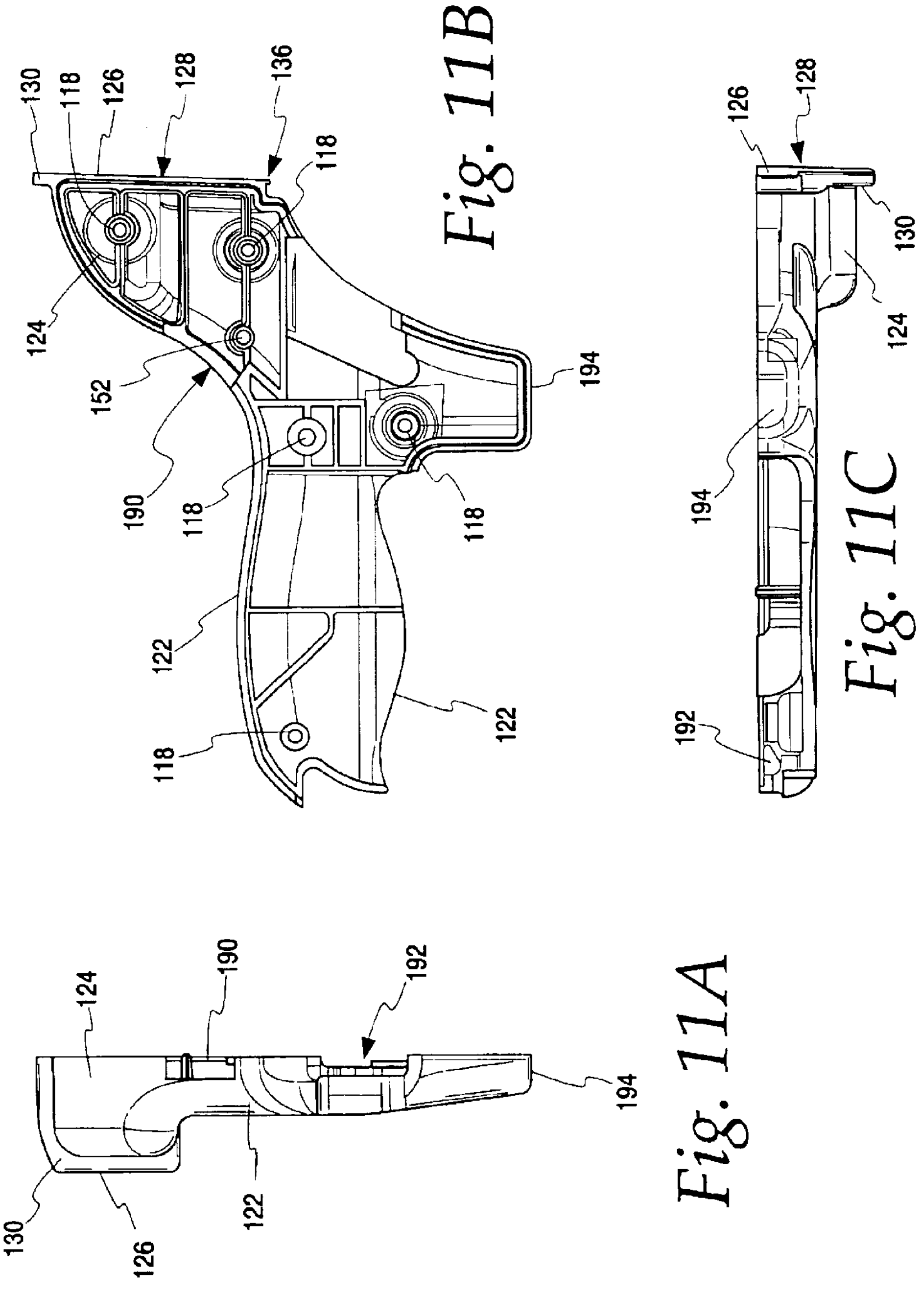
FIGS. 11A–C are rear and side elevational views and a bottom plan view of the first housing portion of the movable clamp, respectively.

With the clutch 144, springs 156 and trigger mechanism 160 mounted to the second housing portion 114, the first housing portion 112 serves as a cover to enclose these components within the interior region of clamp member 14. FIGS. 11A–C depict various views of the first housing portion 112, which is connected to the second housing portion 114 in a clam shell arrangement via fasteners 116. FIG. 11A is a rear elevational view of the first housing portion 112, showing the cutouts 190 and 192 which are for the clutch release mechanism 142 and elongate member 16, respectively. FIG. 11B is an elevational view of the interior region of first housing portion 112, showing the various recessed openings 118 and the other integral cylindrical boss 152 used to receive pivot trunnion mount 150 of clutch mechanism 142.

As with the first and second housing portions 42 and 44 of first clamp member 12, the first and second housing portions 112 and 114 of second clamp member 14 include generally flat bottom surfaces 194 which allow the clamp 14 to stand upright. In a preferred form of apparatus 10, the flat surface (or standing surface) 194 is used to stand the clamp 14 upright when the clamp members 12 and 14, and elongate member 16 are used apart from the base 18. This configuration and application will be discussed in further detail below.

Figure 12B:
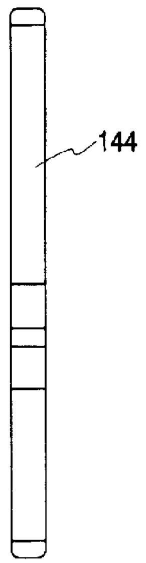
FIGS. 12A–B are front and side elevational views of the clutch and/or brake, respectively.
Figure 12A:
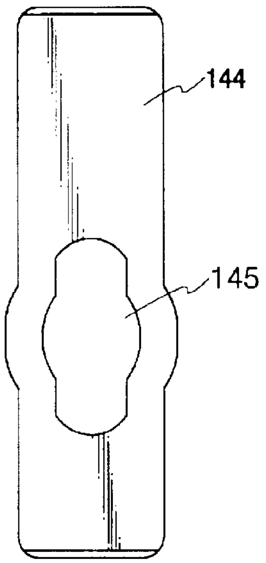

FIGS. 12A–B, 13A–C, 14A–C and 15A–C are additional views of the clutch 144, clutch release mechanism 142, trigger clutch 164, and clutch bearing plate 166. More particularly, FIGS. 12A–B are front elevational and side elevational views of the clutch 144, respectively. The clutch 144 has a generally rectangular opening 145 which is rounded or broached at the top and bottom of the opening 145 to fit the rounded elongate member 16. The surfaces that define opening 145 are typically not rounded so that they remain sharp and increase the frictional engagement made between clutch 144 and elongate member 16.

In a preferred form, clutch 144 has a portion of opening 145 which is enlarge in order to allow the stop 17 located on elongated member 16 to pass through the clutch 144. In this way, the same piece may be used as clutch 144 and brake 74 in order to save costs for manufacturing and reduce the amount of time it takes to assemble the apparatus 10. For example, cost savings may result by eliminating the need for a second piece (e.g., by reducing the number of different parts). Furthermore, by enlarging the opening 145 on both sides, assembly of the apparatus 10 may be simplified because the clutch 144/brake 74 would have no specific orientation with which it must be placed, (e.g., it can be placed on the elongate member 16 without regard as to what side the stop 17 is on).

Although this configuration will allow the stop 17 to pass through the clutch 144, the stop will not be able to pass through the trigger clutch opening 170 and/or the clutch bearing plate opening 172. Furthermore, as mentioned earlier, the openings 180 and 182 may be shaped or sized so as to prevent the stop 17 from even passing through these portions of the clamp 14 prior to reaching the clutch opening 145 in order to prevent the clamp 14 from being removed from bar 16.

Figure 13A:
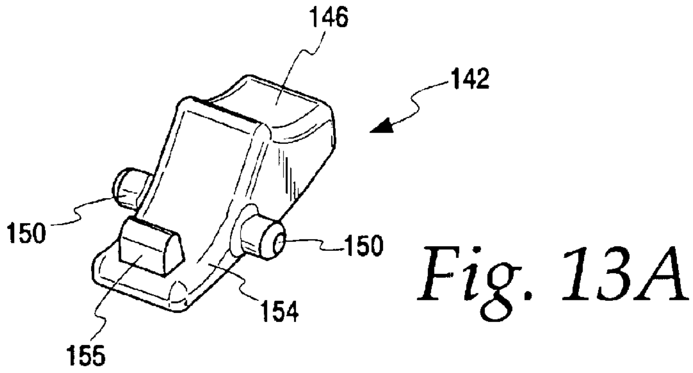
FIGS. 13A–C are perspective, top plan and cross section views of the clutch release mechanism, respectively.
Figure 13B:
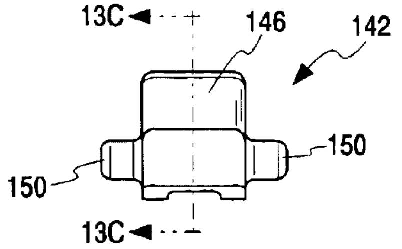
Figure 13C:
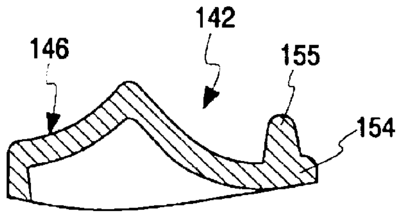

FIGS. 13A–C are multiple views of the clutch release mechanism 142. For example, FIG. 13A is a profile view of the clutch release mechanism 142 showing the pivot trunnion mounts 150, release lever portion 154, protruding strike member 155, and engagement surface 146. Ideally the brake release mechanism 72 may be made to the same specifications, except for the protruding strike member 155, so that manufacturing costs can be further reduced. FIG. 13B is a elevational view of the clutch release mechanism 142 showing another view of the engagement surface 146 which, in a preferred form, is contoured such that it can be actuated or pressed by an operator's thumb. FIG. 13C is a cross section view taken along line A—A in FIG. 13B. As this view shows, the clutch release mechanism 142 may be partially hollowed out.

Figure 14C:
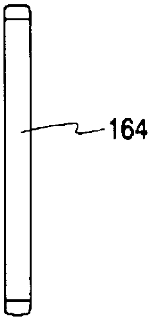
FIGS. 14A–C are perspective, and front and side elevational views of the trigger clutch, respectively.
Figure 14B:
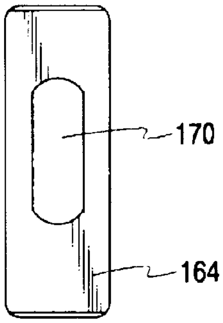
Figure 14A:
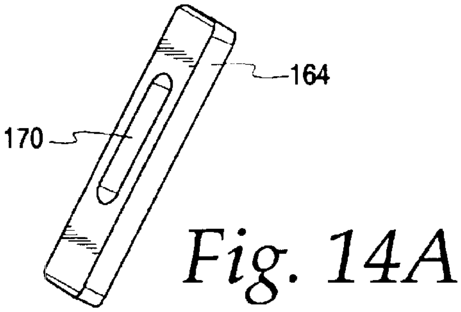

FIGS. 14A–C are views of the trigger clutch 164 which has a similar configuration to clutch 144 including opening 170 with rounded top and bottom ends. The trigger clutch also has rounded top and bottom ends, like the clutch 144, to allow the piece to pivot from an angled position to an upright position. Unlike the clutch 144, however, the trigger clutch opening 170 does not have an enlarged portion for allowing the stop 17 to pass. As discussed above, the surfaces defining opening 170, and particularly the edges of the upper and lower broached surfaces of opening 170, are preferably not rounded and remain sharp so as to increase the frictional engagement between the trigger clutch 164 and the elongate member 16.

Figure 15A:
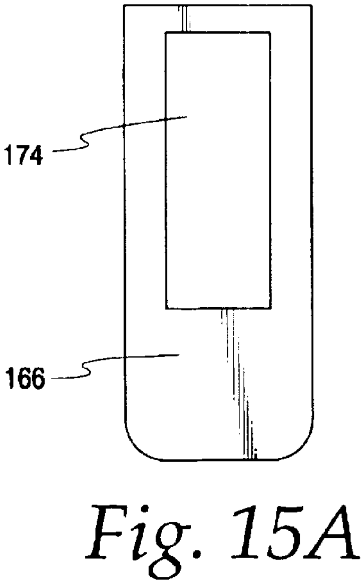
FIGS. 15A–B are front and side elevational views of the trigger clutch bearing plate, respectively.
Figure 15B:
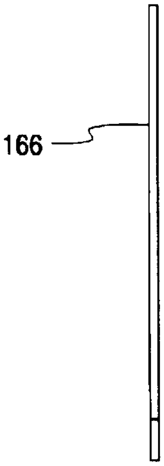

FIGS. 15A–B are front elevational and side elevational views of trigger clutch bearing plate 166, respectively. Unlike the openings in brake 74, clutch 144, and trigger clutch 164, the opening 174 of bearing plate 166 is rectangular with no broached surfaces. The actual length of the bearing plate opening 174 from top to bottom is larger than the length of the elongate member 16 so that the bearing plate 166 can be shifted into an angular engagement with elongate member 16 and will travel away from the trigger pivot axis 170 when the trigger lever 162 is actuated, as discussed above.

Referring now to FIGS. 2 and 16, and in particular FIG. 16, an exploded view of base 18 is shown including upper portion 202 and lower portion 204 thereof. The upper base portion 202 includes a dome-shaped housing 206 having a recessed area 208 for product labeling, and a receiving portion 210 with which the elongate member 16 can be connected to the base. The recessed areas 208 also provide a gripping surface with which the operator can grasp the base (and/or bar clamp assembly if positioned thereon) to move the apparatus 10 to a desired location. The upper base portion 202 further includes a securing mechanism 212 that fixes the elongate member 16 in place relative to the base 18. The securing mechanism 212 is operated by actuating lever 214.

Figure 17:
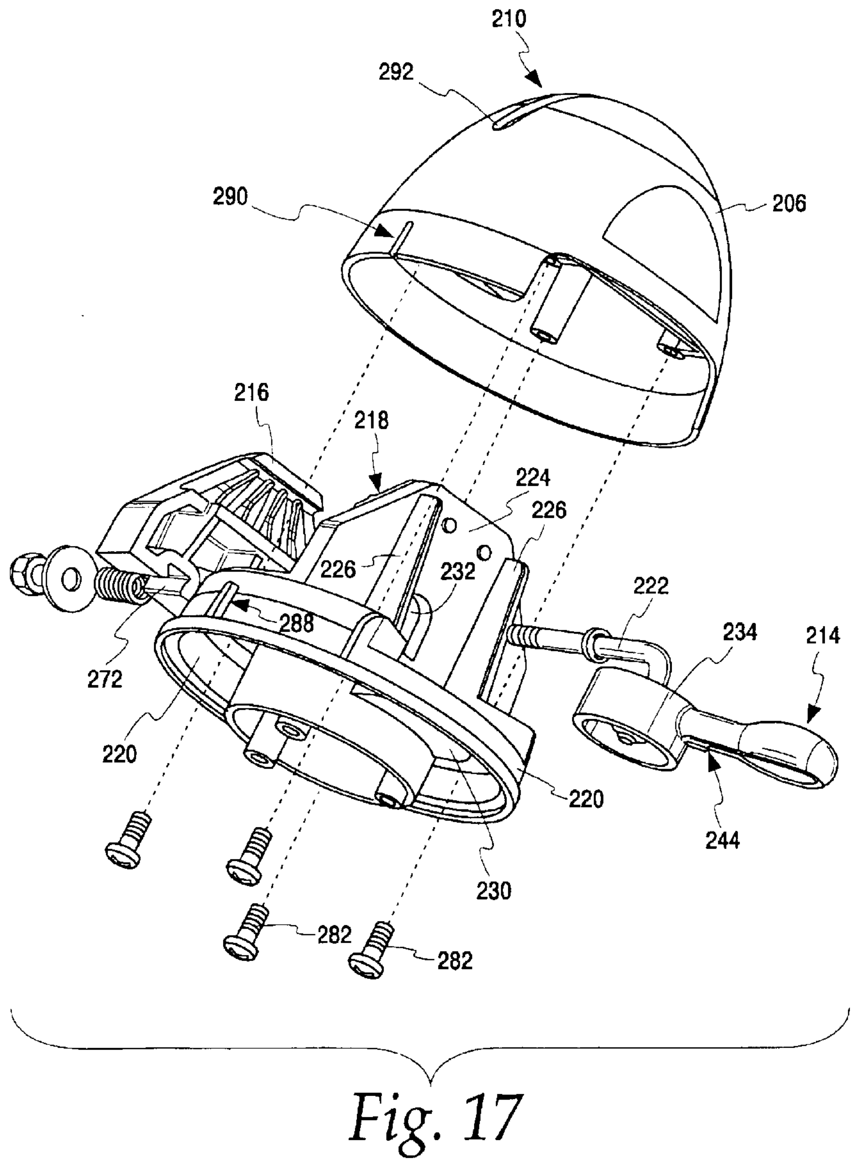
FIG. 17 is an exploded view of an upper base portion illustrating a securing mechanism in accordance with the invention.
Figure 20A:
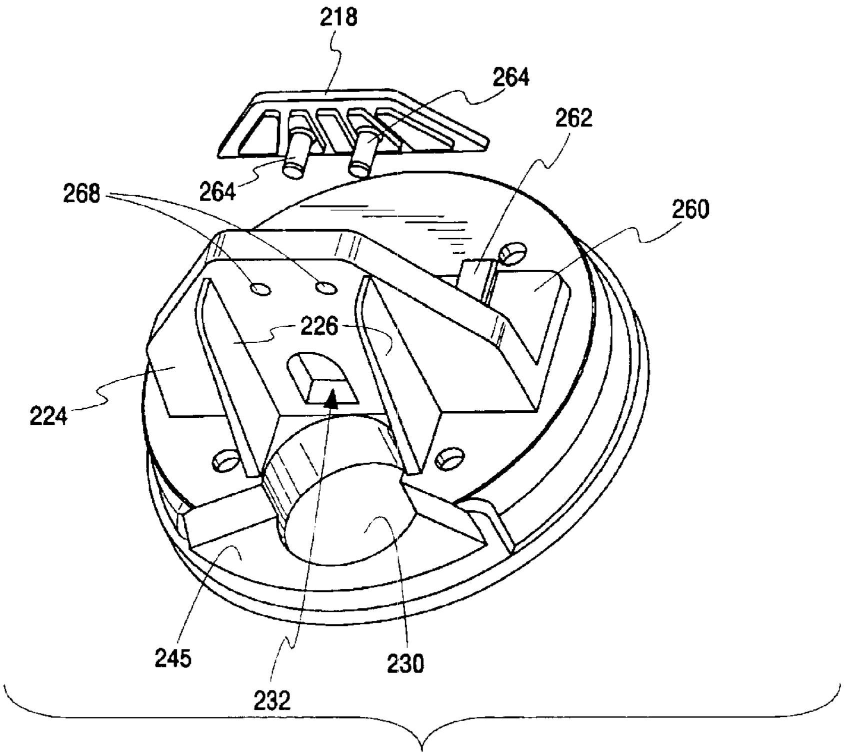
FIGS. 20A–B are exploded and side elevational views of a portion of the upper base portion illustrating the internal base frame and frictional pad among other items.
Figure 20B:
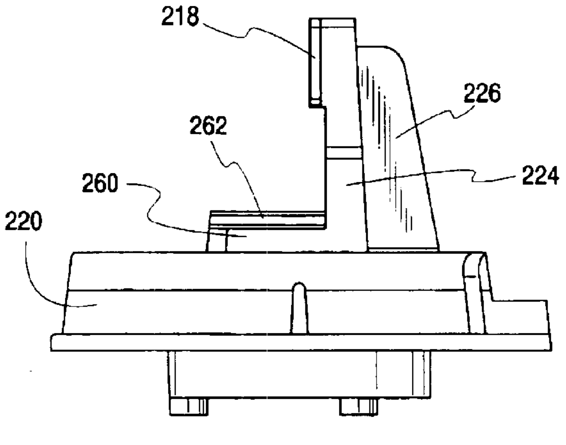

In FIG. 17, the preferred form of the securing mechanism 212 is shown as including clamp block 216, friction pad 218, and internal base frame 220. The internal base frame 220 has a generally disk-shaped lower base portion and a vertical wall 224 with gusset members 226 extending along the side of the wall, between it and the base, to reinforce the wall 224. The base frame 220 further includes a recessed circular cup portion 230 and an opening 232 which cooperate to mount the actuating lever 214 for being shifted to operate the securing mechanism 212. As show in FIGS. 17 and 18A–C, the actuating lever 214 has an enlarged bulb-shaped handle or gripping portion 234 which tapers into a shaft 236. The shaft connects the handle 234 to an annular cup-shaped portion 238, which sets in the cup portion 230 and uses the cup portion 230 as a rotary bearing surface. Actuating or shifting the handle 234 rotates the member 238 in the cup portion 230. The annular portion 238 has an upper wall 239 in which an off-centered opening 240 is formed. An L-shaped driver member 222 has its transverse foot portion 222*a* attached in the opening 240 with elongate arm portion 222*b* connecting the retaining block 216 for shifting it between bar release and bar retaining positions. An annular wall 242 extends down about the opening on the interior of cup-shaped member 238. The actuating lever 214 further includes a standoff structure 244 which may be used to space the handle 234 and shaft 236 apart from the lever rim 245 (see FIG. 20A) of internal base frame 232, and/or used to provide additional support for the handle 234 and shaft 236.

Figure 18A:
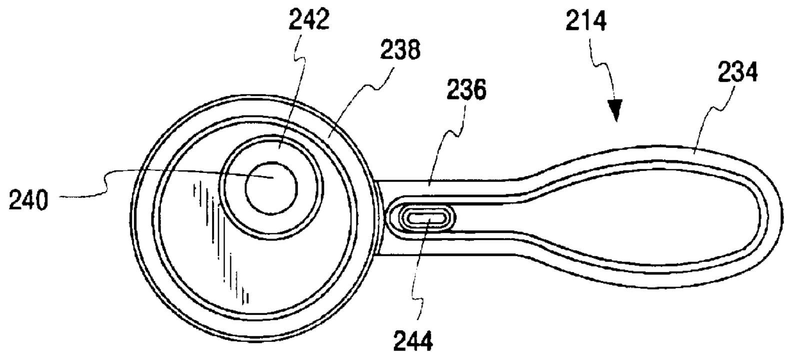
FIGS. 18A–C are bottom plan, side elevational, and top plan views of an actuating lever, respectively.
Figure 18B:
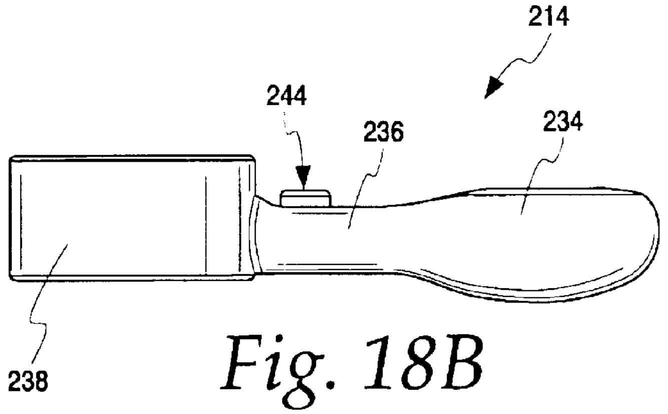
Figure 18C:
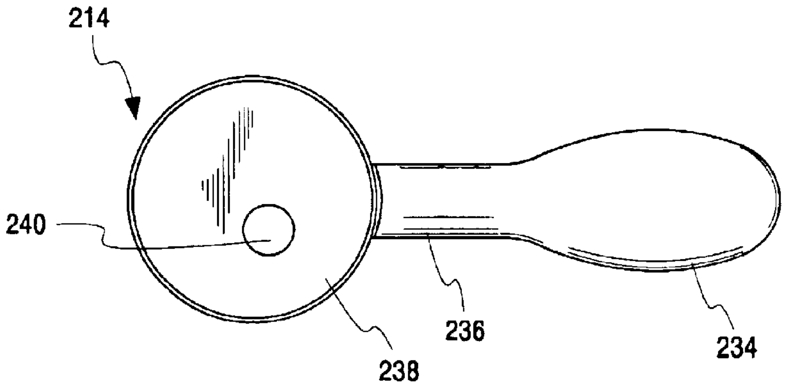

FIG. 18A is a bottom plan view of the actuating lever 214 showing the annular wall 242, thickness of cup-shaped member 238, and standoff 244. The handle 234 and shaft 236 are partially hollowed which reduces the costs of materials and provides a lighter end product. FIG. 18B is a side elevational view of the actuating lever 214 showing how the standoff 244 extends beyond the shaft 236. FIG. 18C is a top plan view of the actuating lever 214 in which the off–center opening 240 can clearly be seen.

Figure 19A:
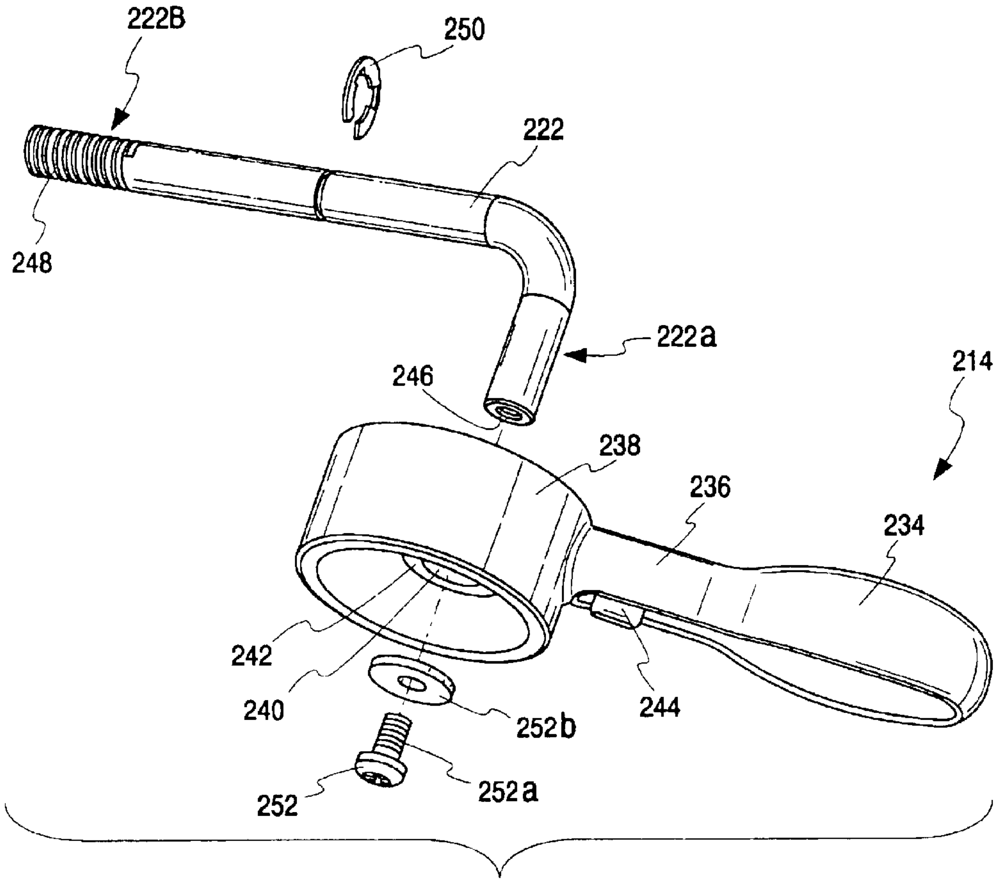
FIGS. 19A–B are exploded and perspective views of an actuator mechanism for the securing mechanism, respectively.
Figure 19B:
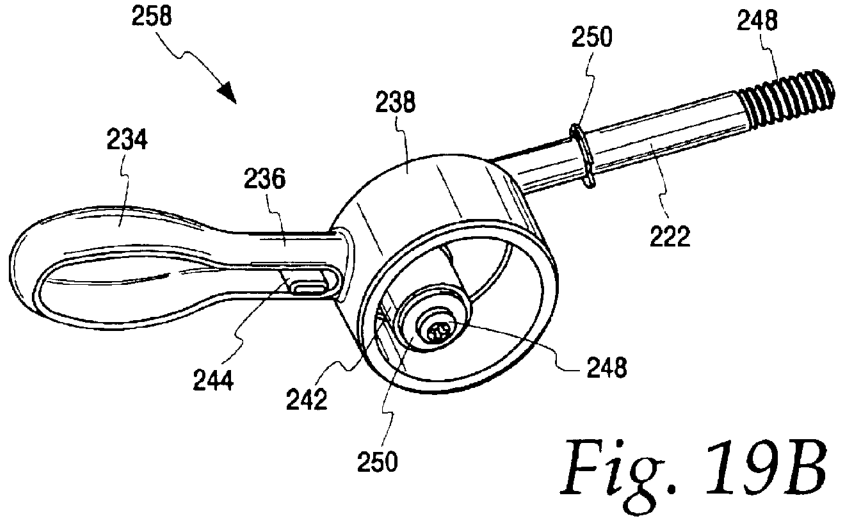

Referring now to FIGS. 17 and 19A–B, and in particular to FIG. 19A–B which show an exploded view and assembled perspective view of the actuating lever 214. Link 222 is a generally L-shaped shaft having a threaded bore 246 on one end and a threaded portion 248 on the other end. In a preferred form, an E-clip 250 is mounted in a groove midway between the threaded portion 248 and the elbow of the L-shaped shaft, and will be used to retain the clamp block 216, as will be discussed in further detail below. The link end including threaded bore 246 is fed through opening 240 of cup-shaped member 238 and is coupled to member 238 via fastener 252. In a preferred form of the apparatus 10, fastener 252 consists of screw 252*a* and washer 252*b*, which are threaded into the receiving bore 246 of link 222. The screw 252*a* is tightened until the link 222 is firmly fastened to the actuating lever. Once this is complete, the entire actuator mechanism 258, including link 222 and actuator 214, is coupled to the internal base frame 220. More particularly, link 222 is fed through the internal base frame opening 232 and the cup-shaped member 238 is nested in the recess 230 of internal base frame 220.

The internal base frame 220, as can best be seen in FIGS. 20A–B and 21A–B, has a vertical wall 224 extending up from the plate 220 and a lower horizontal base portion 260 mounted to the disk shaped internal base frame 220. The base portion 260 includes guides 262 in the form of slide rails for the clamp block 216. At its lower end, the block 216 includes dovetail channels for riding on the slide rails or guides 262 between bar release and bar retaining positions of the block. The vertical wall 224 includes a friction pad 218 attached toward its upper end facing the clamp block. The friction pad 218 is preferably made of a rubber, such as neoprene, and includes two projecting members 264 which are inserted through openings 266 for attaching the friction pad 218 to the wall 224. The projecting members 264 may be connected to the wall 224 in a variety of ways, however, in a preferred form the projections 264 are made of rubber and are secured to the wall 224 via a friction fit arrangement.

The block 216 is substantially fixed onto the actuator drive shaft 222 between spring 272 and clip 250 so that it may be moved between a bar release position and a bar retaining position. More particularly, the threaded portion 248 of link 222 is fed through an opening 270 (FIGS. 22A–D) in block 216. The threaded end portion 248 of link 222 extends through a spring 272 in compression against the block 216 via washer 274. In order to press the washer 274 against the spring 272, an internally threaded nut 276 is threaded onto the threaded portion 248 of link 222. The spring load provided by spring 272 urges the block 216 along the link 222 toward the wall 224 so that it is pushed against the clip 250 located on the link 222. Thus, when the actuator is shifted so as to move the block to its retaining position, it will resiliently engage against the vertical wall, and specifically the engagement pad thereof. The spring 272 allows the bar securing mechanism 212 to secure bars of different sizes without diminishing its capability of securing the bar due to the resilient engagement provided by clamp block 216. More particularly, the spring 272 provides a means for compensating over traveling of the block 216, such as when the block 216 has securely engaged the elongate member 16 prior to the actuator 214 reaching its final bar retaining (or securing) position.

Figure 21A:
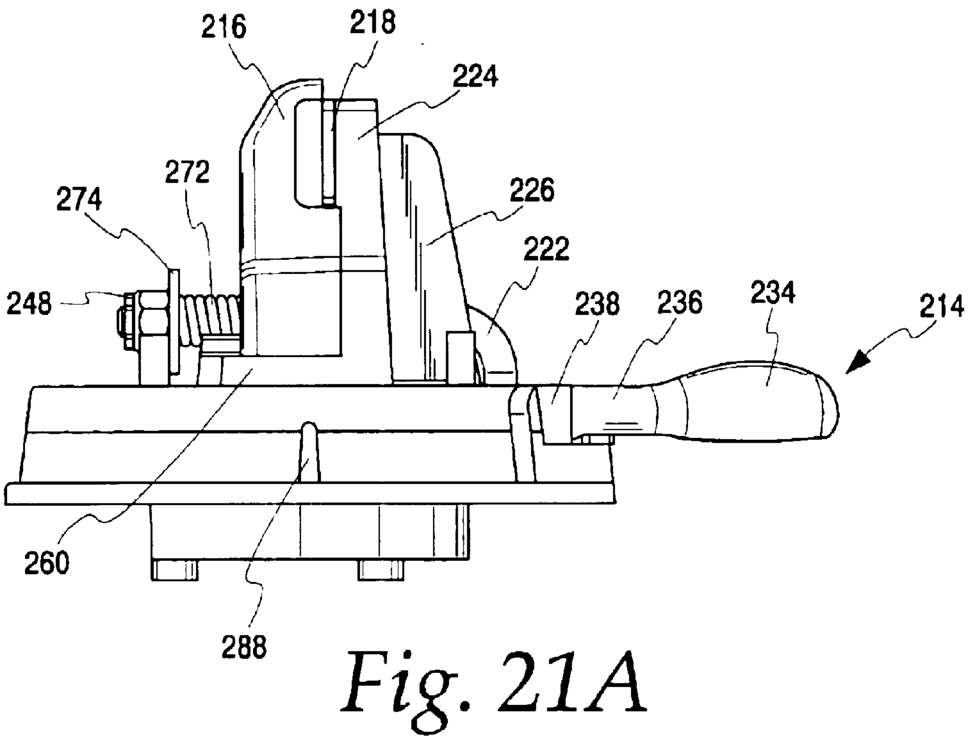
FIGS. 21A–C are side elevational and perspective views of the securing mechanism, with and without the base cover, showing various illustrations of the elongate member securing mechanism.
Figure 21B:
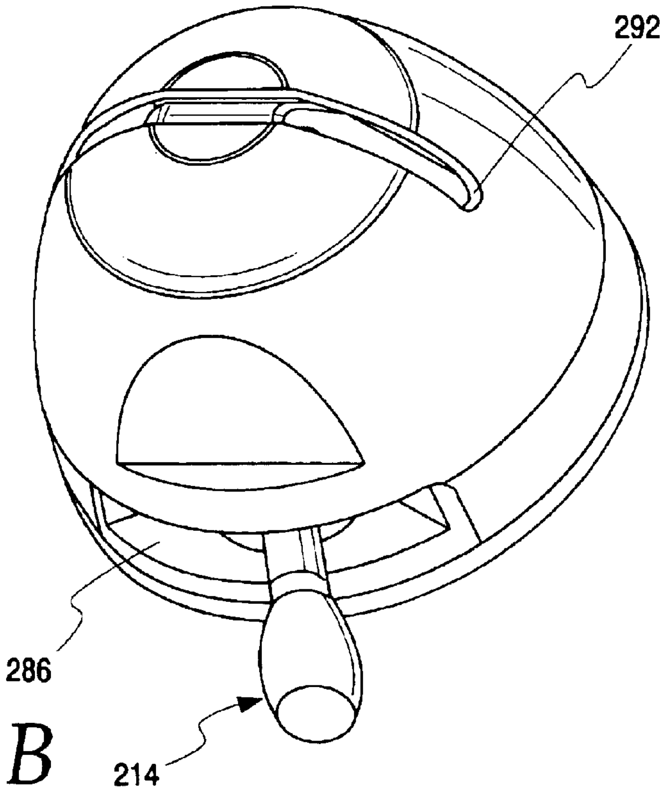
Figure 21C:
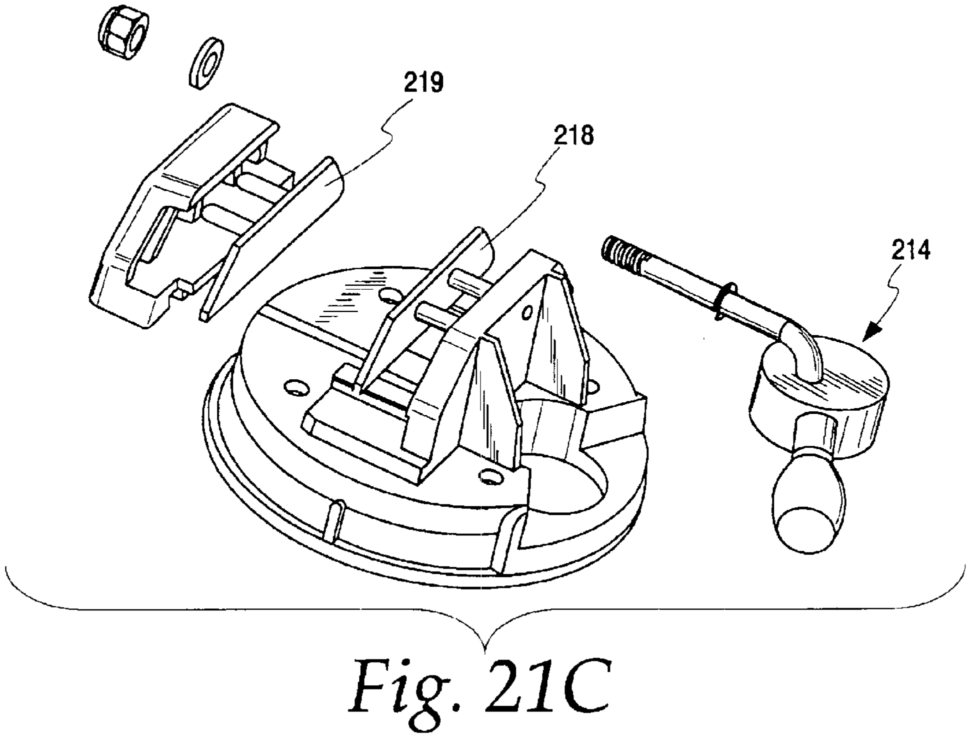
Figure 22C:
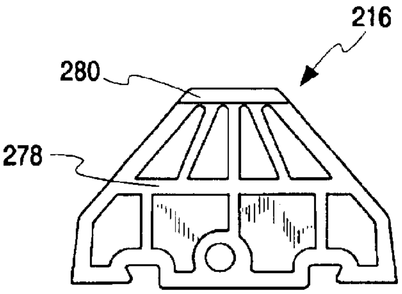
FIGS. 22A–D are perspective views and front and side elevational views of a clamp block in accordance with the invention.
Figure 22A:
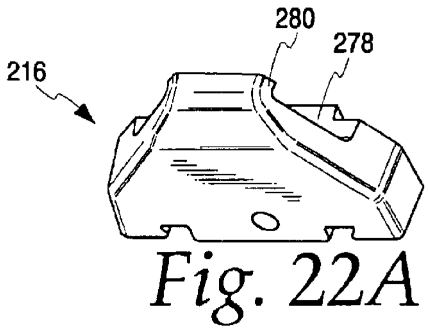
Figure 22D:
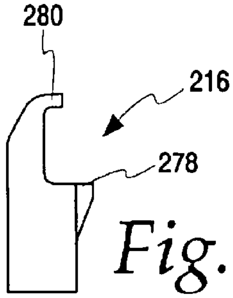
Figure 22B:
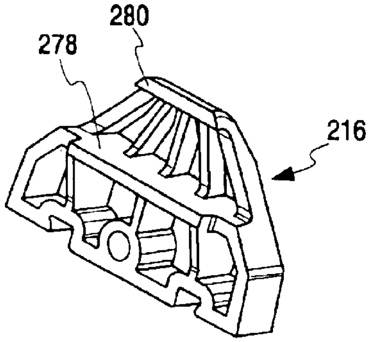

In an alternate embodiment (FIG. 21C), an additional friction pad 219 (similar to friction pad 218) may be attached to the inner surface of the block 216, on the side opposite friction pad 218, so that the elongate member 16 is retained between two resilient or malleable pads. With such a configuration, the varying bar sizes may be accounted for via the resilient or malleable nature of the pads alone, eliminating the need for spring 272. As with the preferred jaw pads 62 and 132 and friction pad 218 discussed thus far, additional pad 219 is preferably made from a rubber such as neoprene or the like. In yet another embodiment such over travel compensation may be achieved via a combination of resilient/malleable pads and spring 272 in order to provide additional compensation for over travel of block 216.

The block 216 includes a lower support surface 278 on which the bar inserted into the base slot rests. An upper lip or overhang portion 280 is formed on the block 216 and extends over the lower support surface 278 but is shorter than the supports surface in terms of how far they extend toward the vertical wall. In this manner, when the block is extended to its bar release position, the overhanging portion will clear the slot opening of the bar securing mechanism 212 with a distal portion of the lower support surface still aligned therewith in position to support the bar thereon. With the bar inserted through the slot opening and resting on the surface portion, operating the actuator to shift the block to its retaining position, causes the overhanging portion to shift toward the vertical wall for substantially closing the slot opening and fitting over the top of the bar to fix the bar to the base. In this regard, the spacing between the upper and lower block portions 280 and 278 is preferably only slightly greater than the height of the bar. In practice, the actuator is pivoted counterclockwise in order to shift the block 216 to the retaining position thereof. Such pivoting restricts the eccentric shaft 222 through wall opening 232 to draw the block toward the wall 224 until ribs on the block 216 resiliently engage against the bar via the spring load provided by spring 222 pushing it tightly against the wall pad 218 (or in the alternative embodiment of FIG. 21C, until friction pad 219 resiliently engages against the bar). In this manner, the bar is substantially fixed against sliding in the slot, and cannot be lifted out of the slot due to the overhanging block lip portion 280 blocking the top of the slot opening and the frictional effect of pad 218 (and/or pad 219 in an alternate embodiment). To release the bar such as for repositioning or removing the bar, the actuator handle is pivoted clockwise which advances the drive shaft through wall opening 232 within the block sliding on rails 262 to its release position where the lip portion 280 thereof no longer interferes with removal of the bar up and out from the slot opening 210. It should be noted that to reposition the bar, the handle need not be pivoted as far as it can, it only needs to pivot enough so that the ribs of block 216 (or friction pad 219) substantially disengage from the bar 16, even if at this point the lip position is partially obstructing the top of the slot opening and removal of the bar therethrough.

The dome-shaped housing 206 and internal base frame 220 are connected, as shown in FIGS. 17 and 21A–C, via fasteners 282 which are partially inserted through openings in the internal base frame 220 and are threaded into corresponding bores 284 attached to housing 206. The housing further includes a slot cutout 286 which allows for the actuating lever 214 to protrude from the housing 206 with the cutout having end walls that define the retain and release positions for the lever. An alignment tab 288 is also provided and is attached to the internal base frame 220. When the housing 206 is attached to the internal base frame 220, the alignment tab 288 is inserted into a tab receiving slot 290 thereby ensuring that the housing 206 and plate 220 are properly aligned. As assembled, the lower most end surfaces 292 of the receiving slot are level or flush with block surface 278 to provide additional support for the elongate member 16 received therein. The slot walls can also assist in limiting twisting or rotation of the bar held in the slot. To this end, the slot wall spaced from wall 224 is preferably in alignment with the ribs when the block is shifted to its bar retaining position.

Figure 16A:
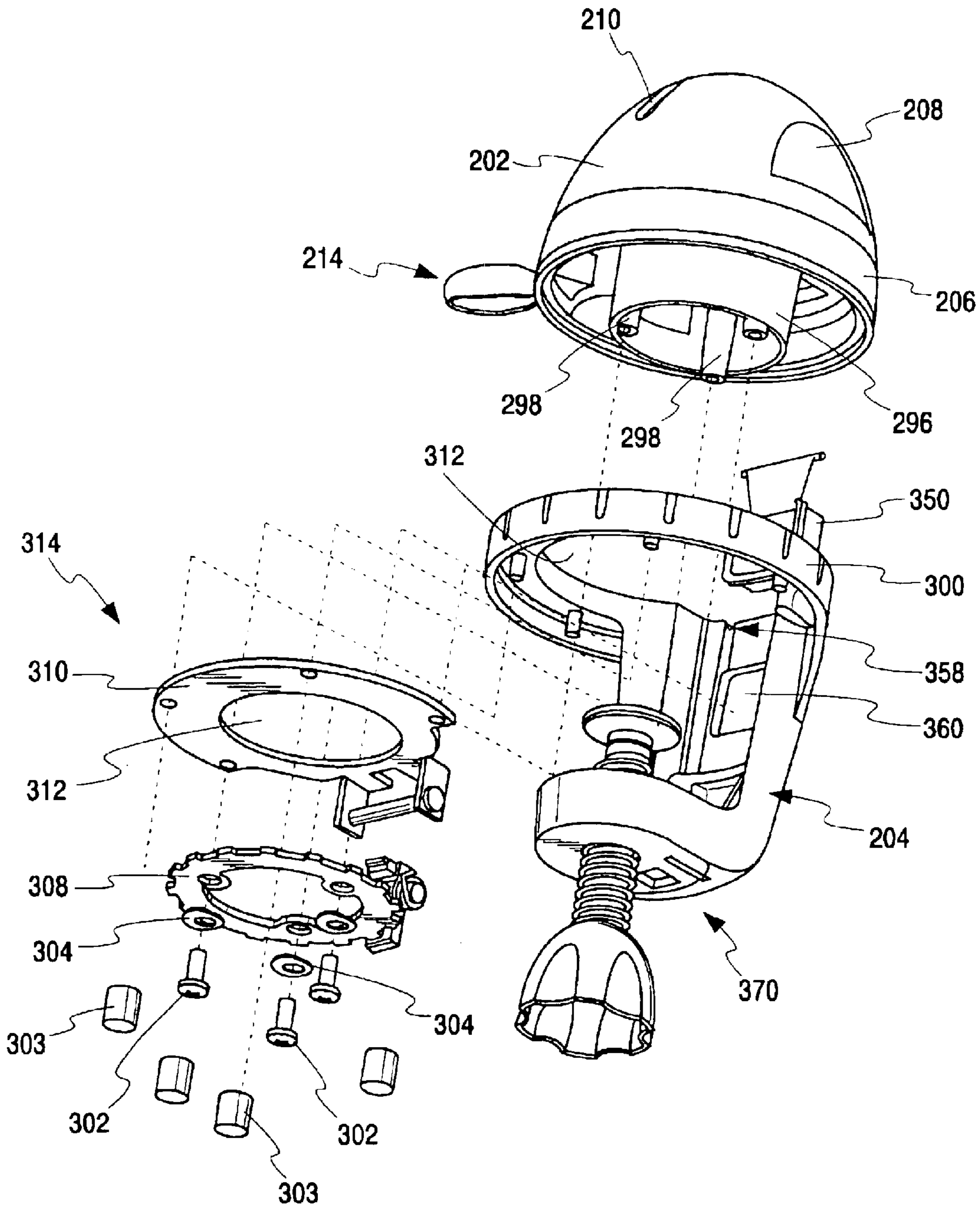
FIGS. 16A–B are exploded and perspective views of a base in accordance with the invention.
Figure 16B:
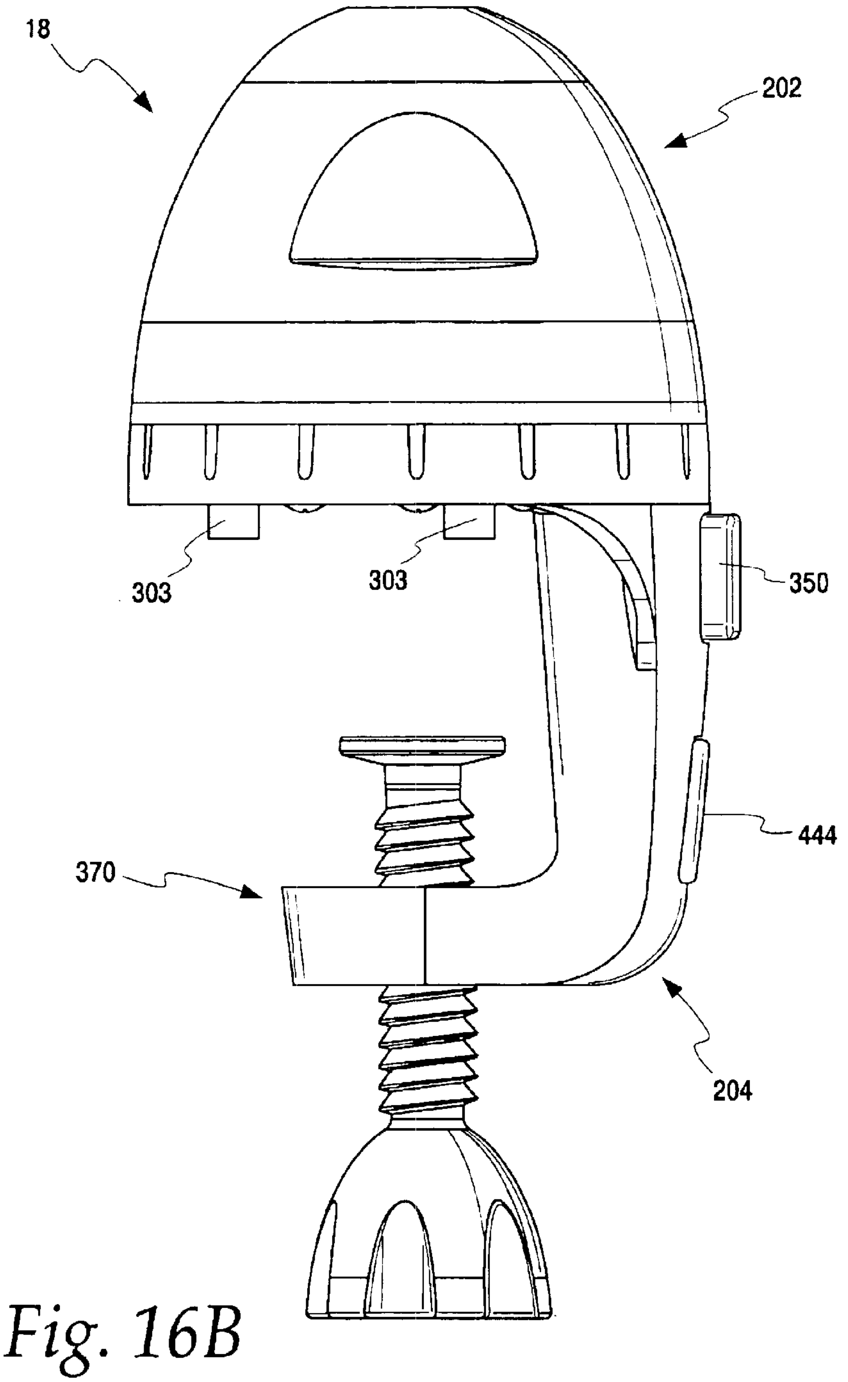

The upper base portion 202 is connected to the lower base portion 204 via mounting plate 296, which is cylindrical in shape and includes threaded bores 298 for receiving lower base portion fasteners 302. In FIGS. 16A–B, the threaded portions of fasteners 302 are inserted through washers 304 and openings 306 in lower indexing plate 308, which is positioned beneath the index mounting plate 310 in the circular opening 312 of lower base housing 300. The threaded portions of fasteners 203 are then screwed into engagement with the threaded bores 298 of mounting plate 296, thereby securing the lower base portion 204 to upper base portion 202. The indexing plate 308 and indexing mounting plate 310 are part of an indexing mechanism 314 which allows the upper base portion 202 to be oriented in a plurality of different positions with respect to lower base portion 204. In this position, the rotary position of the bar clamp can be adjusted to accommodate space constraints that may be present so that with the selected position the space available for working with the clamp member as desired is optimized.

Figures 23A, 23B:
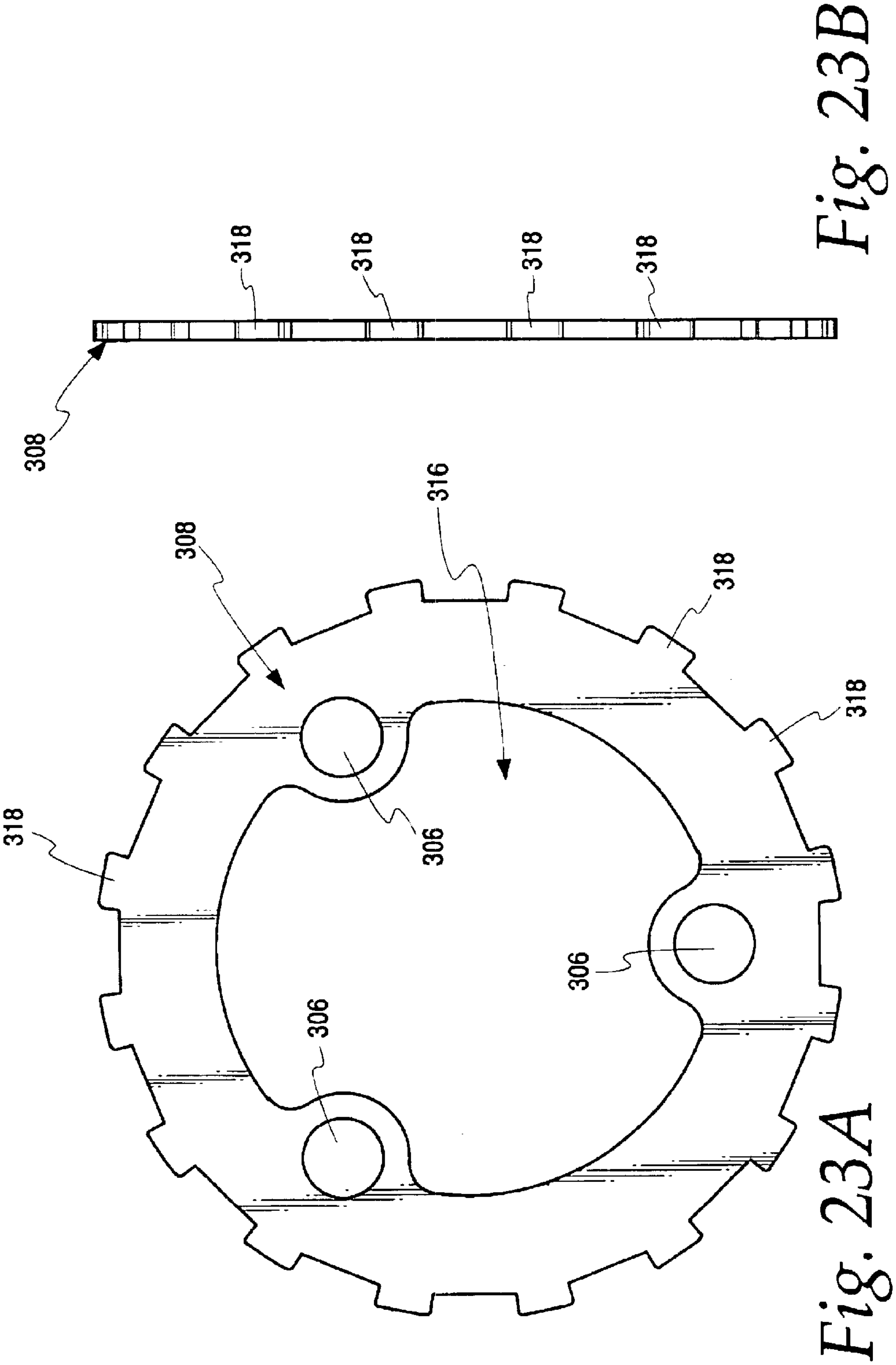
FIGS. 23A–B are top plan and side elevational views of an indexing plate in accordance with the invention, respectively.

FIGS. 23A–B include a top plan view and side elevational view, respectively, of the indexing plate 308, which consists of a disk-shaped ring having a central opening 316, a plurality of fastener openings 306, and a plurality of notches 318 present about the periphery of the indexing plate 308. In a preferred form of apparatus 10, the fastener openings 306 are positioned one hundred and twenty degrees apart from one another and a total of sixteen notches 318 are provided with the center of each notch 318 being twenty-two and one-half degrees apart from the center of the next notch 318. Such a configuration of indexing plate 308 will allow the upper base portion 202 to be rotated about the lower base portion 204 in twenty-two and one-half degree increments. These configurations are, however, purely exemplary and may be changed to provide rotations of differing degrees or increments.

Figure 24A:
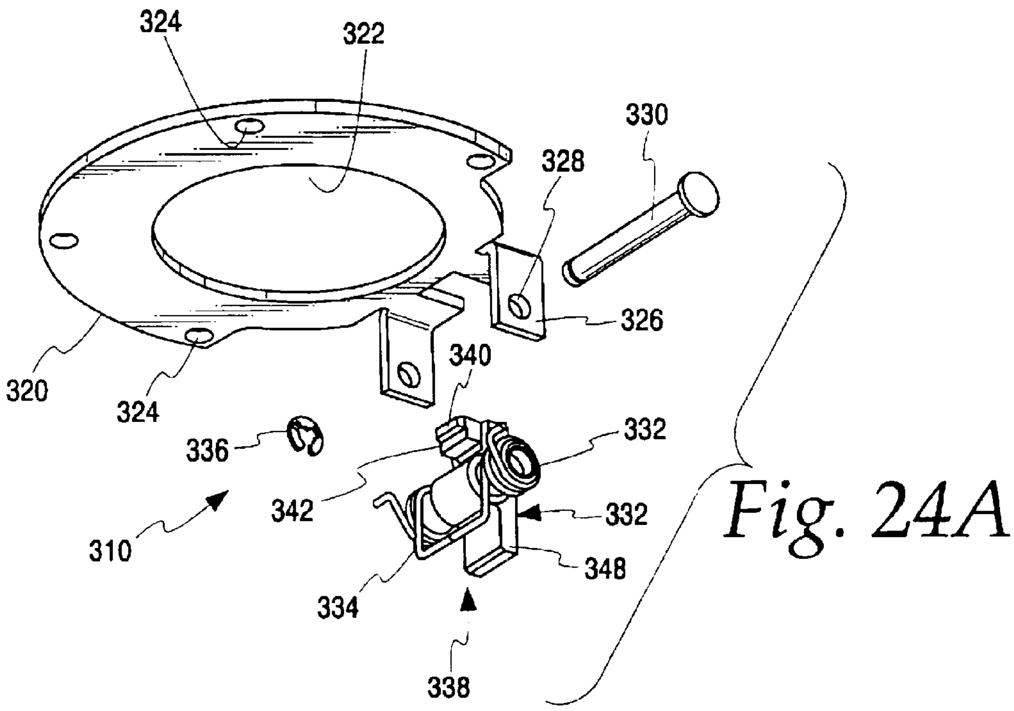
FIGS. 24A–C are exploded, side elevational and bottom plan views of an indexing mounting plate in accordance with the invention, respectively.
Figure 24B:
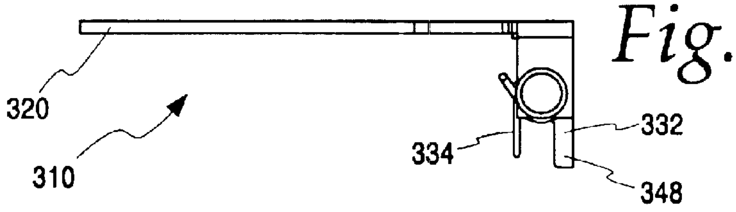
Figure 24C:
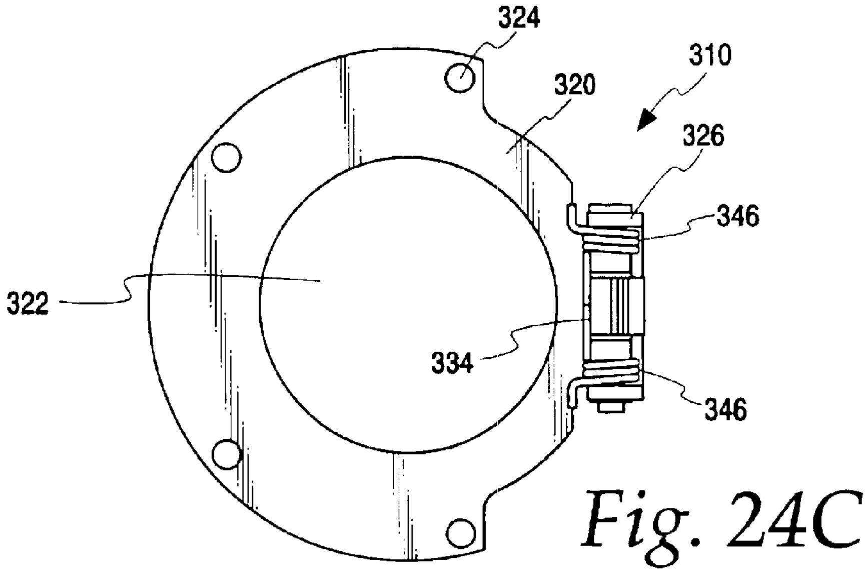
Figure 25A:
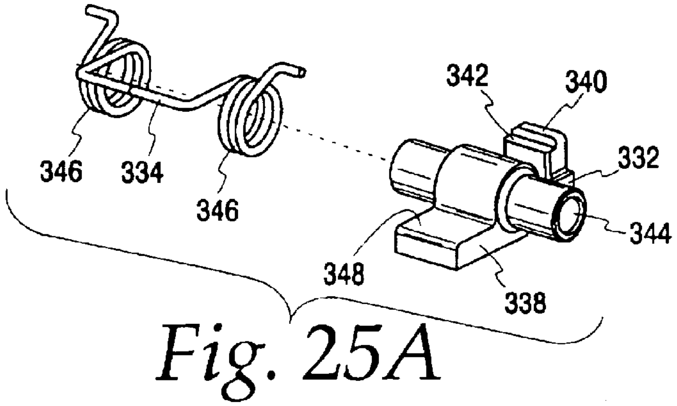
FIGS. 25A–C are exploded, and side and front elevational views of a index locking mechanism in accordance with the invention, respectively.
Figure 25B:
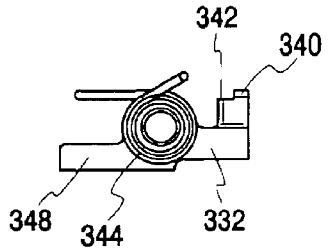
Figure 25C:
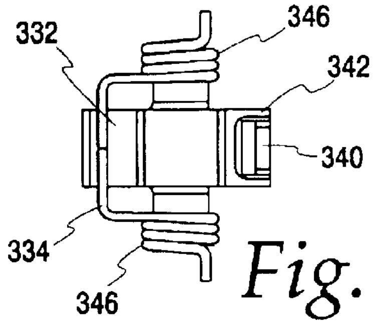

Various views of indexing mounting plate 310 are shown in FIGS. 24A–C, which include a disk-shaped ring 320 having an interior opening 322 and a plurality of peripheral alignment openings 324 which are used to align the indexing mechanism 314 with lower base portion 204 and upper base portion 202. A pair of raised portions 326 extend out from one end of plate 320 and include openings 328 through which clevis pin 330 passes coupling index lock 332 and torsion spring 334 to the indexing mounting plate 310. The clevis pin 330 is retained in the openings 328 via E-clip 336 and raised portions 328 provide the backstop for the end portions for the torsion spring 334. As shown in FIGS. 25A–C, the torsion index lock mechanism 338 consists of lock 332 having a stop portion 340, a locking step 342, and a pivot sleeve 344 through which clevis pin 330 is passed and on which torsion spring coils 346 are mounted.

As discussed above and shown in FIGS. 16A–B, when the indexing plate 308 is fastened to the mounting plate 296 of upper base portion 202, the indexing plate 308 is mounted flush to the indexing mounting plate 310. With this configuration, the stop portion 340 of torsion index lock mechanism 338 is normally pressed against the plate 320 between the extending members 328, and is aligned in generally the same plane as the plate 320. As such, the locking step 342 (located below the stop portion 340) will be aligned in generally the same plane as the indexing plate 308 and will cause the locking step 342 to fill the gap between the notches 318 of plate 308. By doing so, the locking step 342 operates as a lock holding the upper base portion 202 in the orientation it currently is in. If the orientation of the upper base portion 202 is desired to be changed, an operator need only press the lower portion 348 of index lock 332 inward toward the interior opening 322 causing the index lock 332 to pivot about the pivot axis defined by clevis pin 330 thereby pulling the locking step 342 out of engagement with the gap between notches 318. This allows the upper base portion 202 to be freely rotated about the lower base portion 204 until the index lock 332 is allowed to go back to its normal state with the locking step 342 filling the gap between notches 318.

Figure 26A:
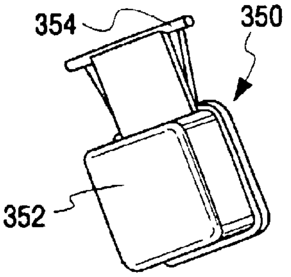
FIGS. 26A–C are perspective and rear elevational views of a rotational release input in accordance with the invention.
Figure 26C:
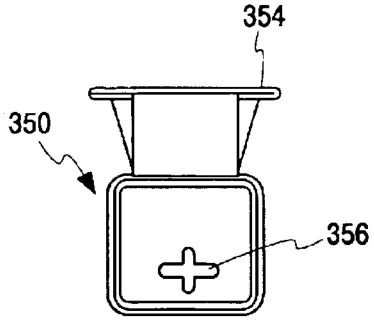
Figure 26B:
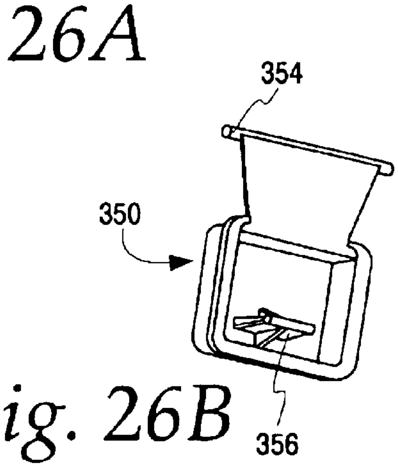
Figure 27:
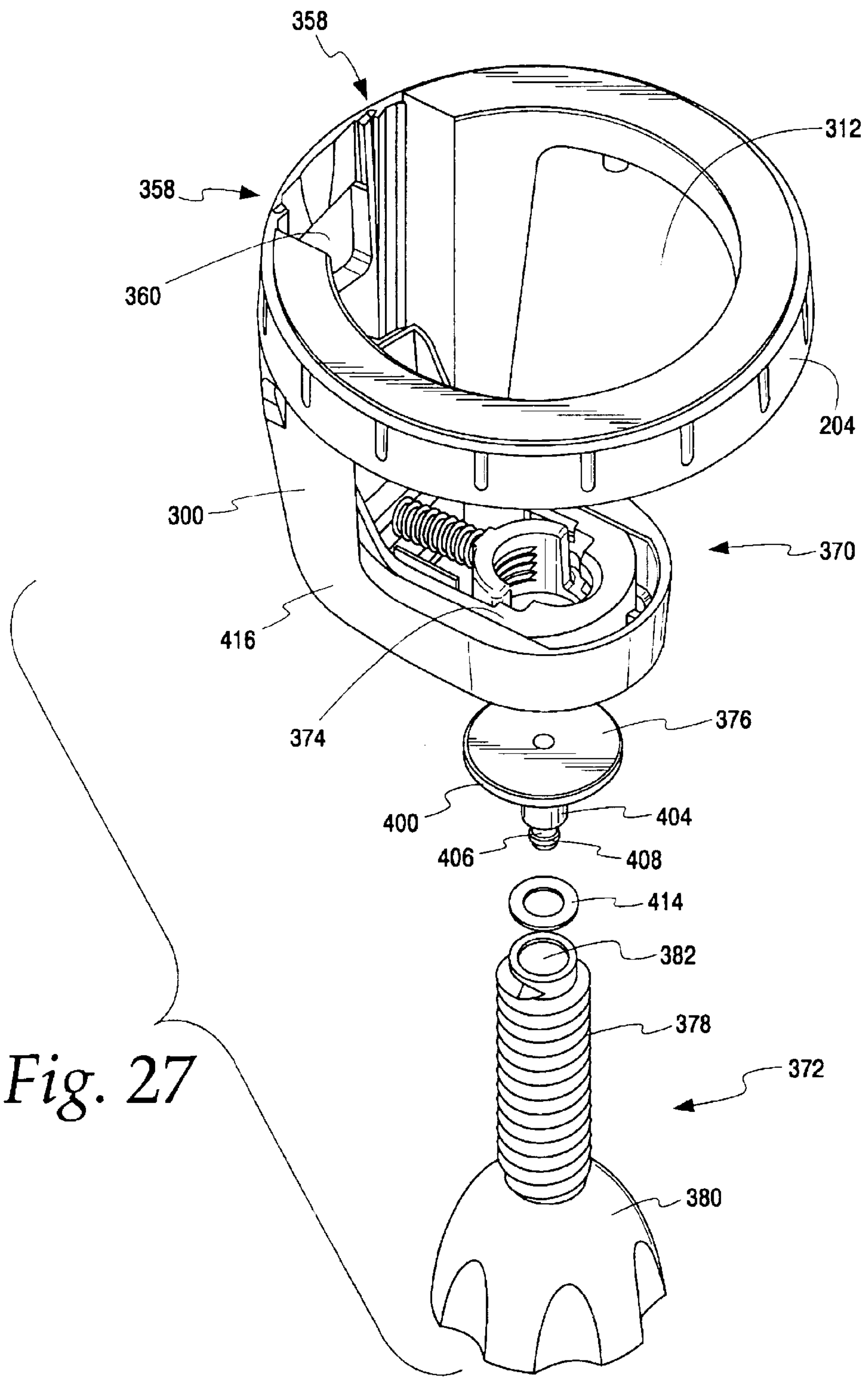
FIG. 27 is an exploded view of a lower portion of a base in accordance with the invention.

In a preferred form of the apparatus 10, the lower portion 348 of index lock 332 is pressed inward toward the interior opening 322 via a rotational release user input such as push button 350. Some profile views and an elevation view of one type of rotational release input can be seen in FIGS. 26A–C, in which the rotational release input 350 consists of a large push button surface 352 hanging from a pivot axis 354. The input 350 further includes a protruding strike member 356 which is used to press the lower portion 348 of index lock 332 and thereby remove the locking step 342 from the gap between notches 318 so that the upper base portion 202 can be rotated with respect to lower base portion 204. As shown in FIGS. 16A–B and 27, the ends of the hanging pivot axis 354 are nested in recesses 358 formed above opening 360 near the very top of lower base housing 300.

Figure 28B:
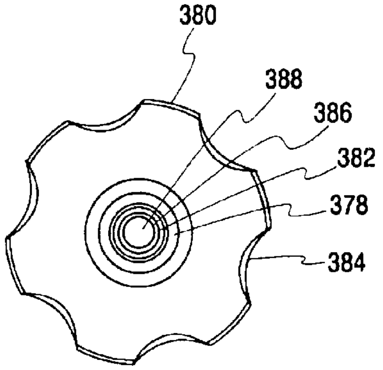
FIGS. 28A–D are side elevational, bottom and top plan, and cross section views of a portion of a base securing mechanism in accordance with the invention, respectively.
Figure 28A:
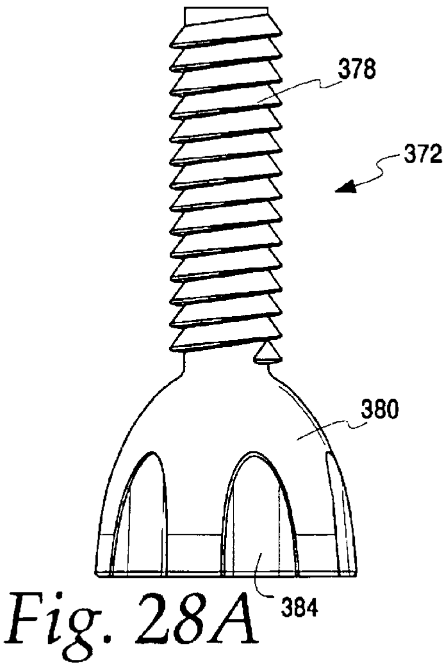
Figure 28D:
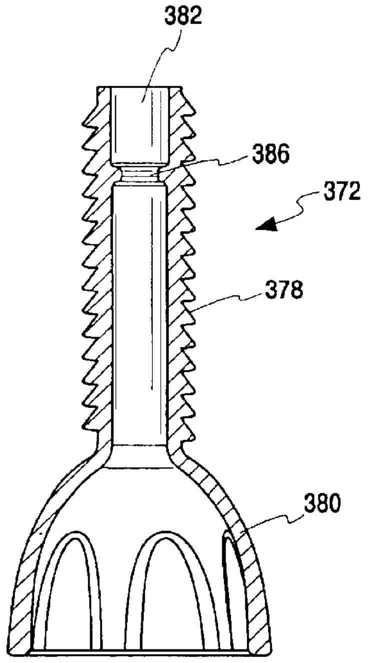
Figure 28C:
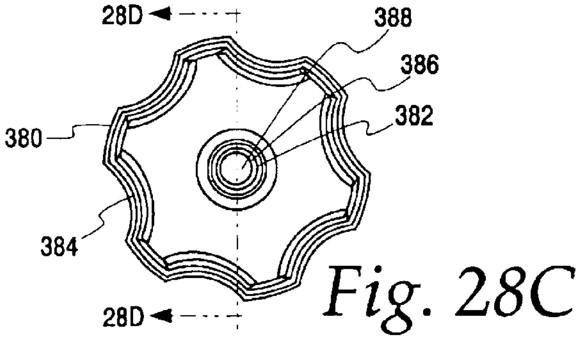

Below the rotational release mechanism 362, including indexing mechanism 314 and input 350, there is provided a base securing mechanism 370 which secures the base 18 to a work surface. In a preferred form of apparatus 10 and as shown in FIG. 27, the base securing mechanism 370 consists of an actuator such as clamp screw 372, a base support such as threaded engagement portion 374, and a work surface engaging portion such as pad 376. The clamp screw 372 includes a threaded shaft 378 having a bulbous handle 380 at one end, and an open bore 382 at the other end. FIGS. 28A–D show various views of handle 380 which is contoured with a plurality of recesses 384 to provide a gripping surface for a user to operate securing mechanism 370. FIG. 28A is a elevational view of the clamp screw 372, clearly showing the threads of threaded shaft 378 and the recesses 384 of handle 380. FIG. 28B is a top plan view of clamp screw 372 showing the bore 382 and an inner collar 386 within the bore 382 defining an inner opening 388. FIG. 28C is a bottom plan view of the clamp screw 372 in which the other end of bore 382 and inner collar 386 can be seen. A cross section view of FIG. 28C is taken along line A—A and is shown in FIG. 28D. FIG. 28D more clearly shows the length and shape of bore 382, and inner collar 386 which defines inner opening 388.

Figure 29B:
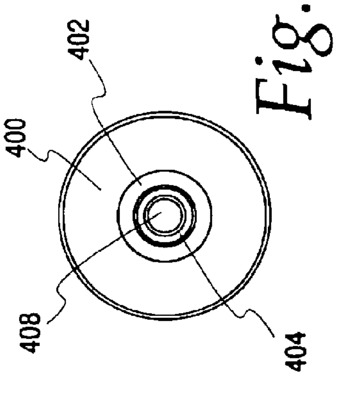
FIGS. 29A–C are side elevational and top and bottom plan views of a work surface engaging pad in accordance with the invention, respectively.
Figure 29A:
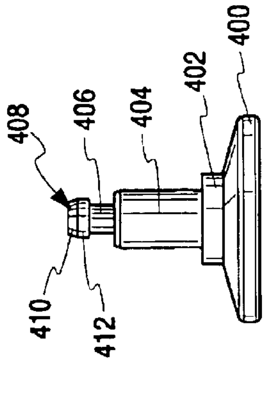
Figure 29C:
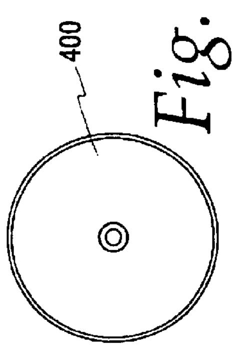

Turning now to FIGS. 27 and 29A–C, which show multiple views of the work surface engaging pad 376. FIG. 29A is a side elevational view of pad 376 which is inserted into bore 382 of base securing mechanism 370, and is secured thereto via a cam-and-socket type engagement. The pad 376 includes a disk-shaped support member 400 having a base 402 and shaft 404. The support member 400 makes physical contact with the work surface and is therefore preferably made of a non-marking material such as rubber. Located on the end of shaft 404 opposite base 402 is post 406 and anchor (or cam) member 408 which are used to mate with inner collar 386 of bore 382 in a cam-and-socket type engagement. The post 406 is of a smaller diameter than shaft 404 and anchor member 408 is of a slightly larger diameter than inner opening 388 of collar 386. The anchor member 408 has a traditional angled cam surface 410 with a shoulder 412, and may be pressed through inner collar opening 388 via the angled cam surface 410 wherein shoulder 412 prevents the anchor from being easily removed back out of the collar 386. With this configuration, the pad 386 may be inserted into bore 382 such that the anchor member 408 will be pressed through collar 386 and used to anchor or secure the pad 376 to the clamp screw 372 via shoulder 412 which has a slightly larger diameter than opening 388. The post 406 rests within collar 386 and the remainder of the shaft 404 rests in bore 382. The base 402 is of a diameter slightly larger than the diameter of the bore 382 so that it cannot pass therethrough and will support the pad 376. In order to prevent unnecessary wear between the base 402 and threaded shaft 378, a metal washer 414 may be inserted over the shaft 404 and between the base 402 and threaded shaft 378, as shown in FIG. 27, to provide a protective bearing surface between components of the base securing mechanism 370.

Figure 30A:
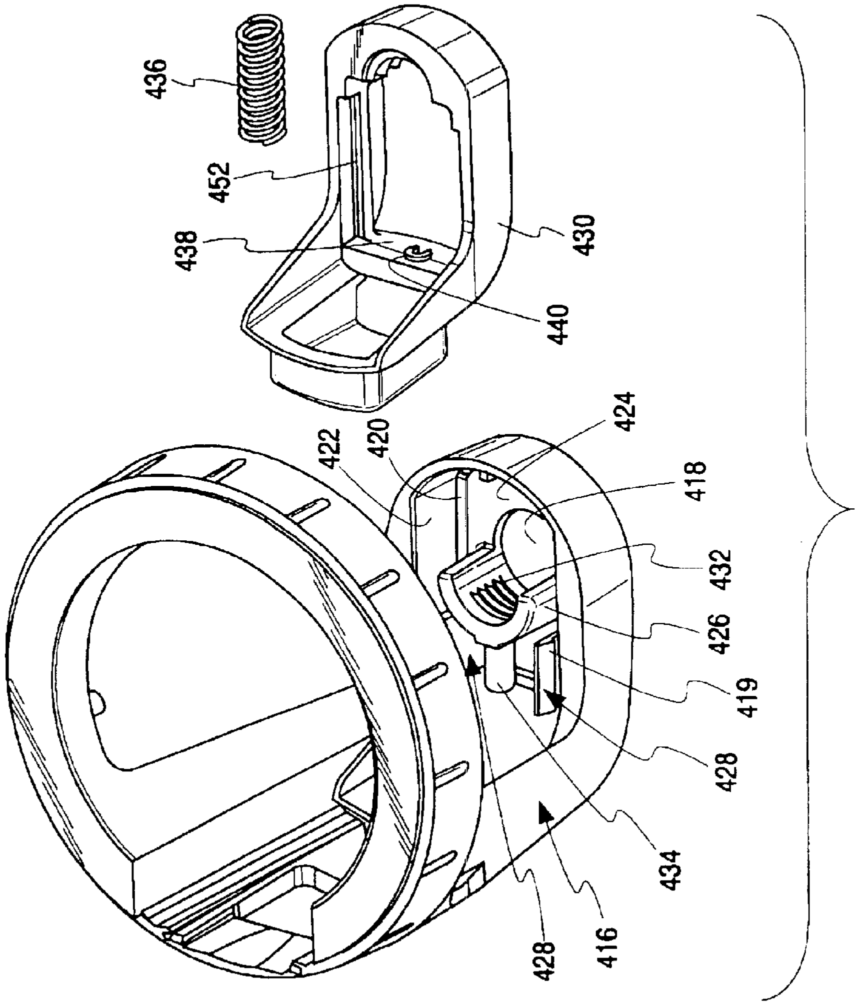
FIGS. 30A–B are partially exploded and assembled perspective views of a lower base portion illustrating a quick release mechanism for releasing the base from a work surface in accordance with the invention.
Figure 30B:
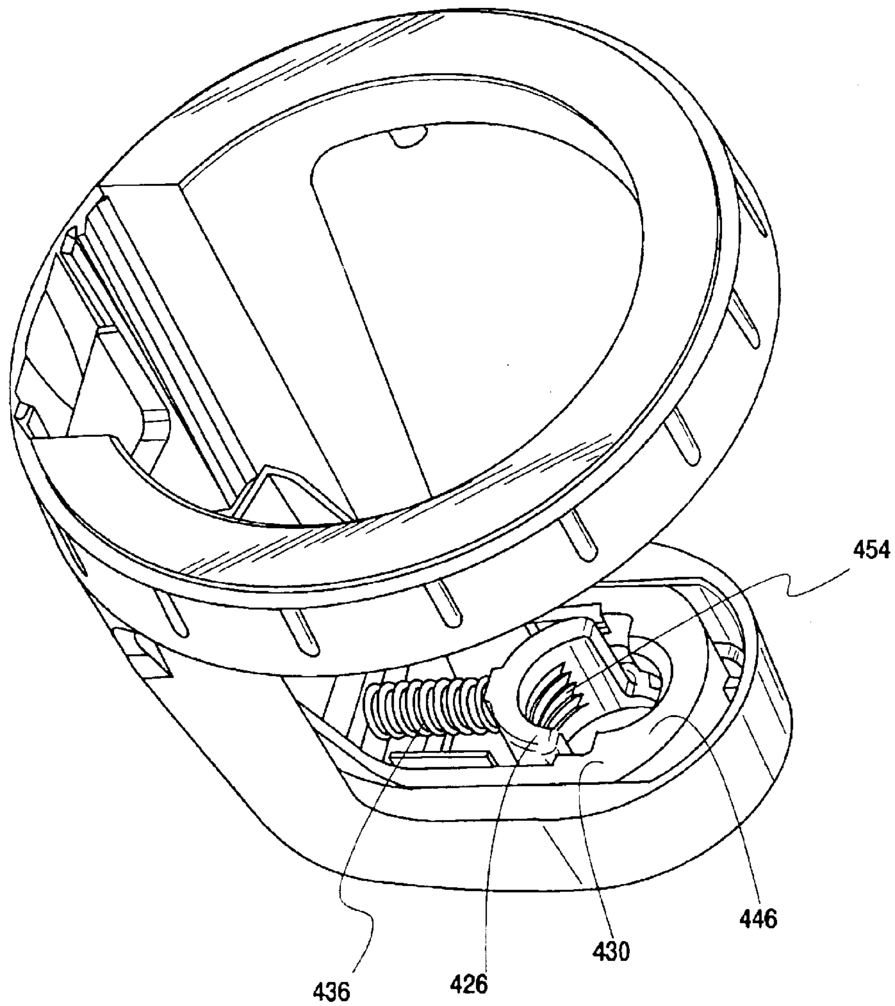
Figure 31B:
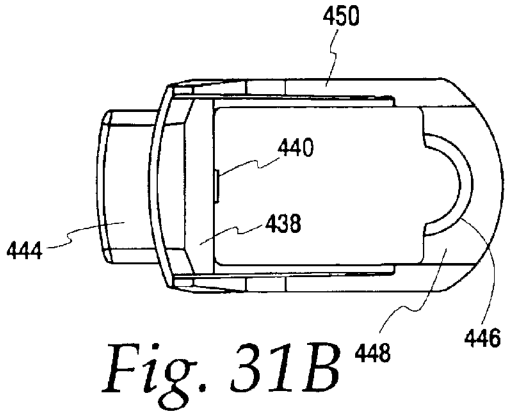
FIGS. 31A–D are perspective, bottom plan, side elevational and top plan views of a portion of a quick release mechanism in accordance with the invention.
Figure 31A:
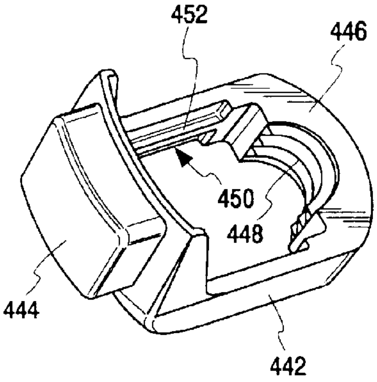
Figure 31C:
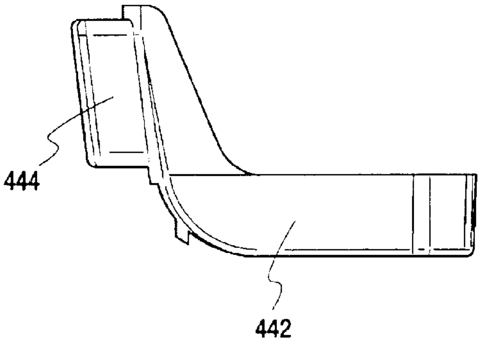
Figure 31D:
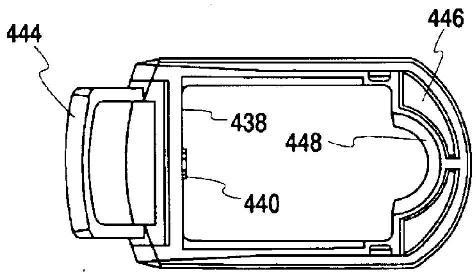

In a preferred form of apparatus 10, and as shown in FIGS. 27 and 30A–B, the base support 374 consists of a threaded engagement portion which is nested in a lower base extension 416 of lower base portion 204. The base support 374 provides a threaded opening 418 through which the clamp screw 372 may pass. More particularly, the base extension 416 is a generally L-shaped member extending down below the rotational release mechanism 362 which defines opening 418. The base extension 416 includes a nesting recess 420 having a sidewall 422 and a lower floor 424 within which opening 418 can be found. Positioned about the floor 424 are semi-annular wall 426 and nesting clips 428 which are used to secure release mechanism 430. Release mechanism 430 is capable of releasing the base securing mechanism 370 so that the base 18 and/or apparatus 10 can be repositioned or moved. The semi-annular wall 426 extends up from the floor 424 adjacent opening 418, and includes threading 432 along the inner surface of the semi-annular wall 426. The threading 432 is positioned to engage the clamp screw 372 once it is inserted through opening 418.

Extending outward from the wall 426 is a spring guide 434 which is used to position a spring 436 between the semi-annular wall 426 and a back stop 438 located on the release mechanism 430. The spring guide is generally cylindrical in shape and extends out from the wall 426, parallel to the floor 424. In a preferred form of apparatus 10, the back stop 436 also includes a guide 438 which consists of a raised surface over which the spring 436 will be placed. As shown in FIGS. 31A–D, the release mechanism 430 includes a threaded half-nut portion 442 and a user input, such as pushbutton 444. The threaded half-nut portion 442 includes a semi-annular wall 446 which includes threading 448 for engaging the clamp screw 372 once it is inserted through opening 418 defined by half-nut portion 442 and semi-annular wall 426. Located on the inner walls 450 of the threaded half-nut portion 442 are shoulder surfaces 452 which are used to engage the lip 429 of nesting clip 428.

FIG. 30B is an assembled view of the lower base portion 204 in which the release mechanism 430 is nested in the recess 420 via clips 428. The spring 436 is placed over the spring guide 434 and against the back stop 438. As mentioned above, the back stop will preferably have a guide 440 in order to center the spring 436 on the back stop 438. The spring 436, once installed, will be under compression thereby applying a force against the backstop 438. This force, causes the semi-annular wall 446 of the threaded half-nut portion 442 to be pulled towards the semi-annular wall 426 of the base extension 416, which effectively makes these portions operate as a threaded annular ring or nut 454 through which the clamp screw 372 is fed.

In order to tighten the base 18 to a work surface, the base 18 is positioned so that at least a portion of the work surface is placed between the rubber feet 303 (FIG. 16B) and pad 376. In order to secure the base 18 to the workpiece, the clamp screw 372 is threaded through the annular ring 454 of the release mechanism 430 until the workpiece is securely held between the feet 303 and pad 376. Should the user accidentally tighten the clamp screw 372 too tight, the release mechanism 430 will release enough to prevent the threads of threaded shaft 378 from being stripped. Alternatively, if the apparatus user wishes to rapidly release the securing mechanism 370, he or she may simply actuate the release mechanism 430 via input 444 thereby disengaging the clamp screw 372 from the annular ring 454 and releasing the work surface.

Once the base 18 has been secured, the elongate member 16 can be attached to the base 18 by checking to make sure the actuating lever 214 is in the elongate member release position and sliding the member 16 into the receiving slot 210. Once the elongate member 16 is fully inserted into the receiving slot 210, the actuating lever 214 can be moved to the elongate securing position thereby causing the securing mechanism 212 to secure member 16. The orientation of the upper base portion 202 (and elongate member 16 if attached) can be adjusted by actuating the rotational release mechanism 362 via input 350 and rotating the upper base portion 202 until the member 16 is in the desired orientation or position. With this configuration, the apparatus 10 may be used in a variety of ways, including: vise; bar clamp; work station; spreader; and free standing bar clamp.

Figure 32:
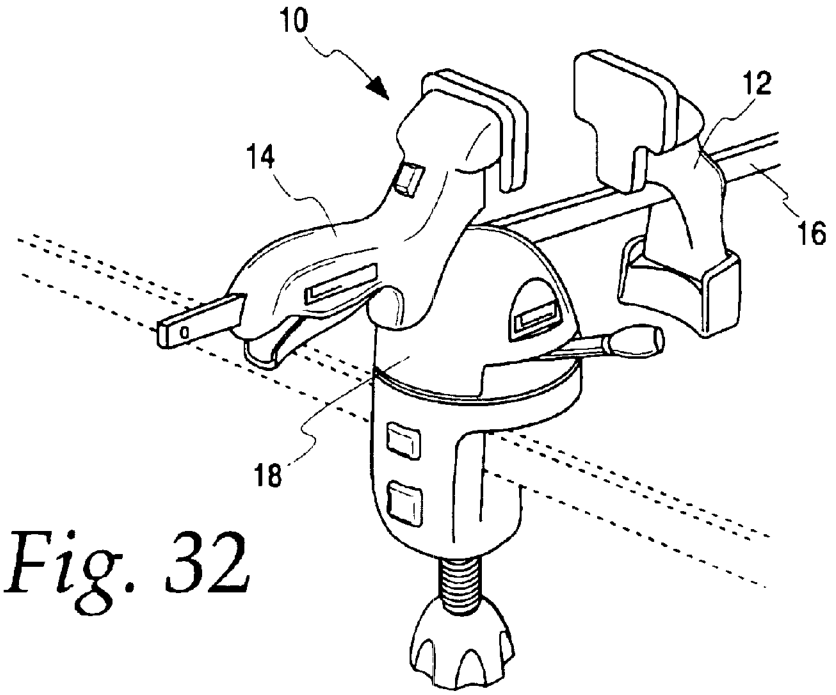
FIG. 32 is a perspective view of an apparatus for securing a workpiece in accordance with the invention in which the apparatus is setup in a vise configuration.

FIG. 32 shows a perspective view of apparatus 10 wherein the apparatus is used as a vise. As shown, the base 18 is tightened or secured to a bench top work surface and support structure 104 is placed under the stationary clamp 12 to support the clamp 12 and/or the workpiece. To tighten the clamp on the workpiece, the trigger mechanism 160 is actuated thereby advancing the movable clamp 14 toward the workpiece. As is apparent in FIG. 32, the housings of clamp members 12 and 14 are contoured to match the shape of the base 18 so that apparatus is both ergonomically pleasing, and capable of being positioned on the elongate member 16 adjacent the base 18 which in turn offers added support to the clamp member.

Figure 33:
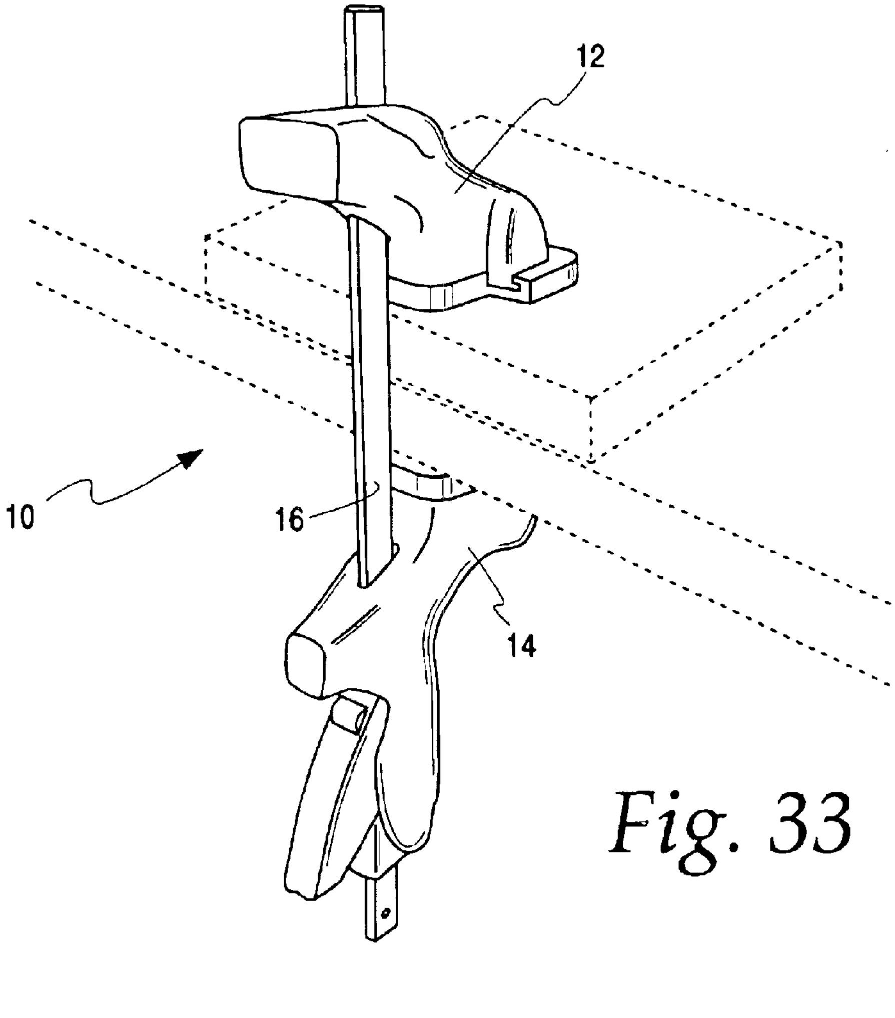
FIG. 33 is a perspective view of an apparatus for securing a workpiece in accordance with the invention in which the apparatus is setup in a bar clamp configuration.

FIG. 33 shows a perspective view of apparatus 10 wherein only the elongate member 16 and clamps 12 and 14 are used in a traditional bar clamp fashion. In some applications it may be desirable to clamp the workpiece using the bar clamp and then transport the workpiece to the base 18 for additional work and/or support. In other applications, multiple bar clamps may be used.

Figure 34:
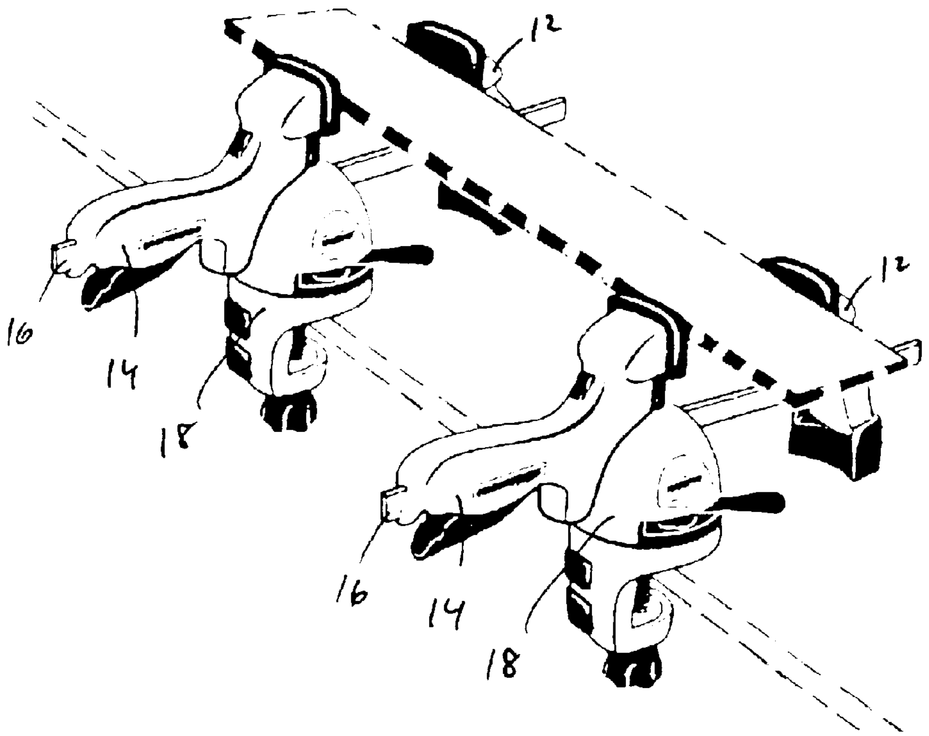
FIG. 34 is a perspective view of apparatus for securing a workpiece in accordance with the invention in which the apparatus are setup in a work station configuration.

FIG. 34 shows a perspective view of the apparatus 10 wherein the apparatus is used in tandem with a similar apparatus and as a work station. This configurations allows larger workpieces to be worked on and/or provides additional support for workpieces. Again, support structures 104 are used with the stationary clamps 12.

Figure 35A:
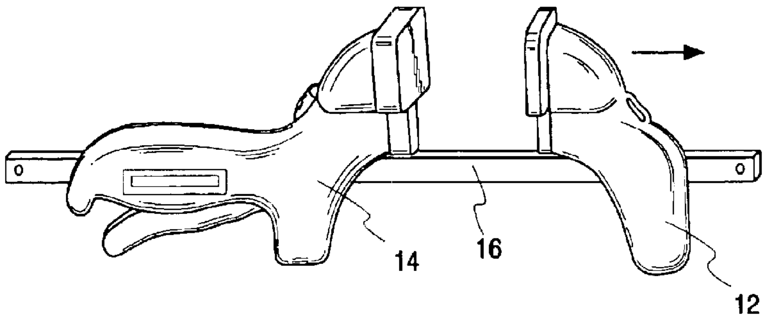
FIGS. 35A–C are perspective views of an apparatus for securing a workpiece in accordance with the invention in which the apparatus is setup in a spreader configuration.
Figure 35B:
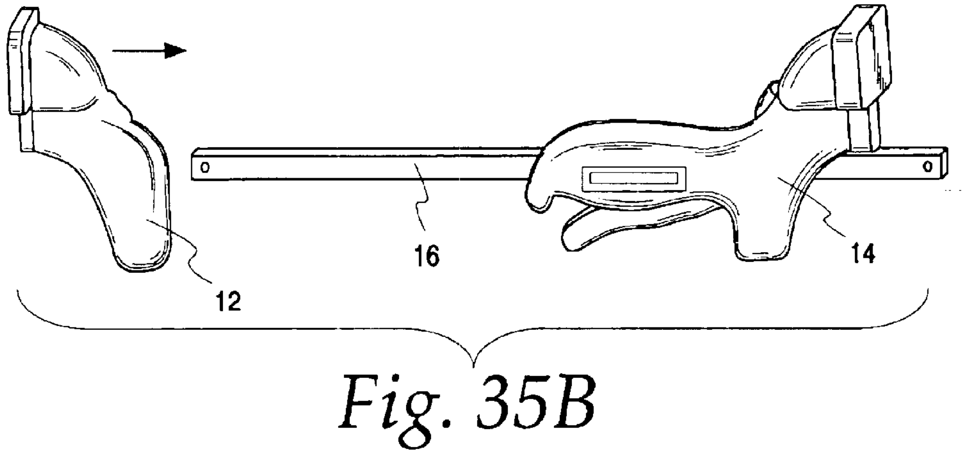
Figure 35C:
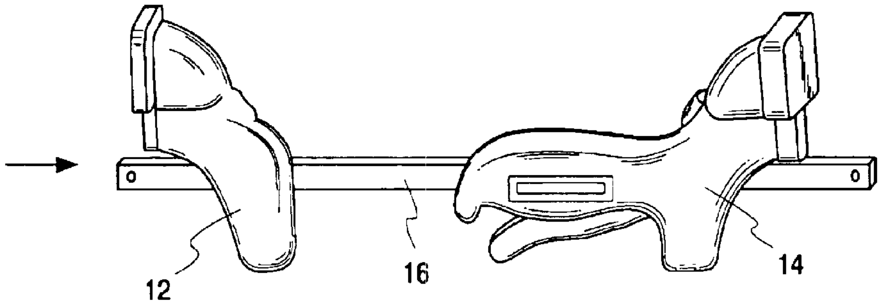

FIGS. 35A–C show perspective views of the apparatus 10 wherein only the elongate member 16 and clamps 12 and 14 are used in a traditional spreader fashion. In order to use the apparatus as a spreader, while it is setup in the bar clamp configuration from FIG. 33, the stationary clamp 12 is removed off of the elongate member 16 (FIG. 35A), and the movable member is advanced down the elongate member 16 to make room for the stationary clamp on the elongate member 16 (FIG. 35B). The stationary clamp 12 is then placed on the opposite side of the elongate member 16, (e.g., opposite from where it was), with its jaw pad 62 facing opposite the jaw pad 132 of the movable clamp 14 (FIG. 35C). To further spread the workpiece, the trigger mechanism 160 is activated advancing the movable clamp 14 away from the stationary clamp 12.

Figure 36:
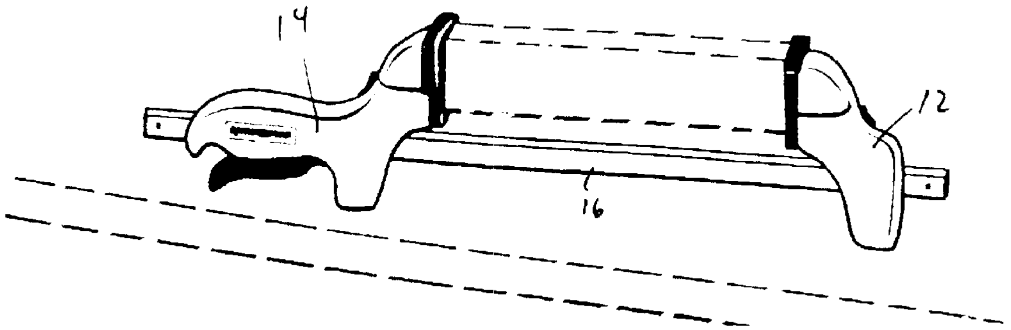
FIG. 36 is a perspective view of an apparatus for securing a workpiece in accordance with the invention in which the apparatus is setup in a free standing bar clamp configuration.
Figure 1:
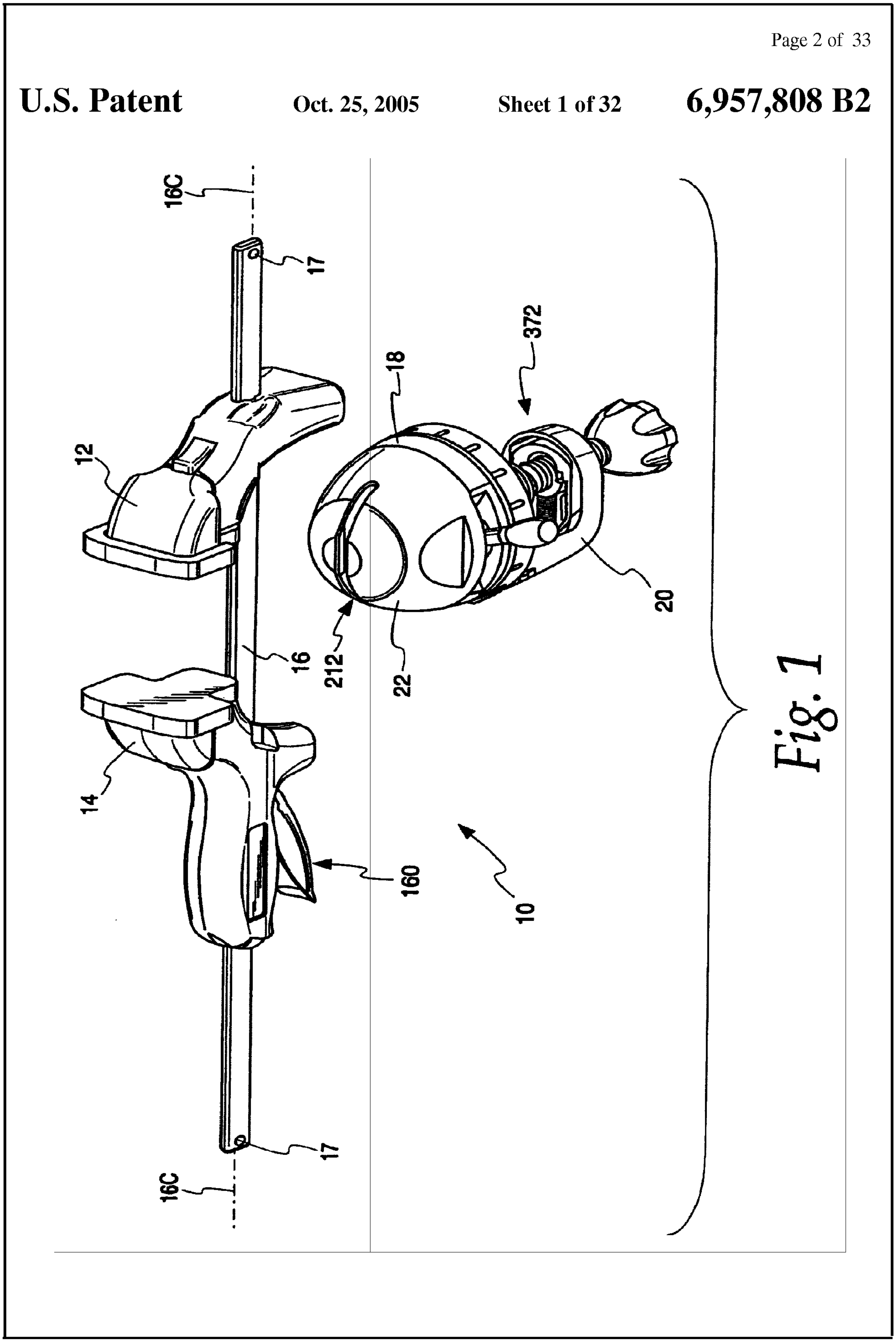
Figure 2:
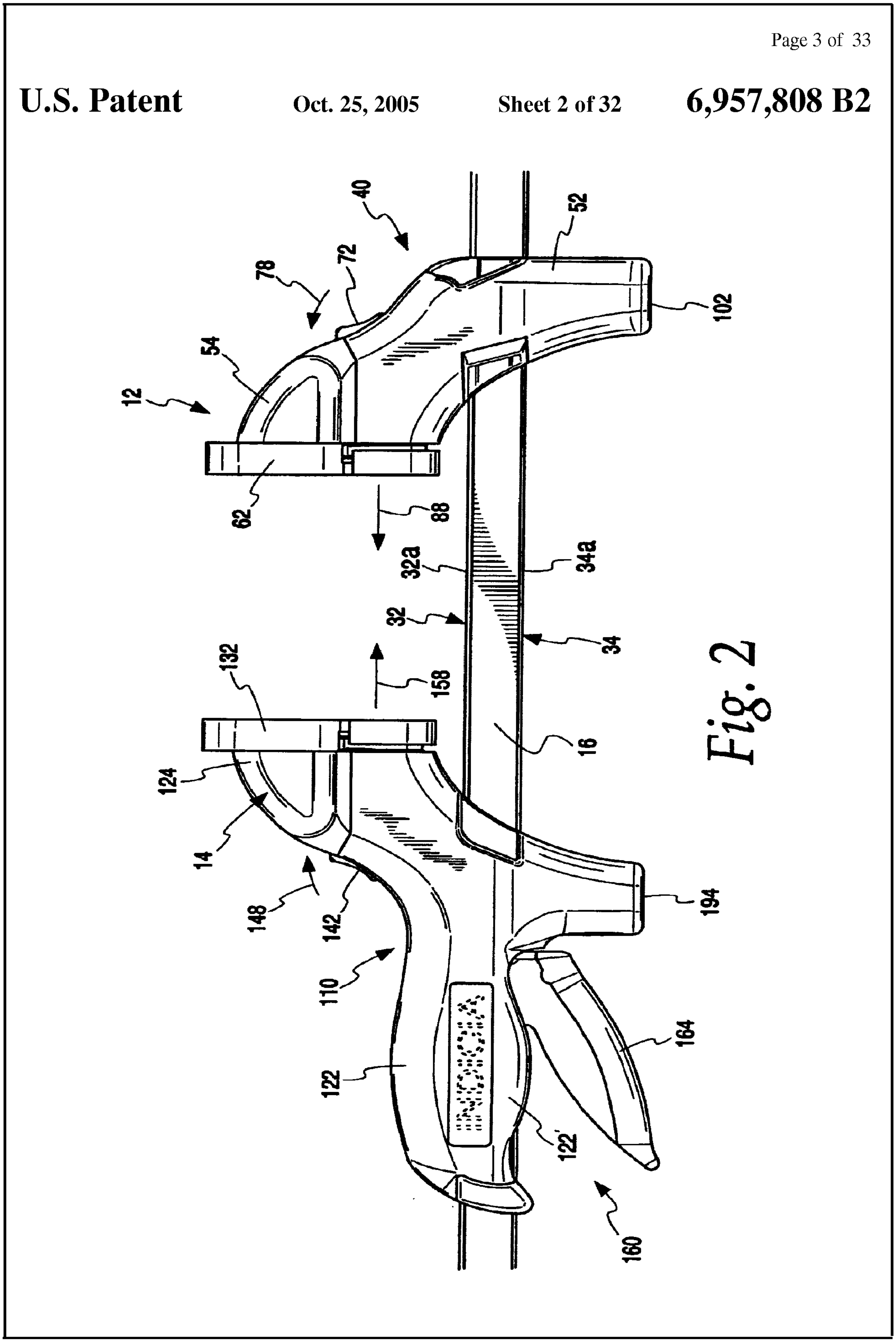
Figure 3:
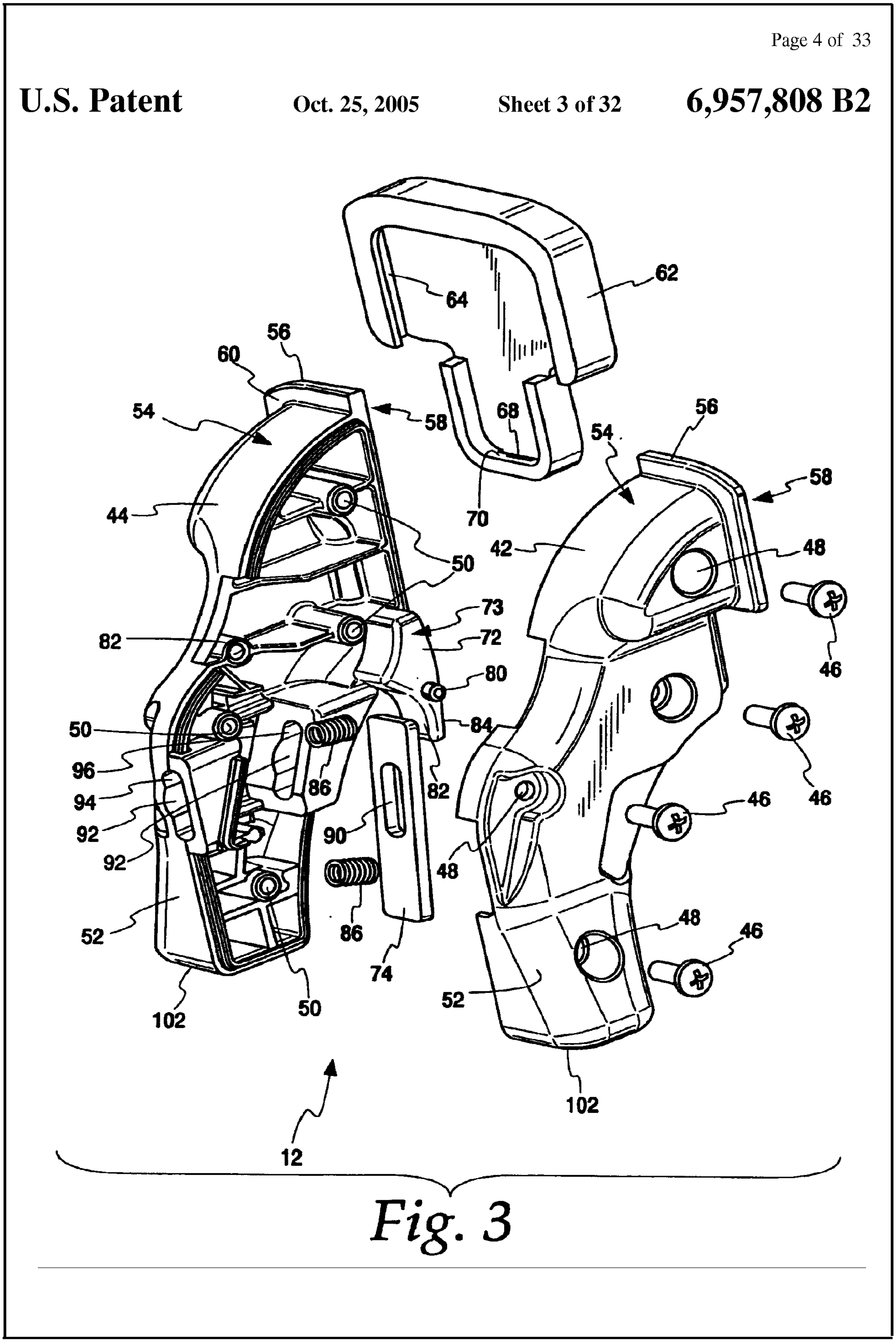
Figure 4:
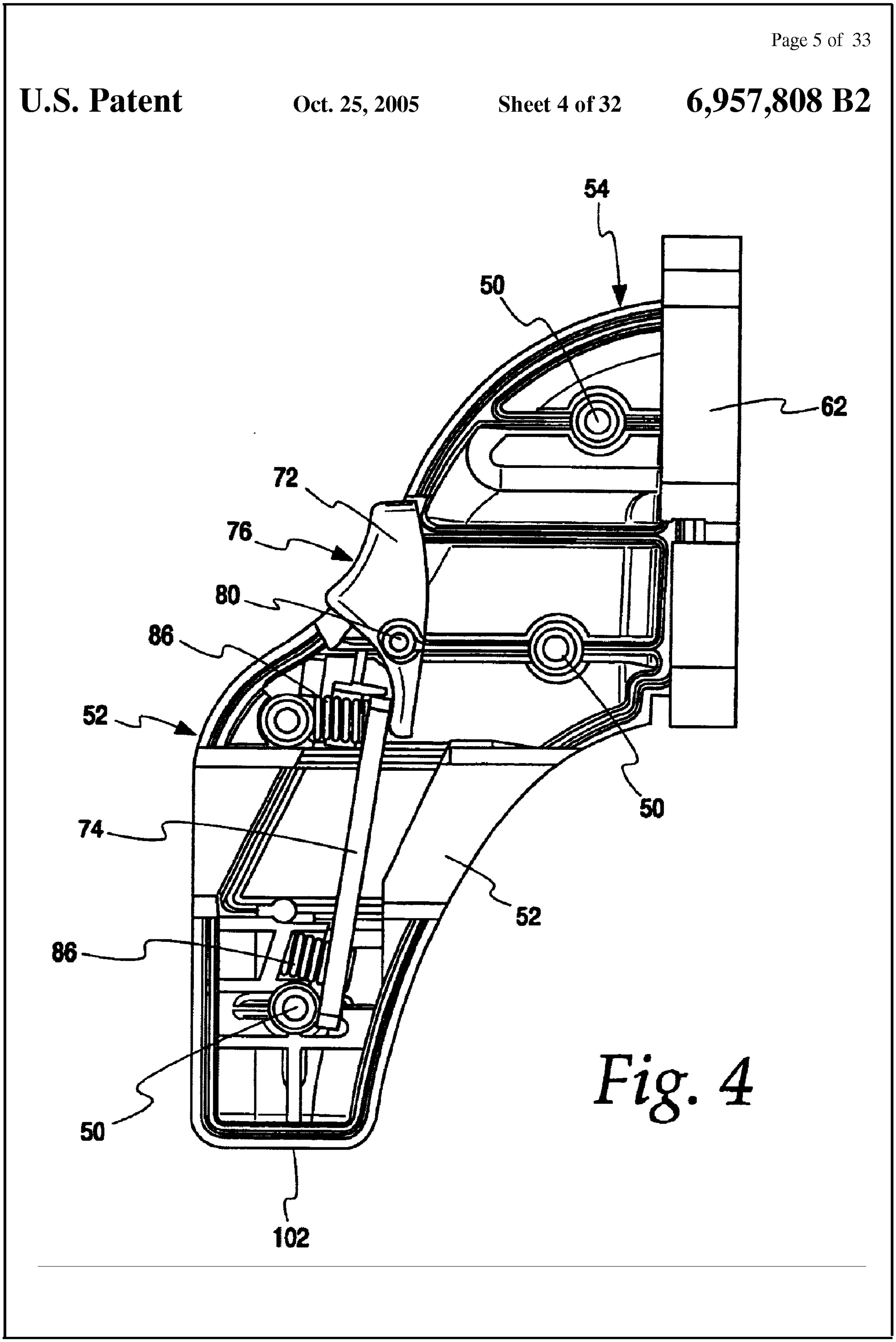
Figure 5A:
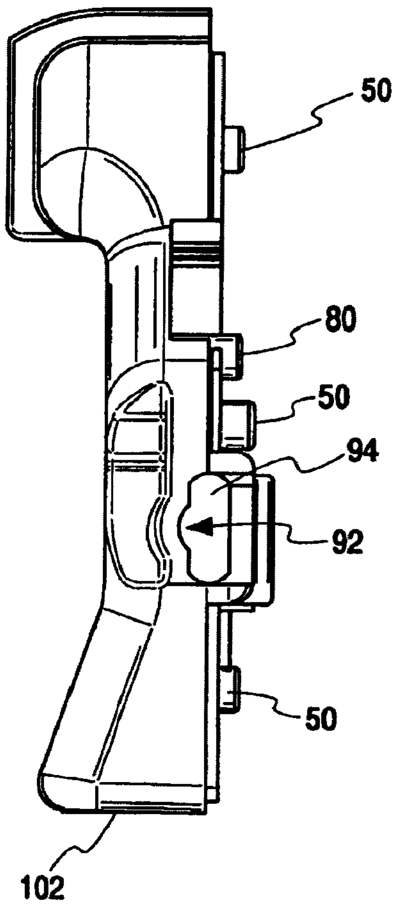
Figure 5B:
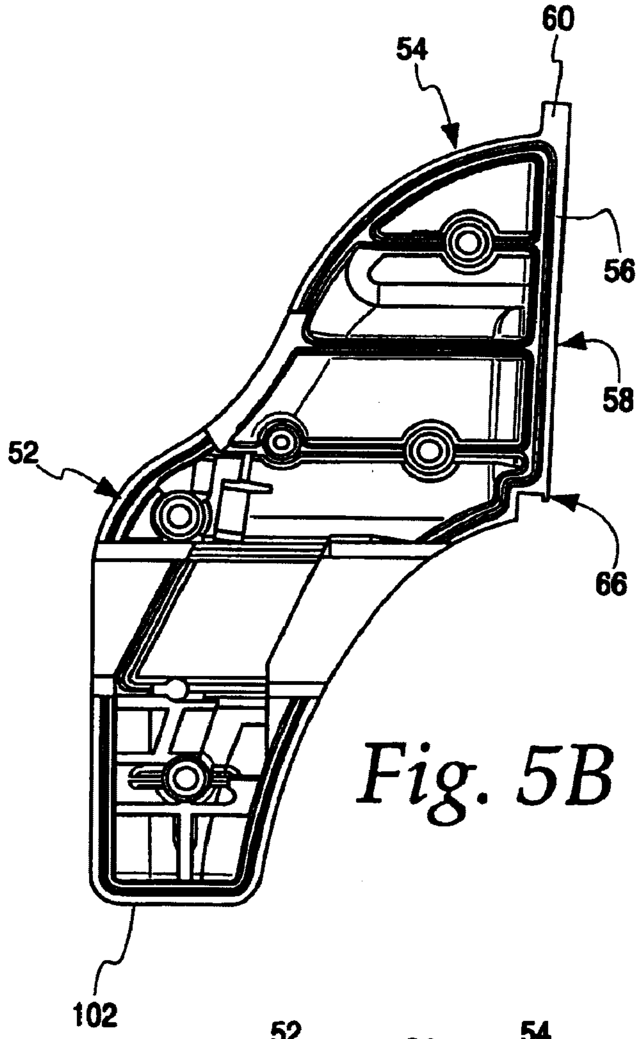
Figure 5C:
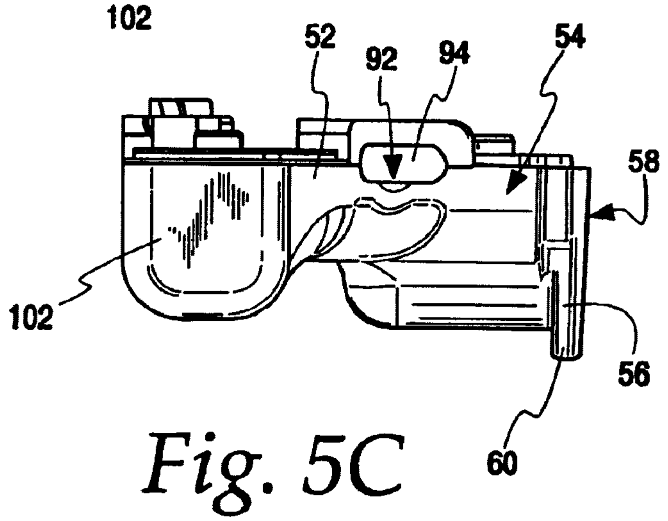
Figure 6:
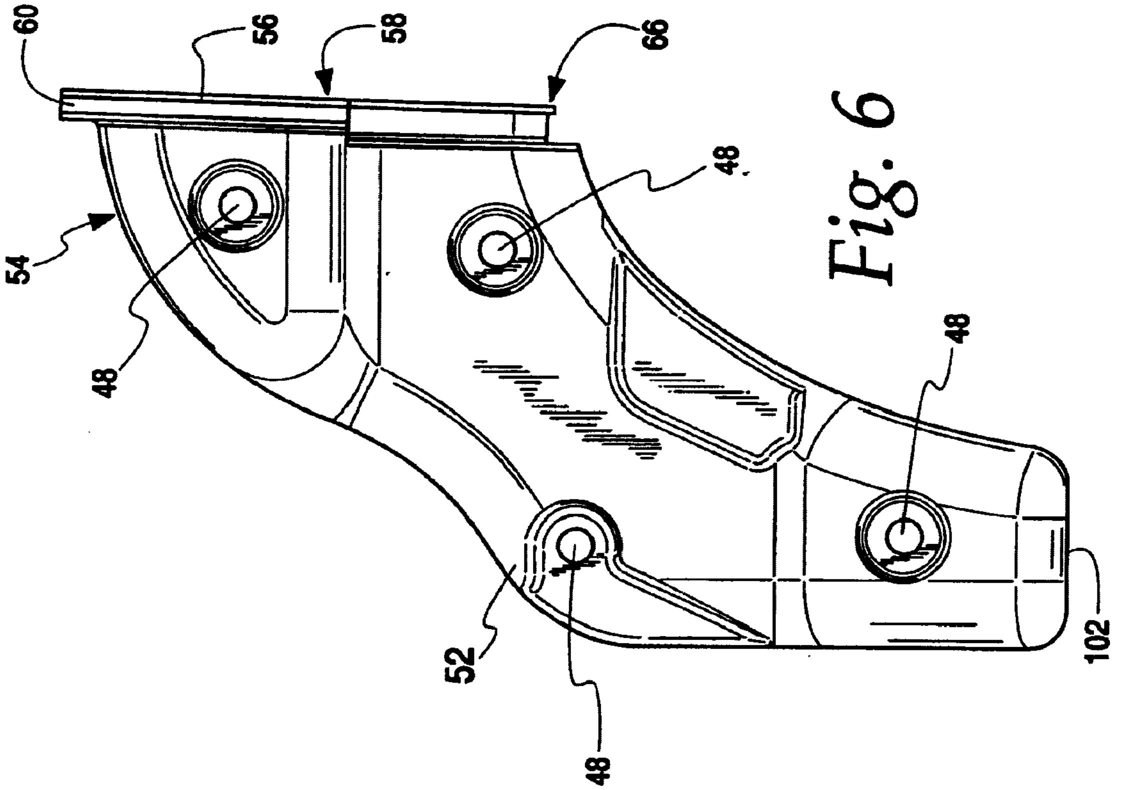
Figure 7A:
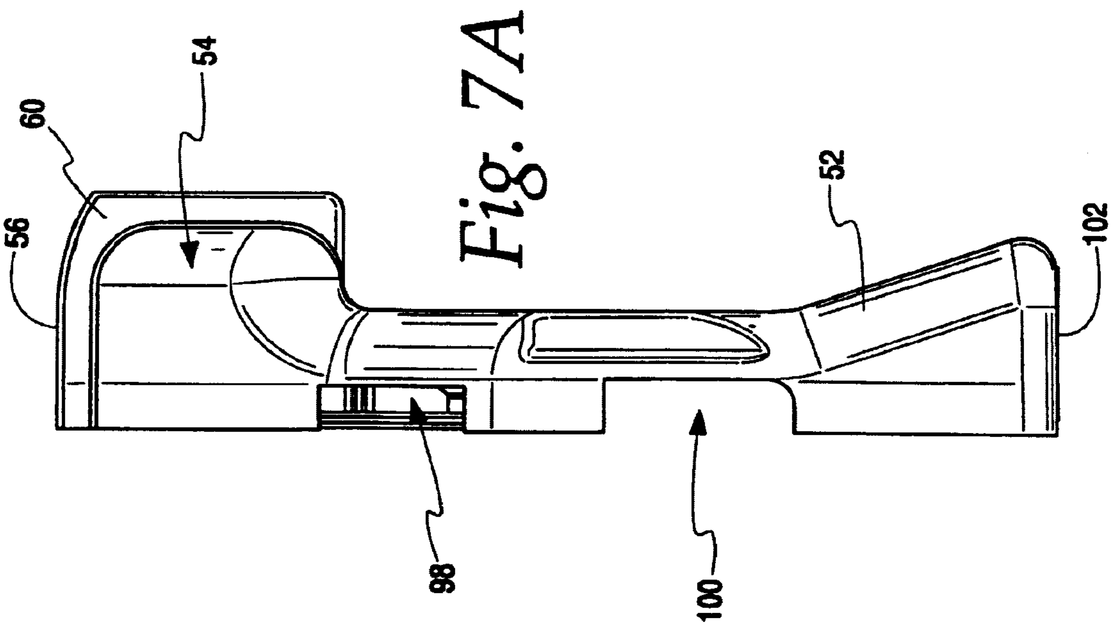
Figure 7B:
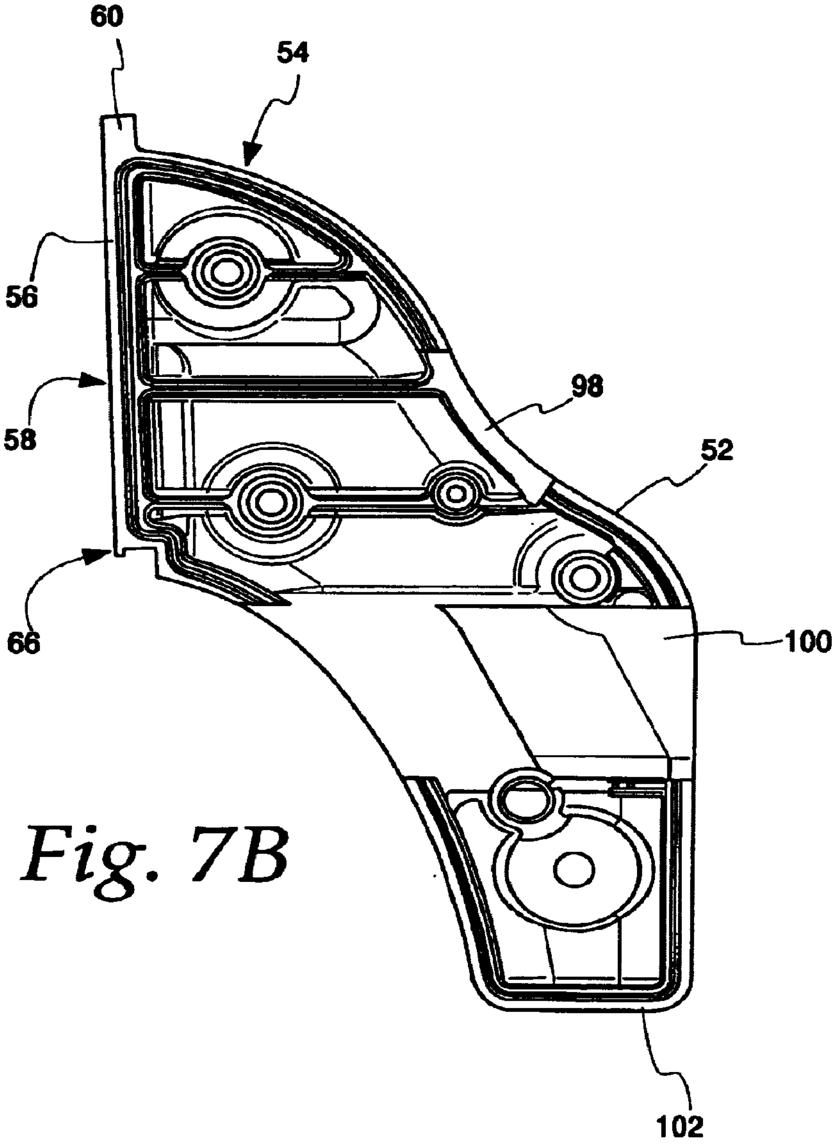
Figure 7C:
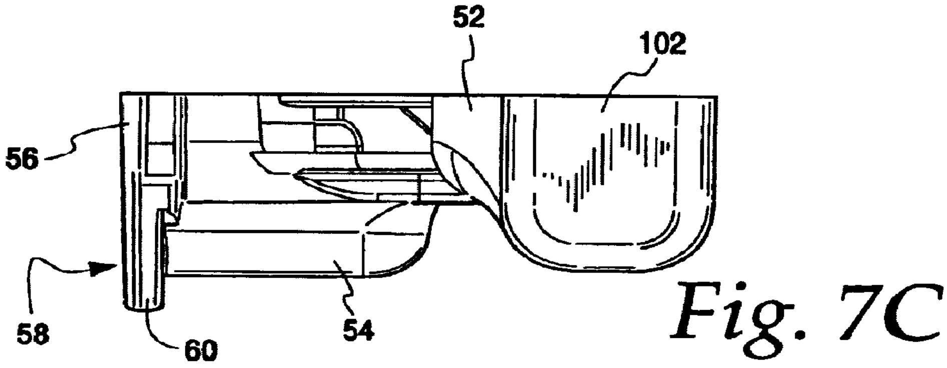
Figure 8:
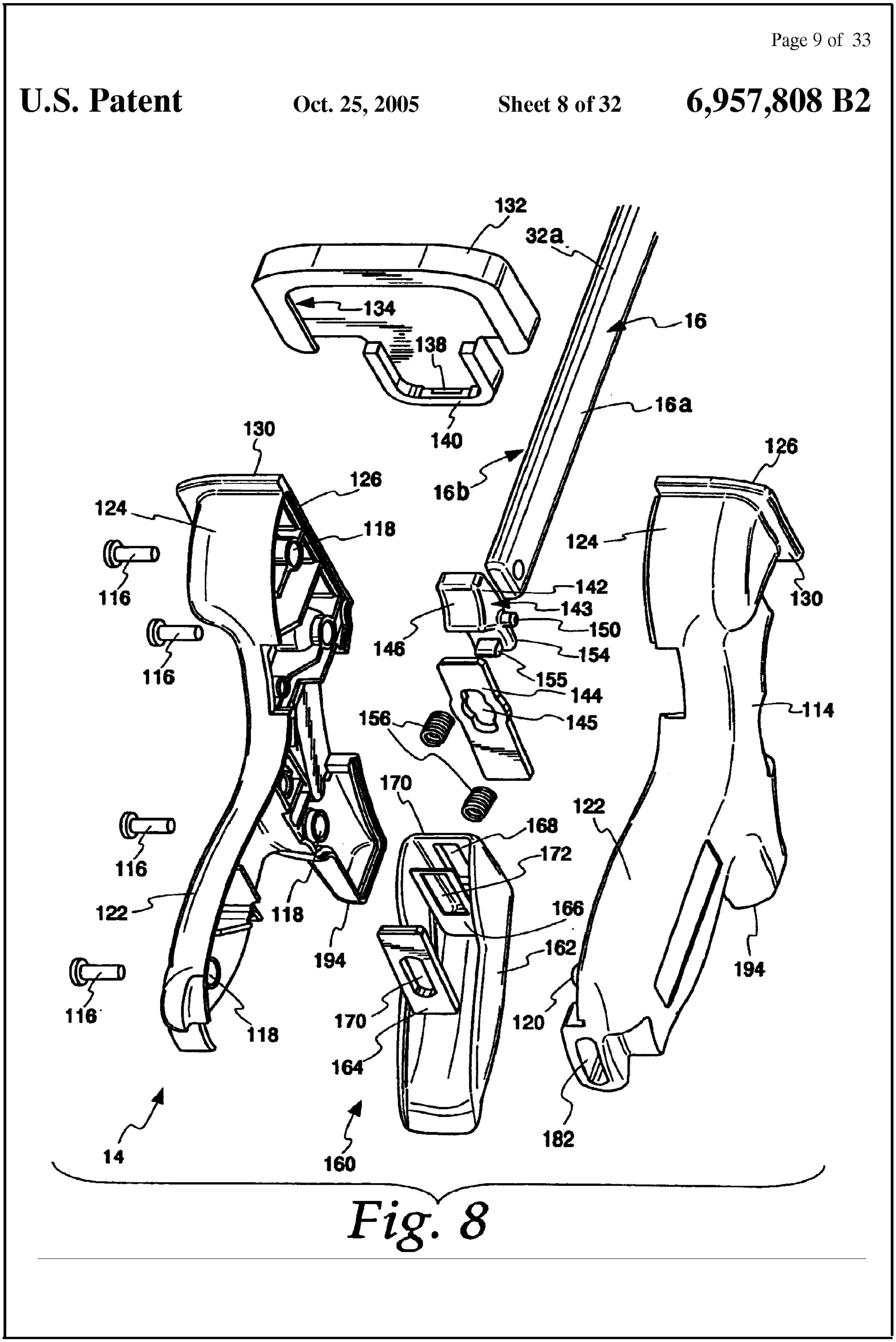
Figure 9:
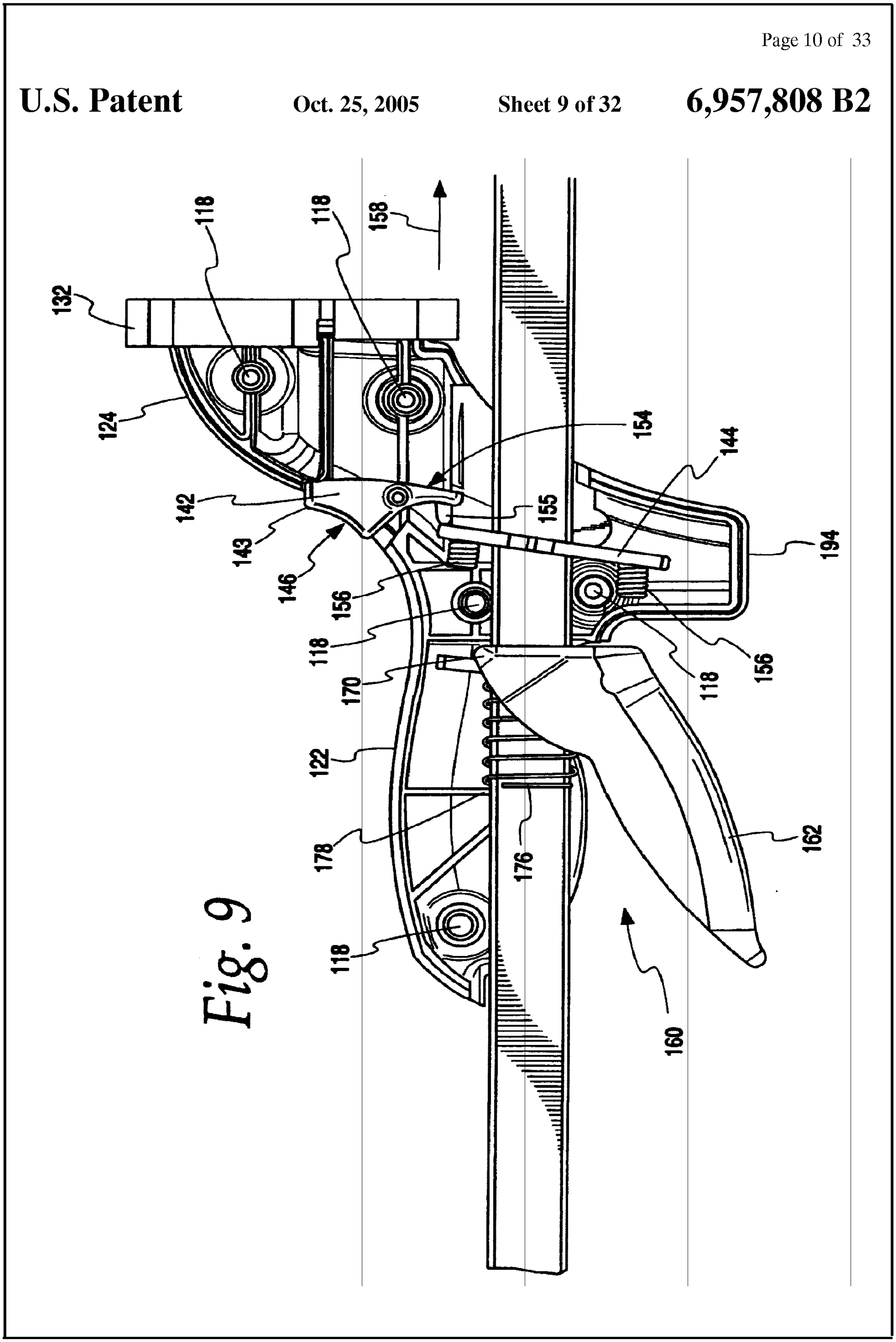
Figure 10A:
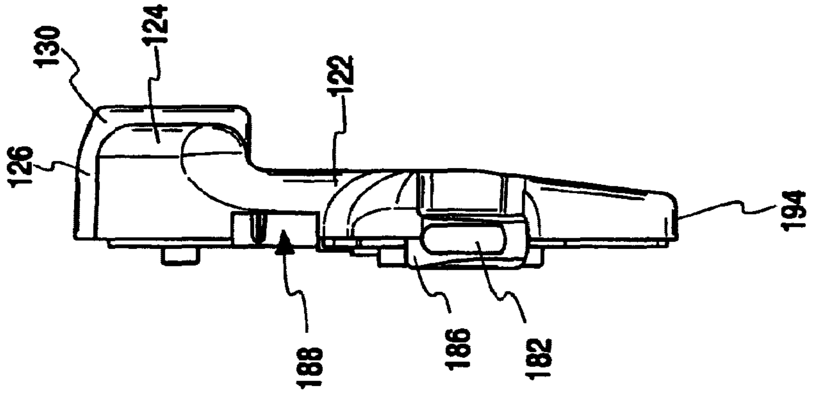
Figure 10B:
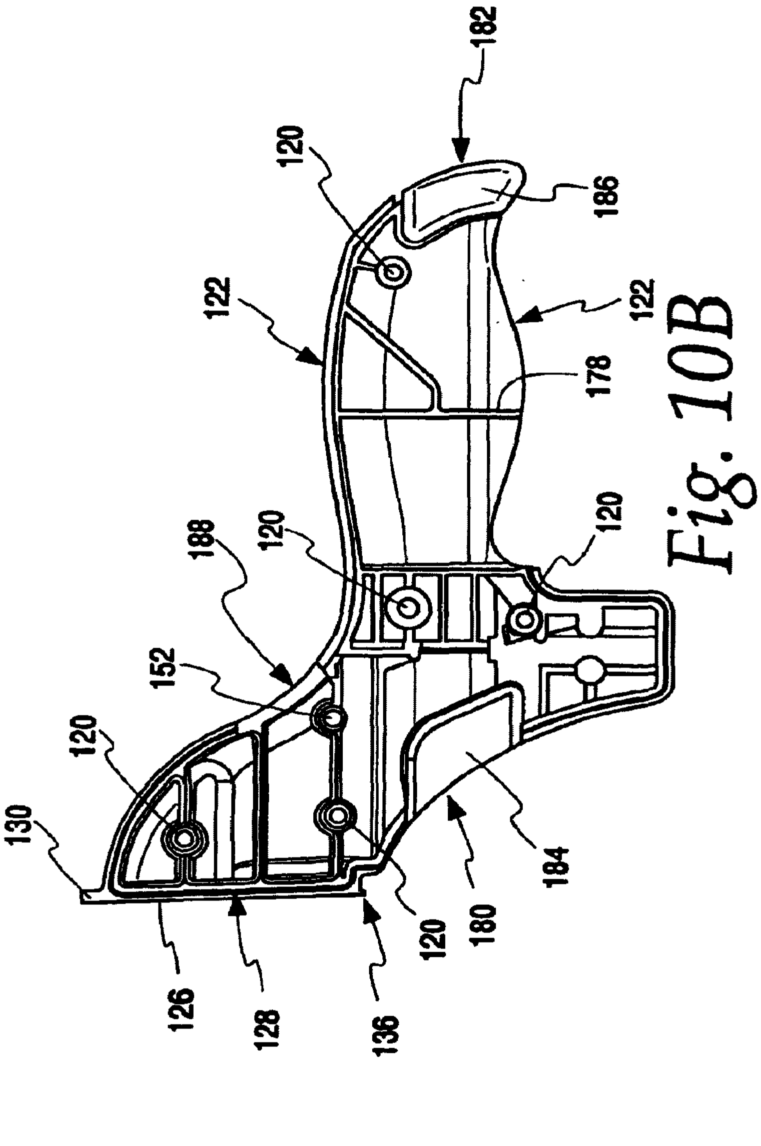
Figure 10C:
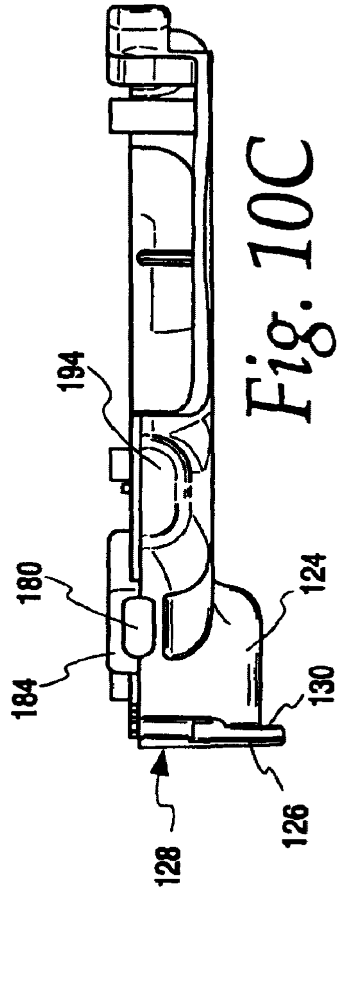
Figures 11A, 11B, 11C:
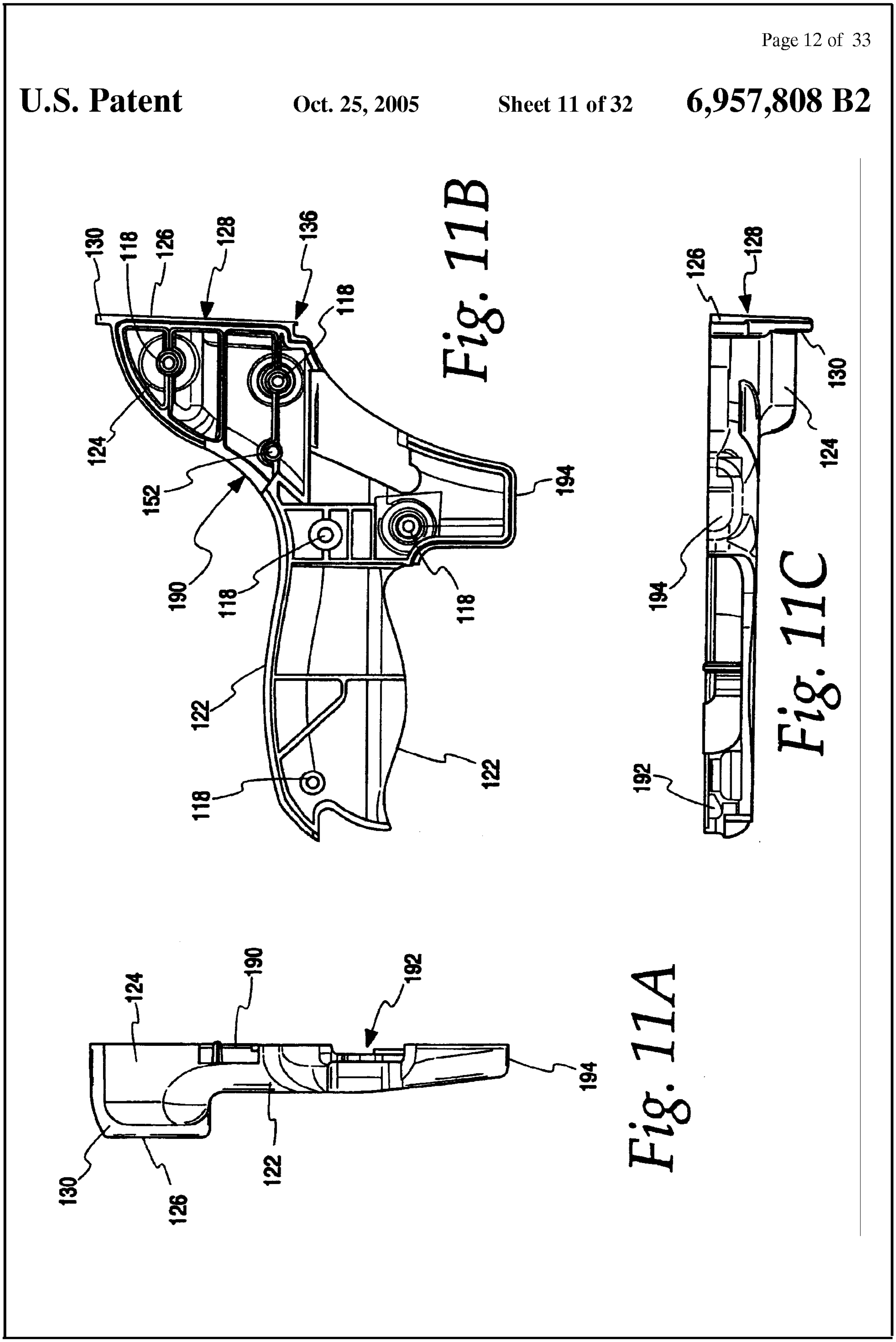
Figure 12B:
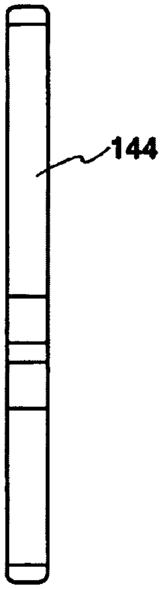
Figure 12A:
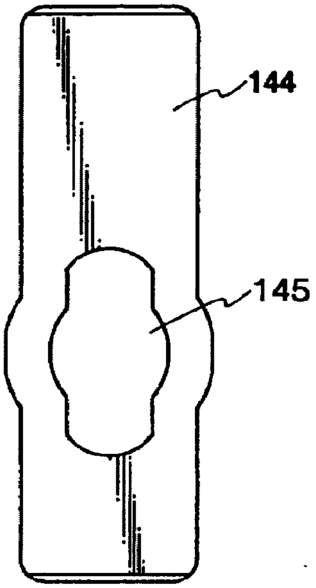
Figure 13A:
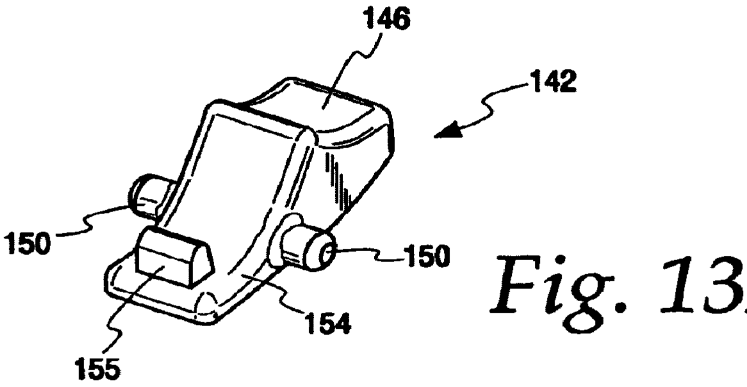
Figure 13B:
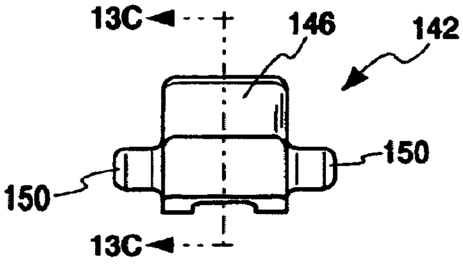
Figure 13C:
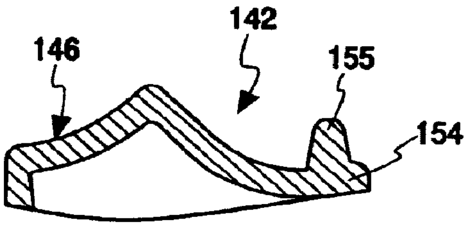
Figure 14C:
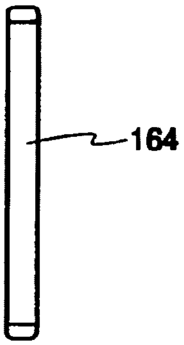
Figure 14B:
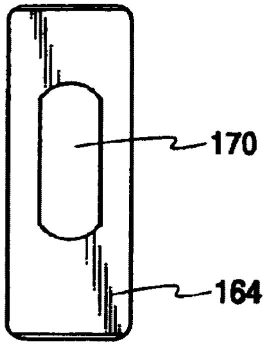
Figure 14A:
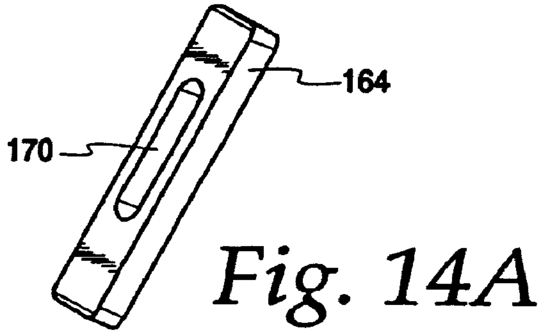
Figure 15A:
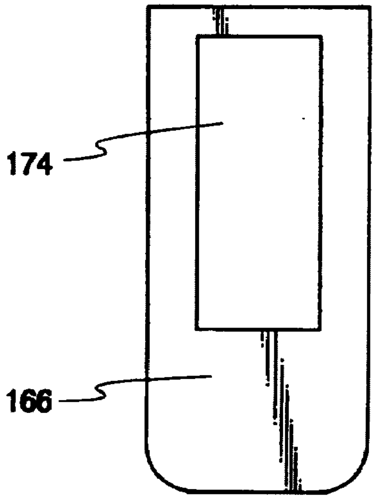
Figure 15B:
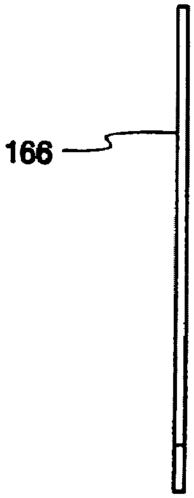
Figure 16A:
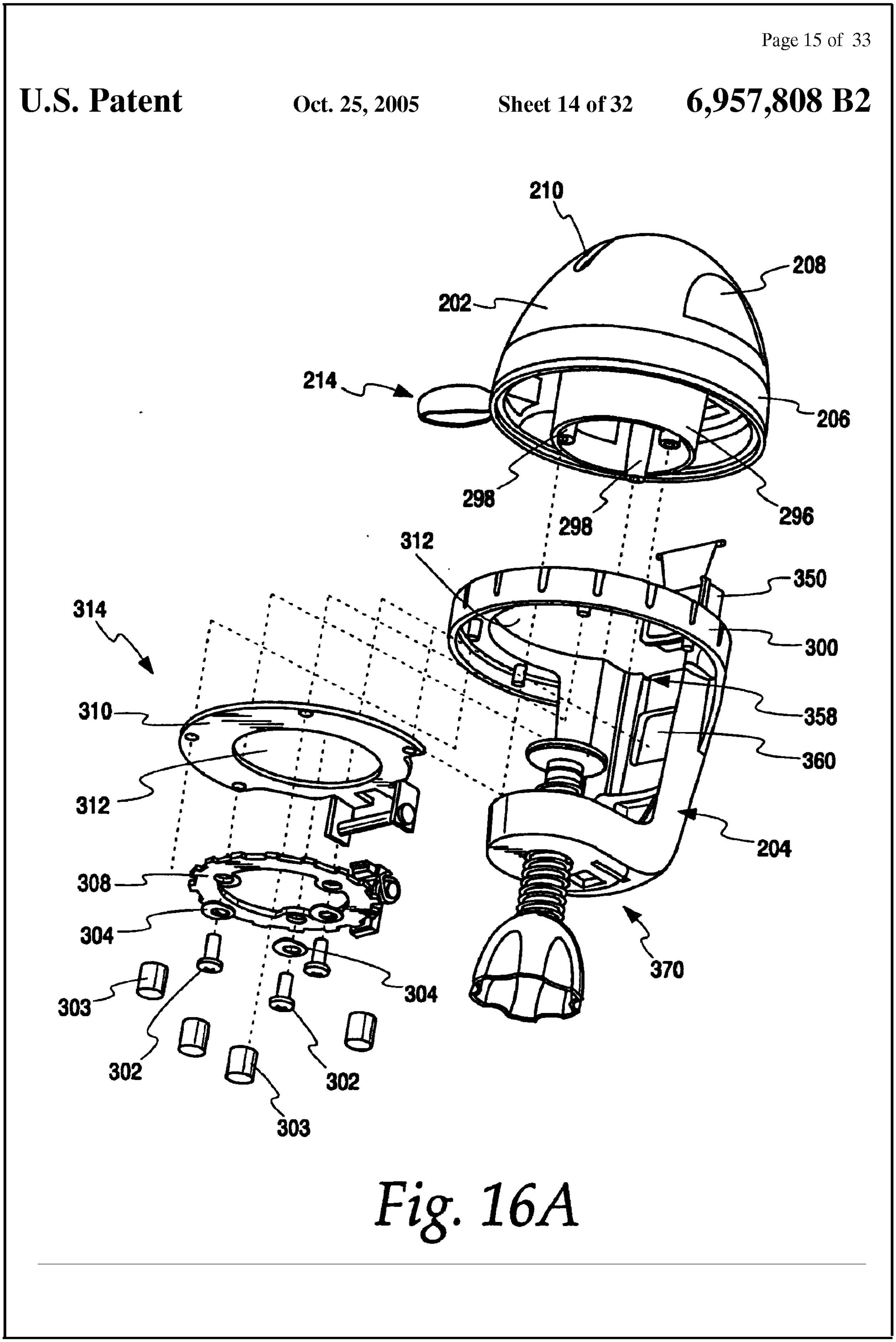
Figure 16B:
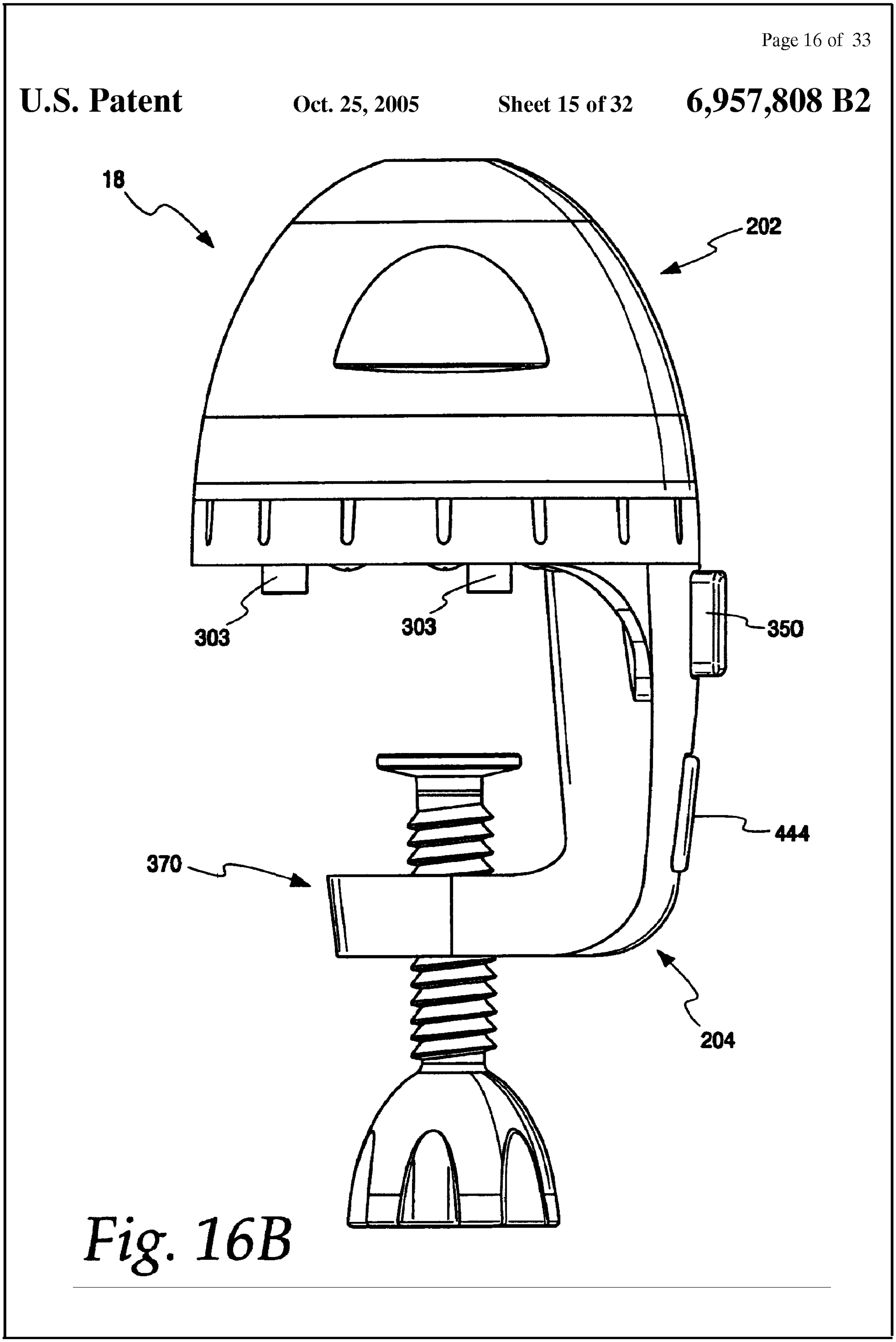
Figure 17:
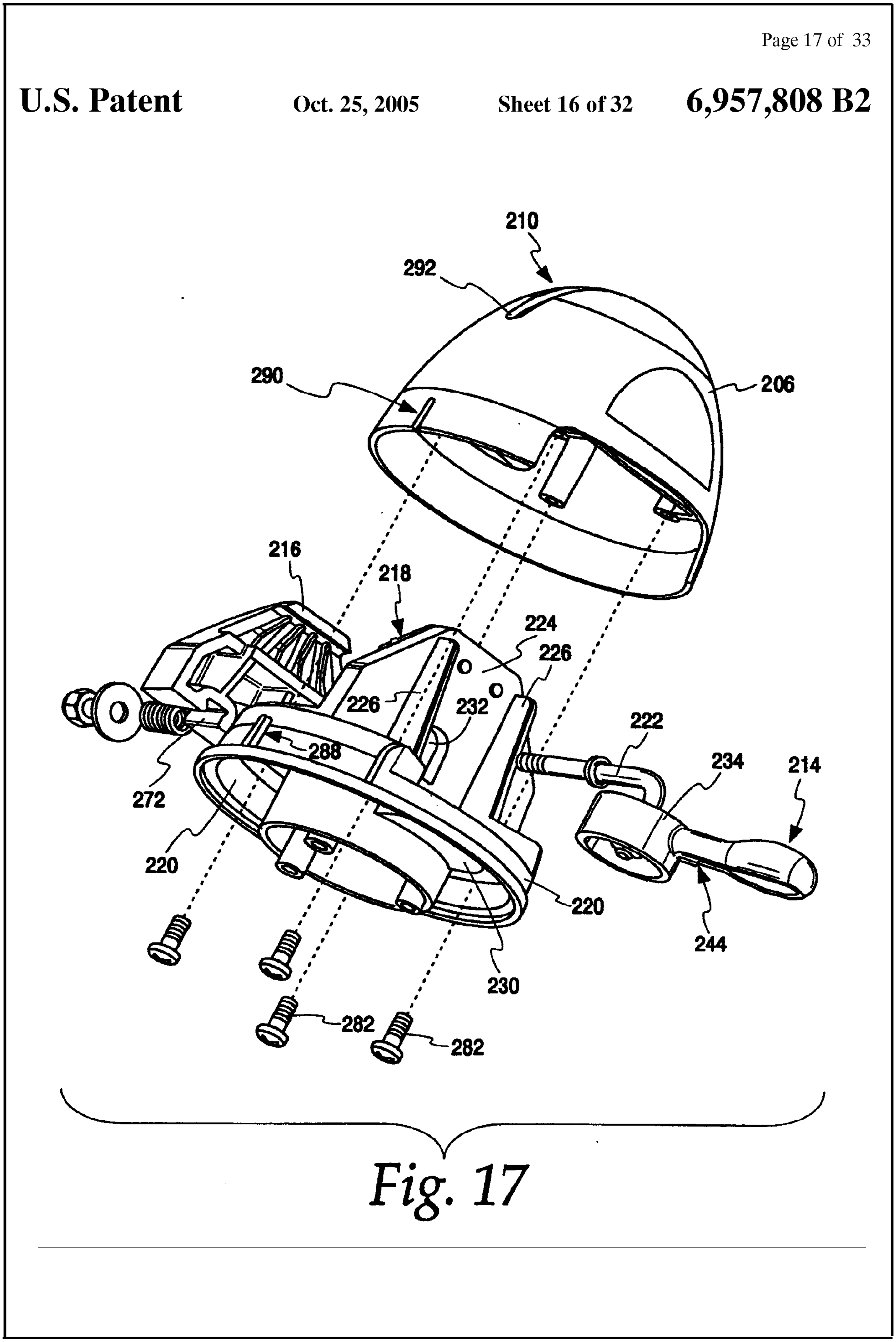
Figure 18A:
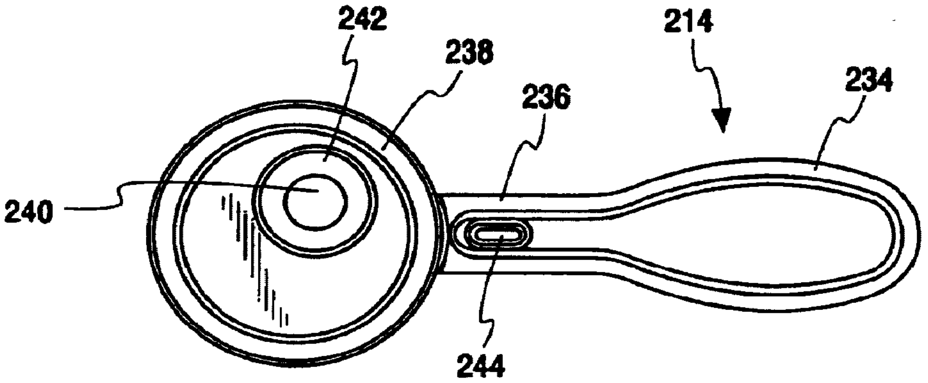
Figure 18B:
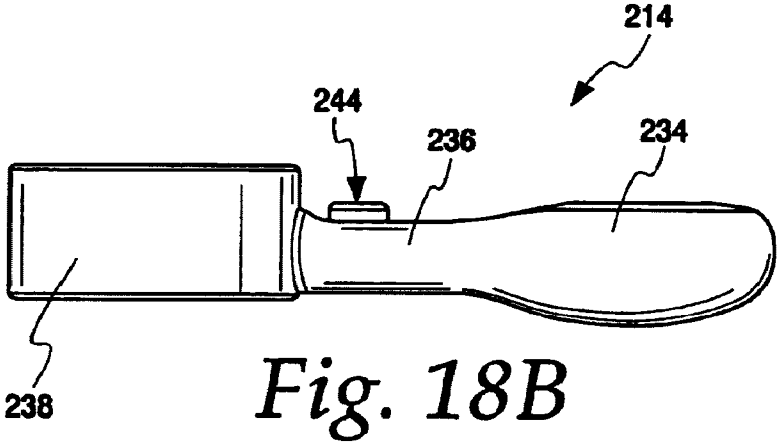
Figure 18C:
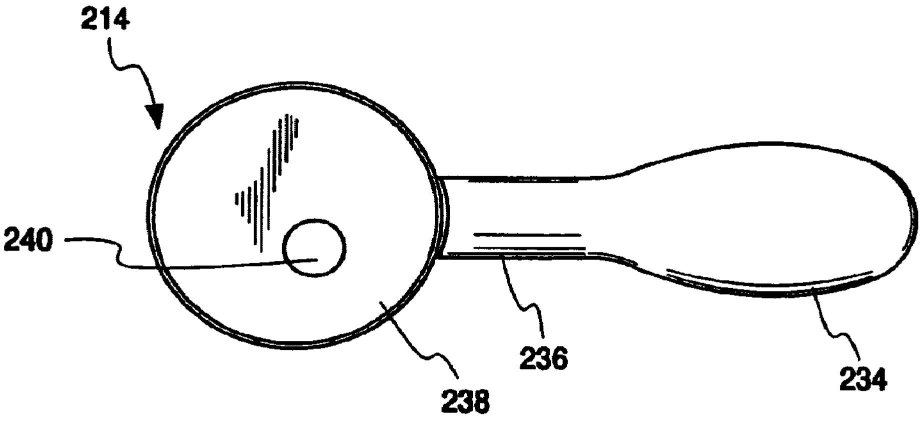
Figure 19A:
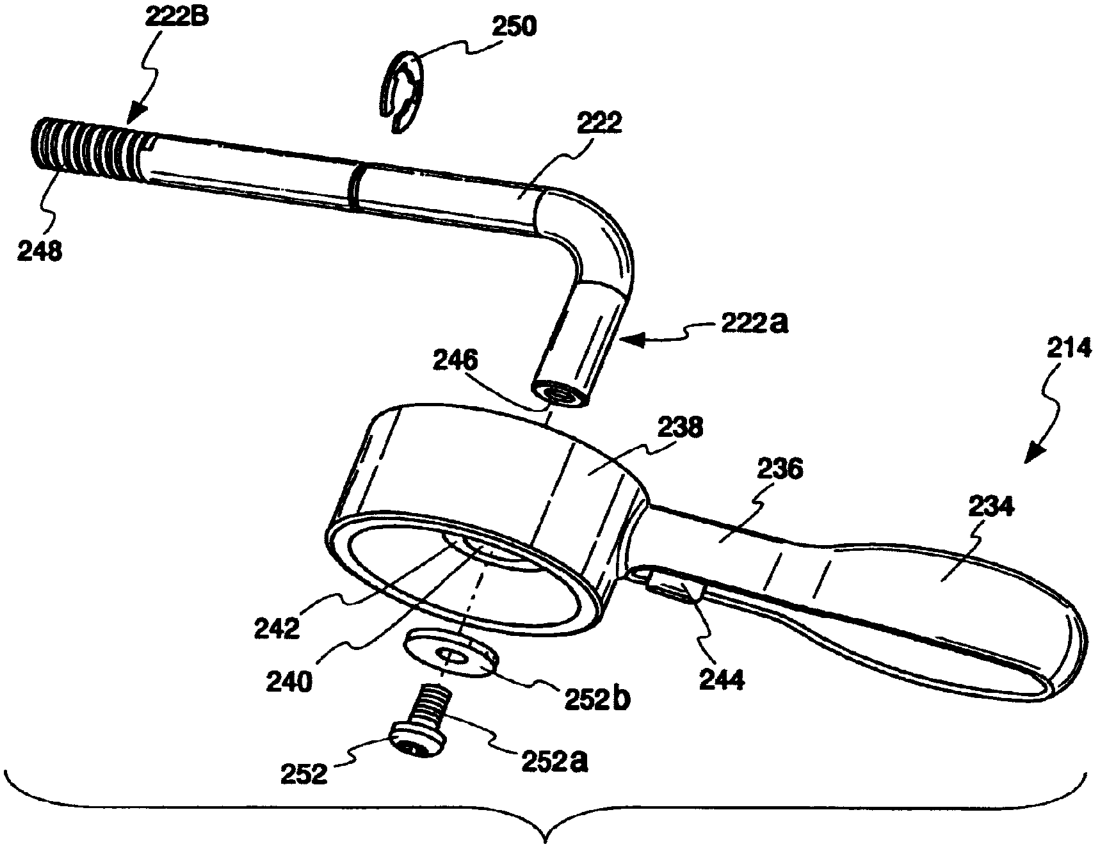
Figure 19B:
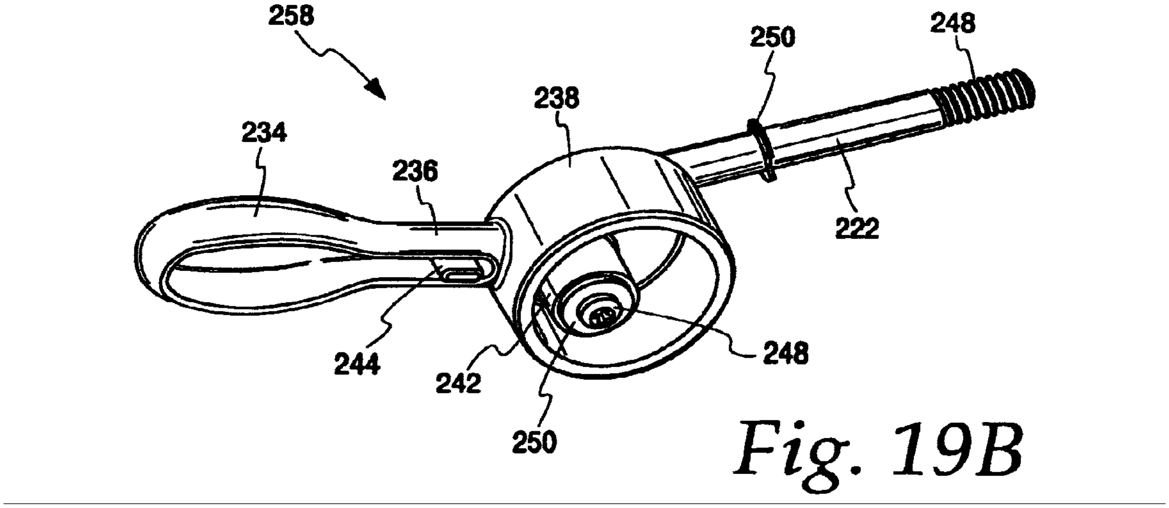
Figure 20A:
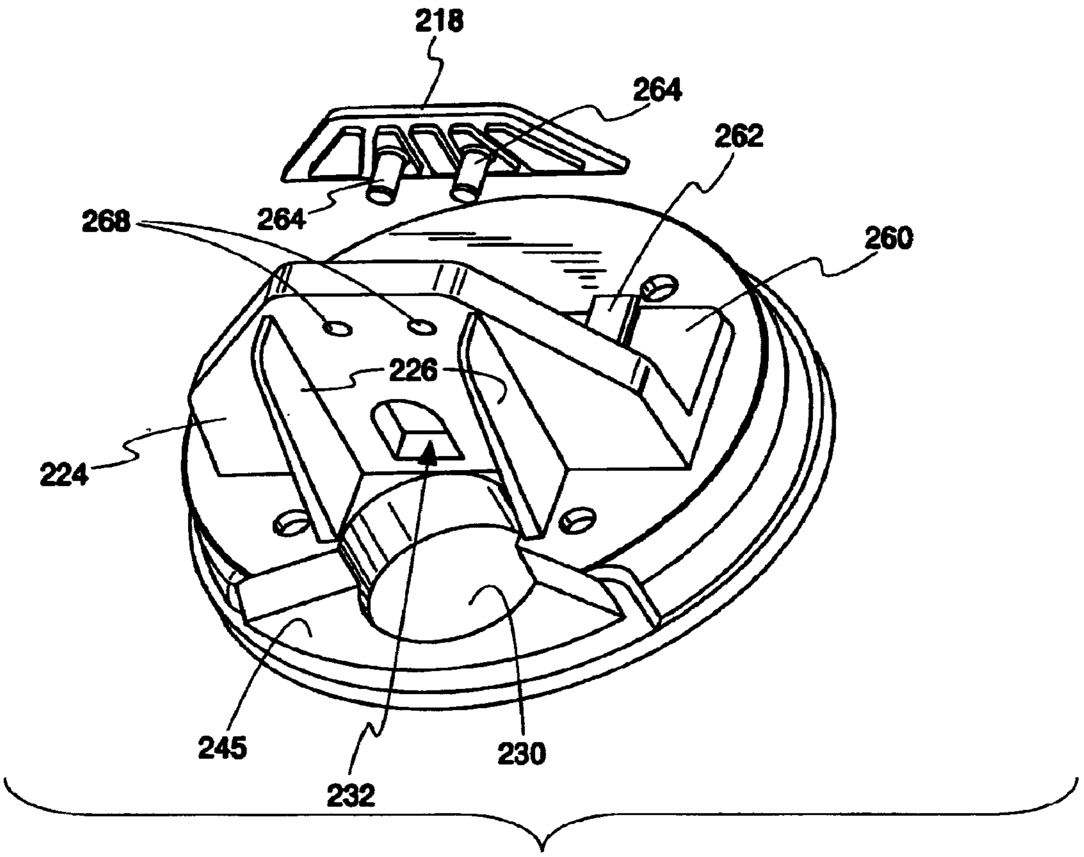
Figure 20B:
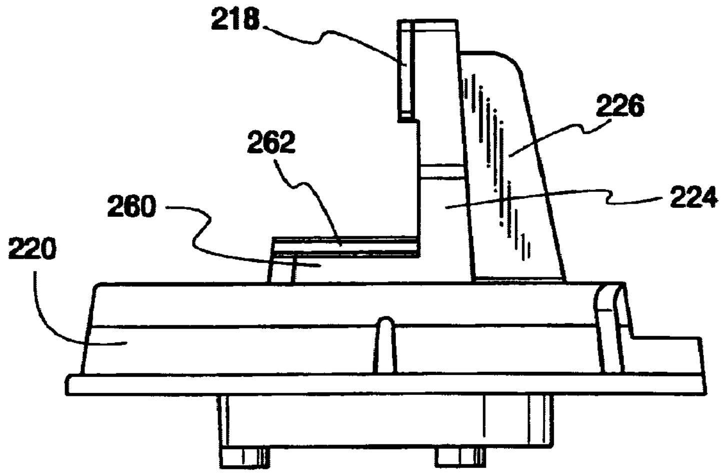
Figure 21A:
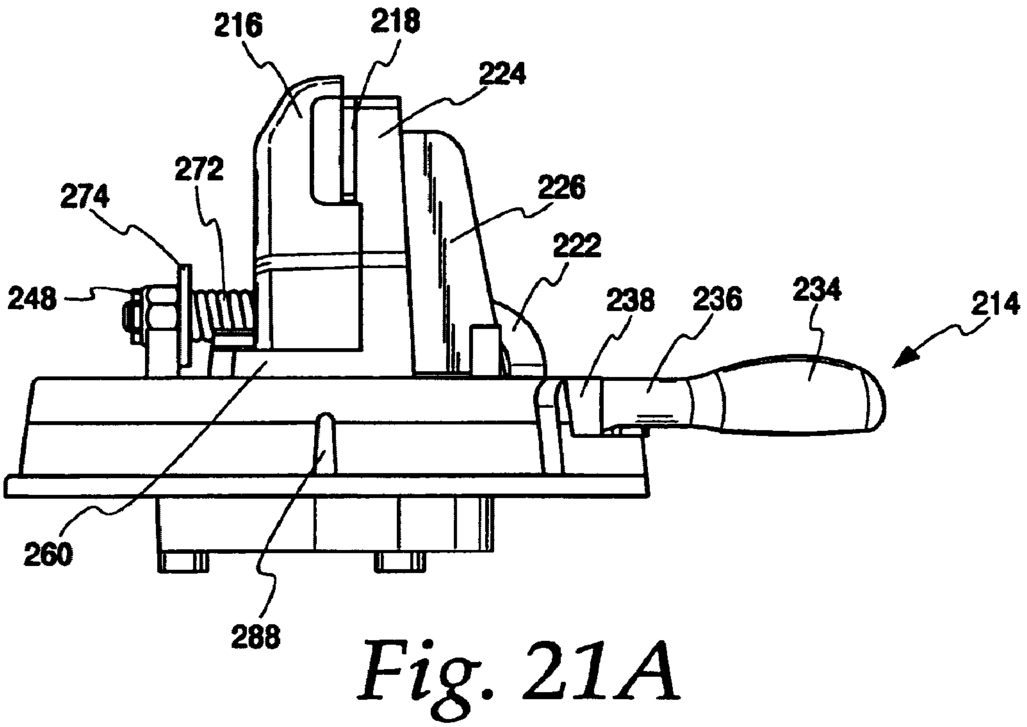
Figure 21B:
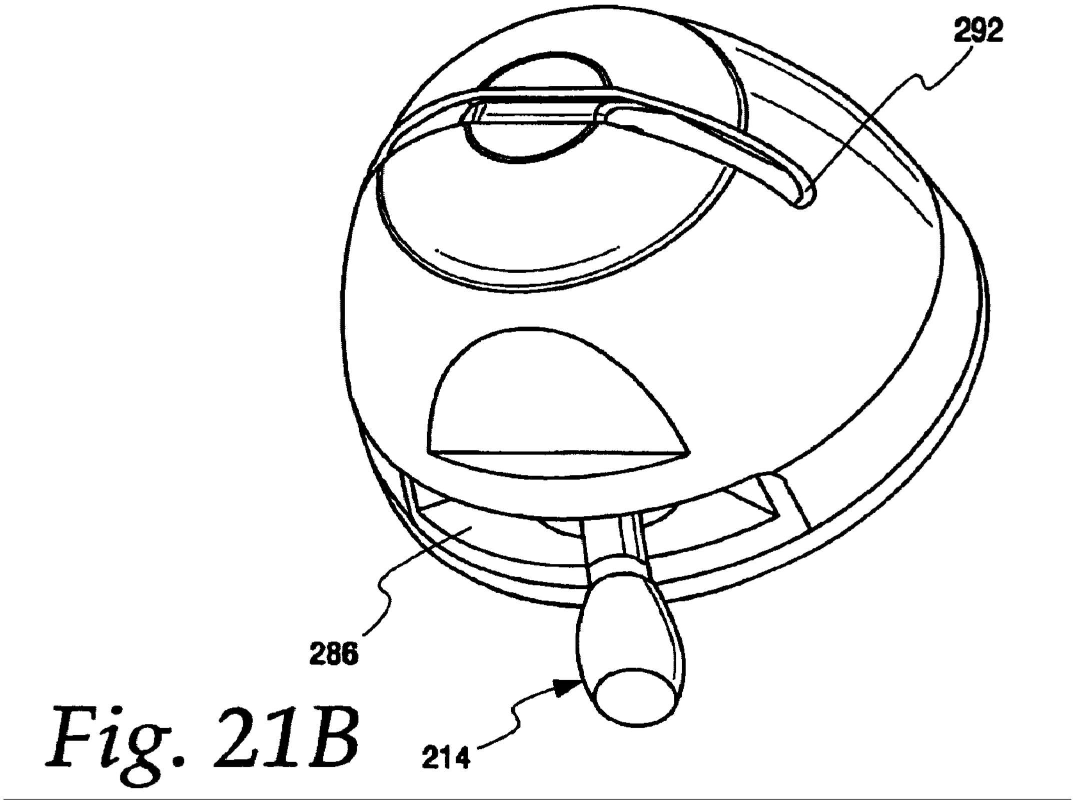
Figure 21C:
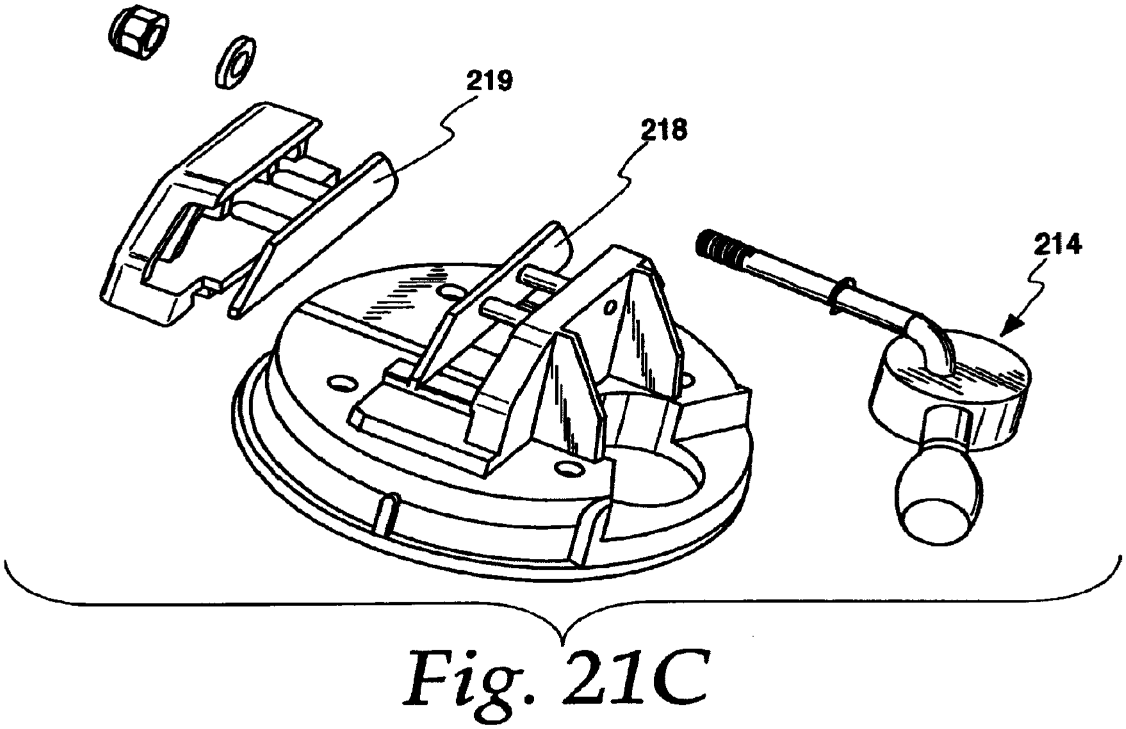
Figure 22C:
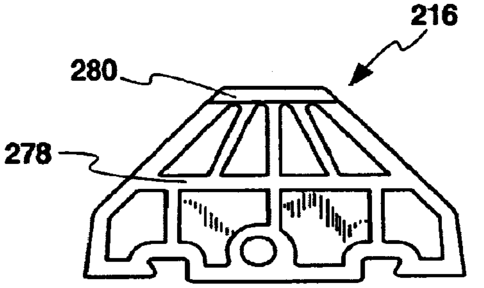
Figure 22A:
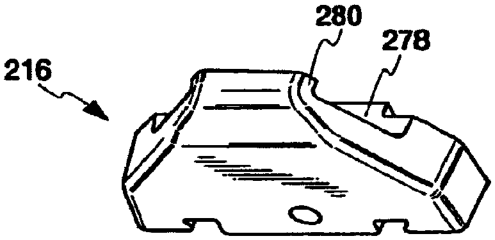
Figure 22D:
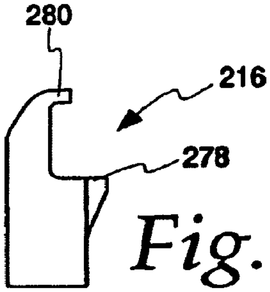
Figure 22B:
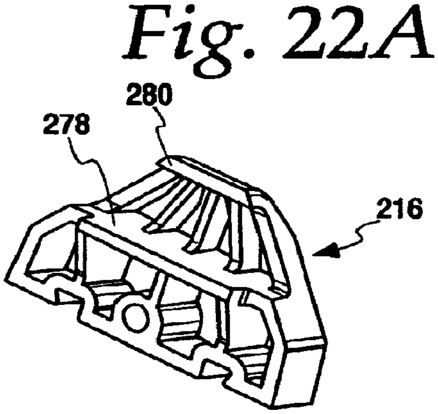
Figure 23B:
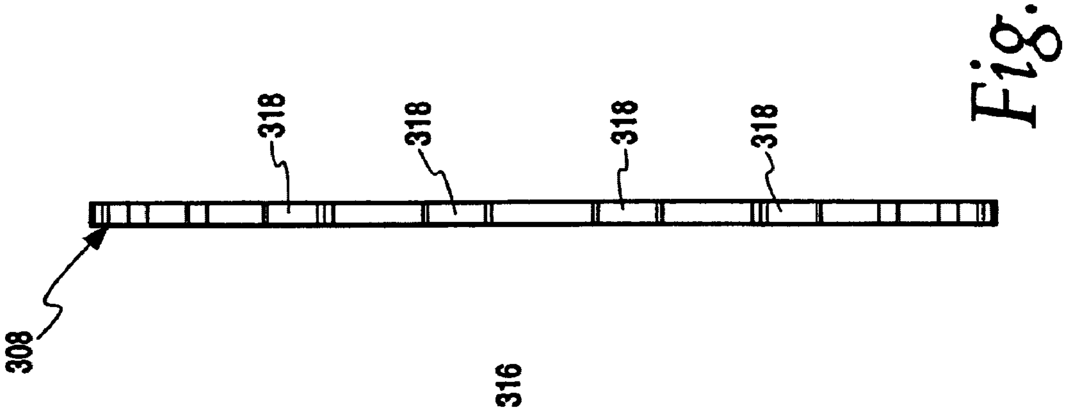
Figure 23A:
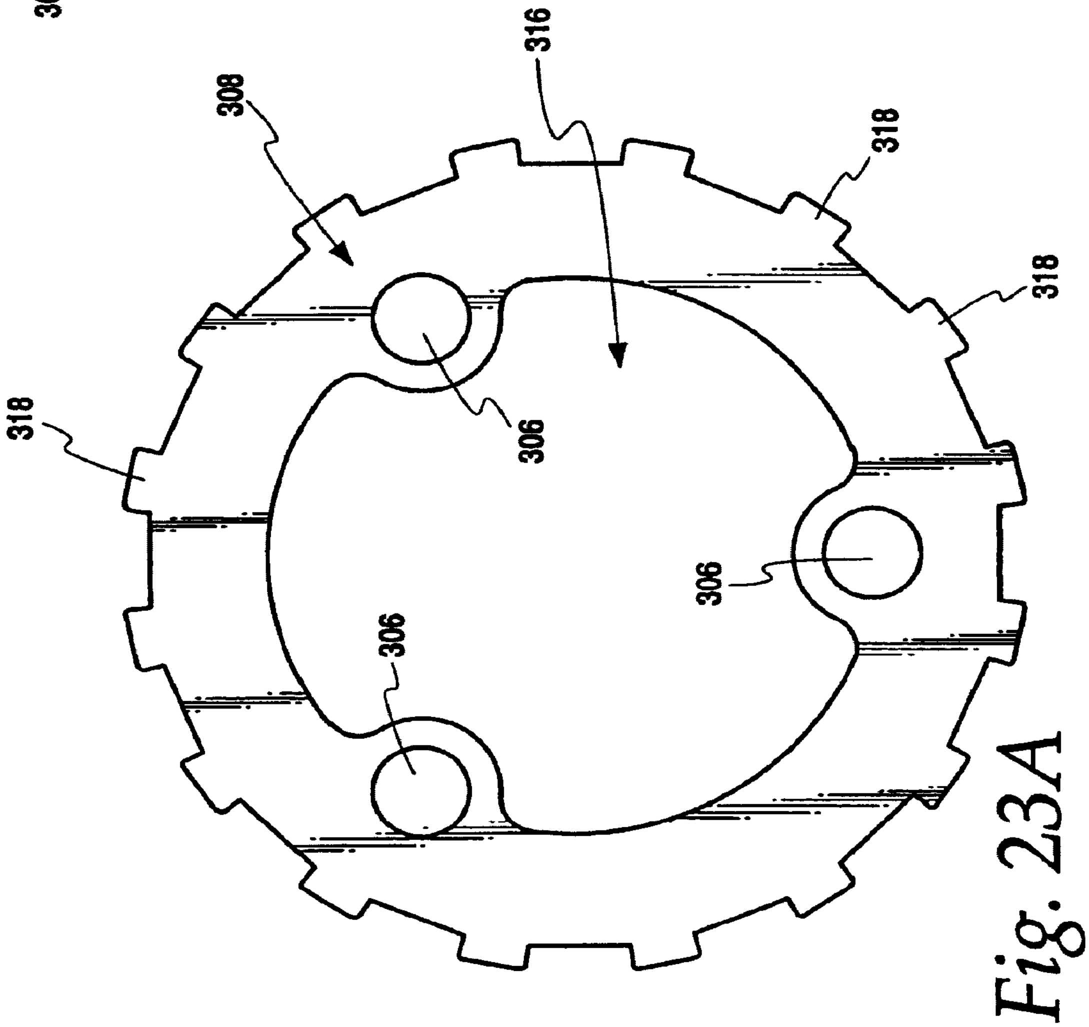
Figure 24A:
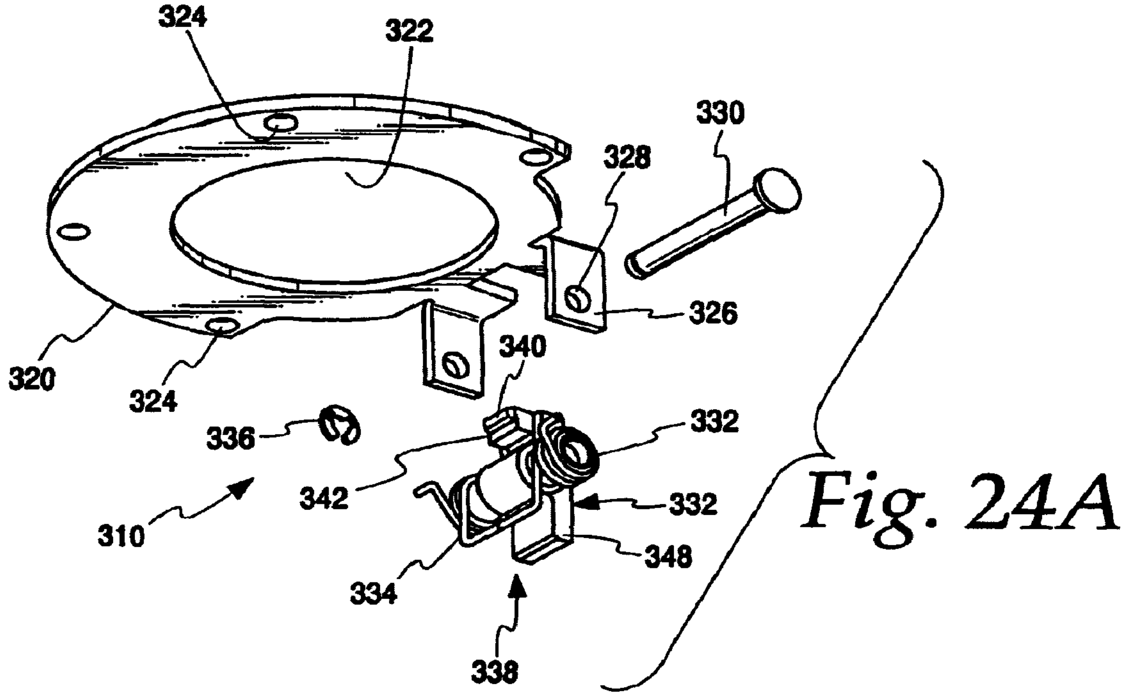
Figure 24B:
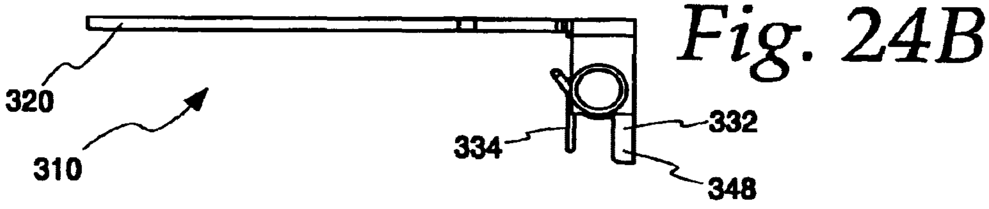
Figure 24C:
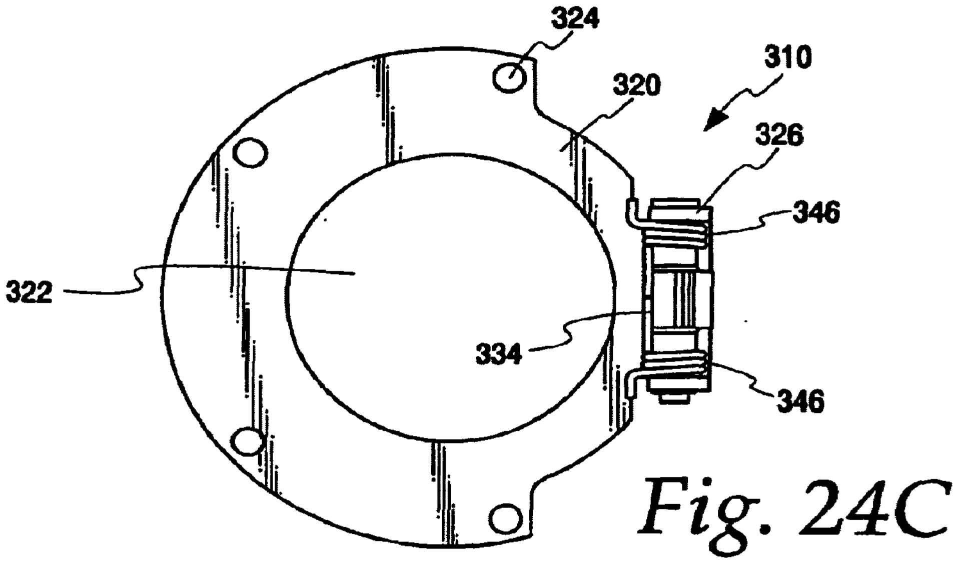
Figure 25A:
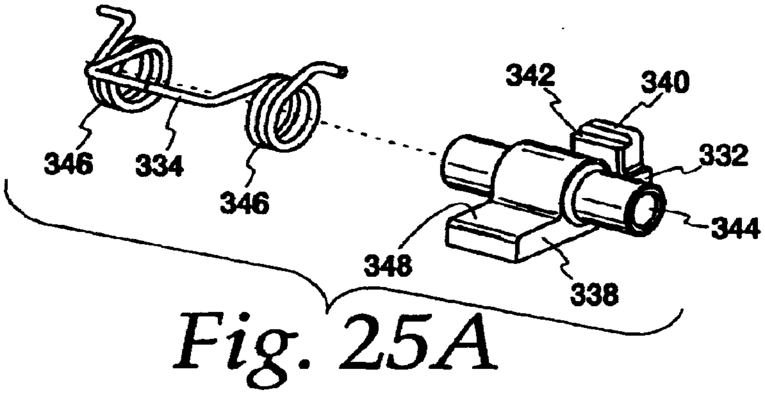
Figure 25B:
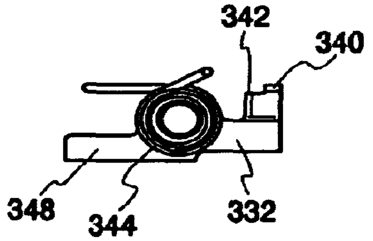
Figure 25C:
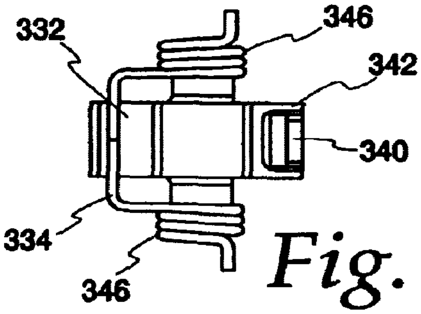
Figure 26A:
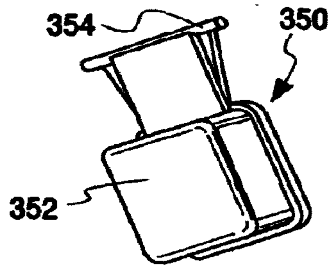
Figure 26C:
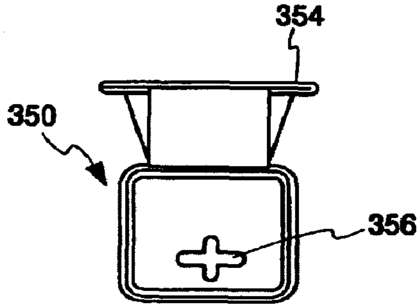
Figure 26B:
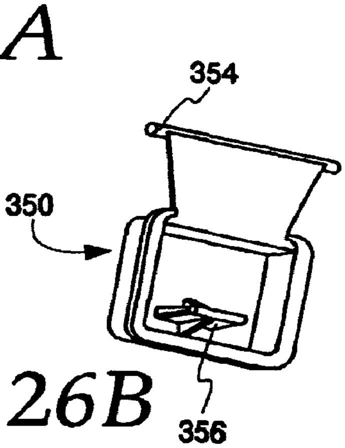
Figure 27:
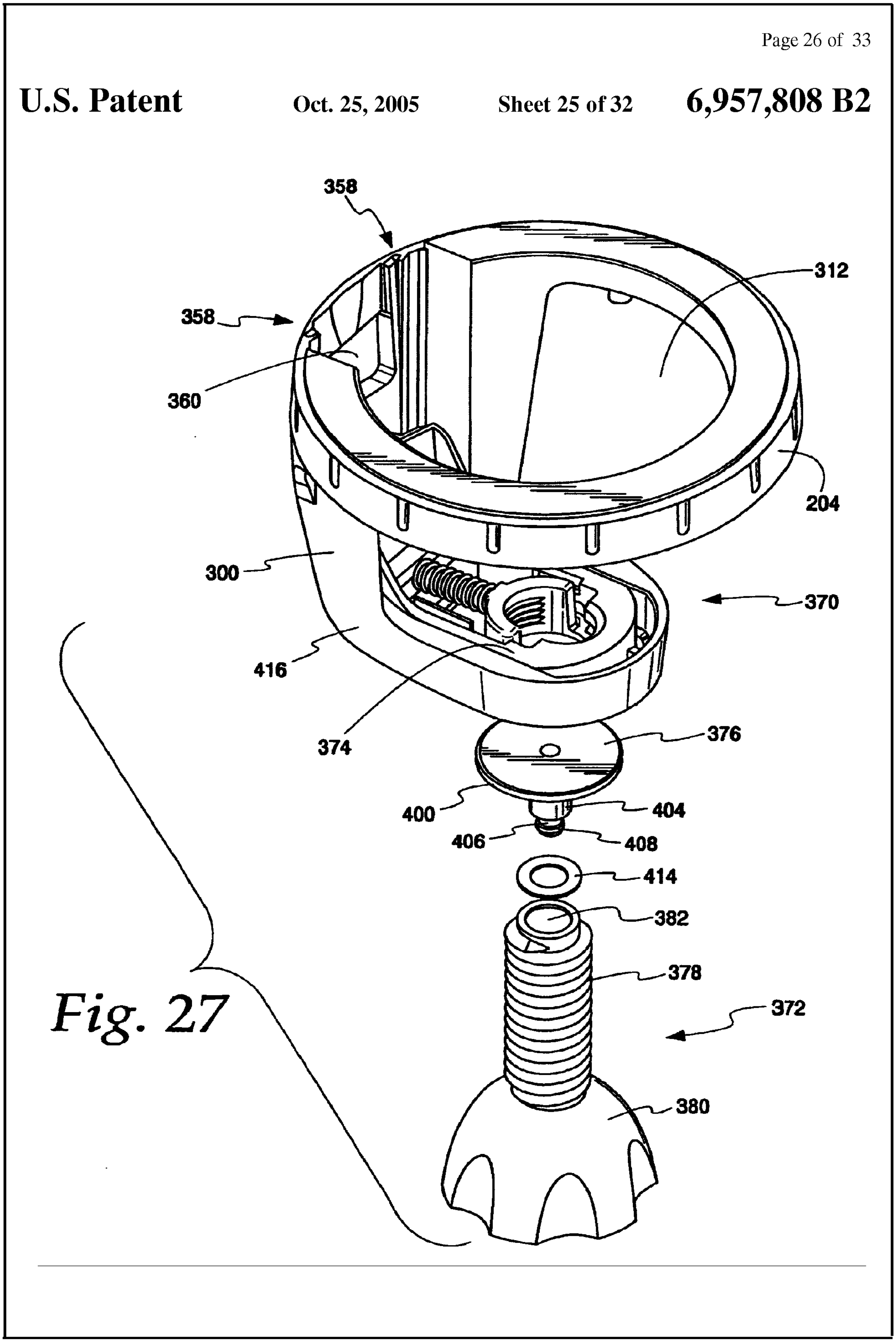
Figure 28B:
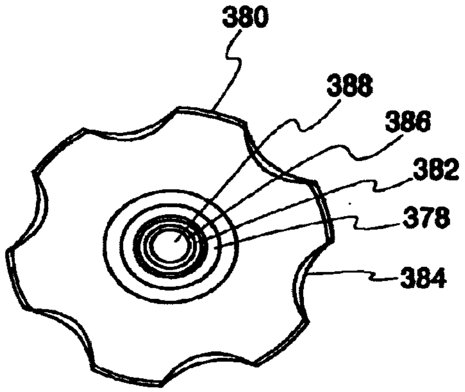
Figure 28A:
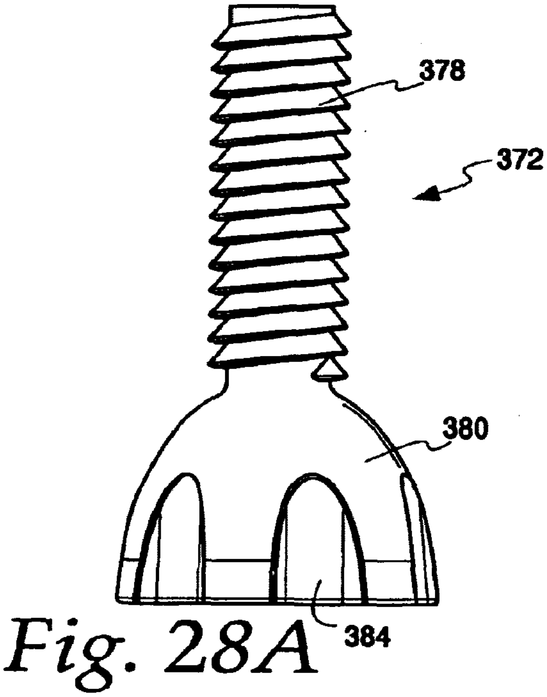
Figure 28D:
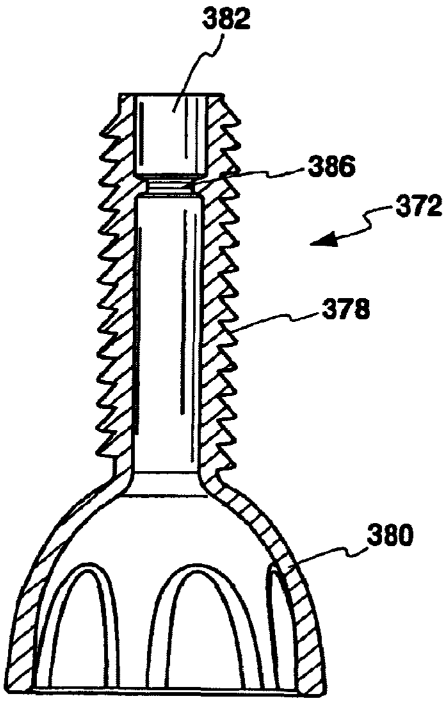
Figure 28C:
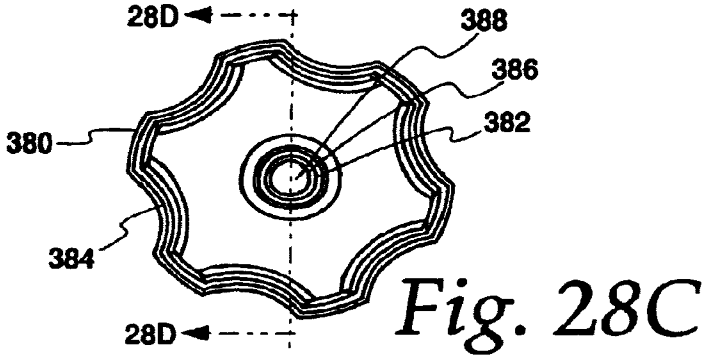
Figure 30A:
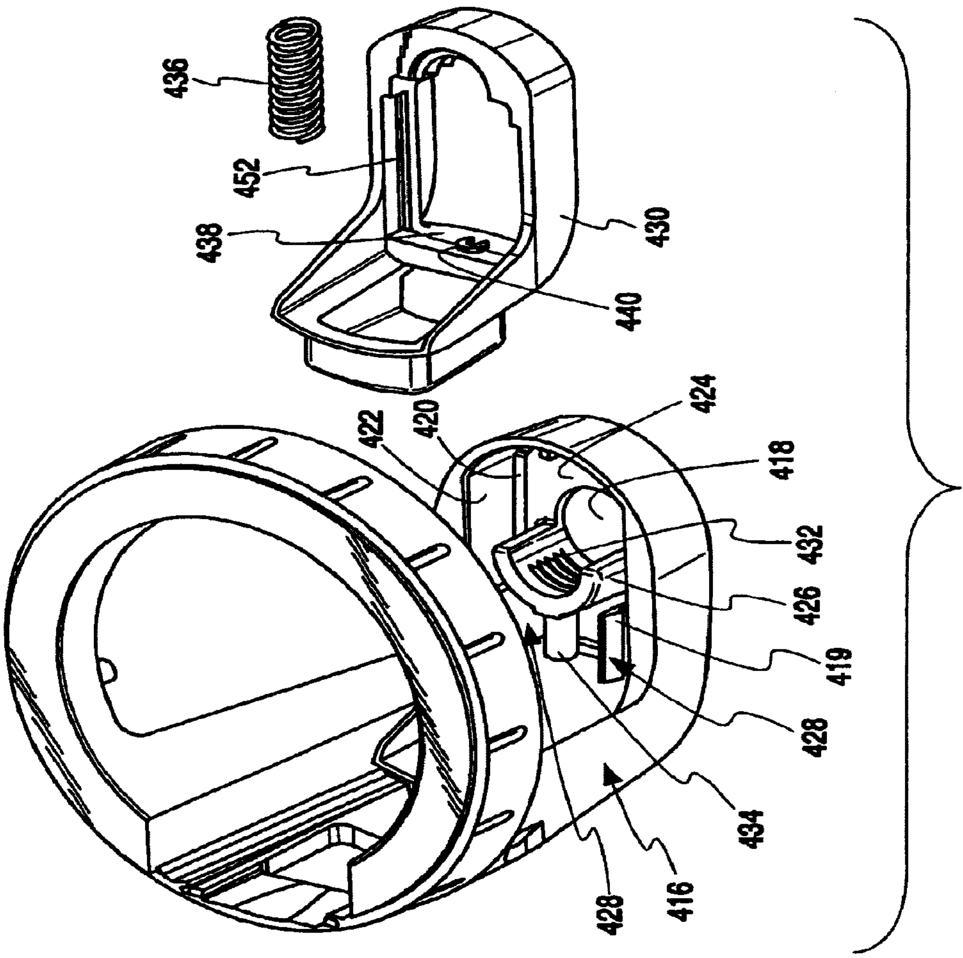
Figure 29B:
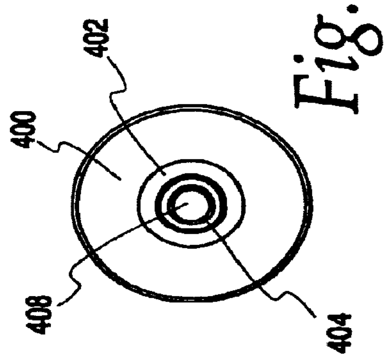
Figure 29A:
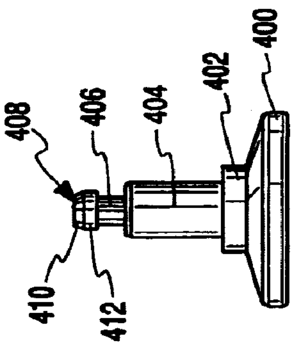
Figure 29C:
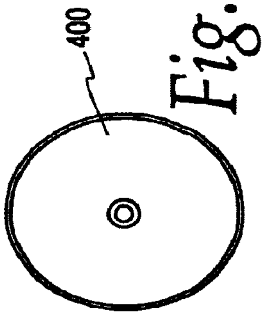
Figure 30B:
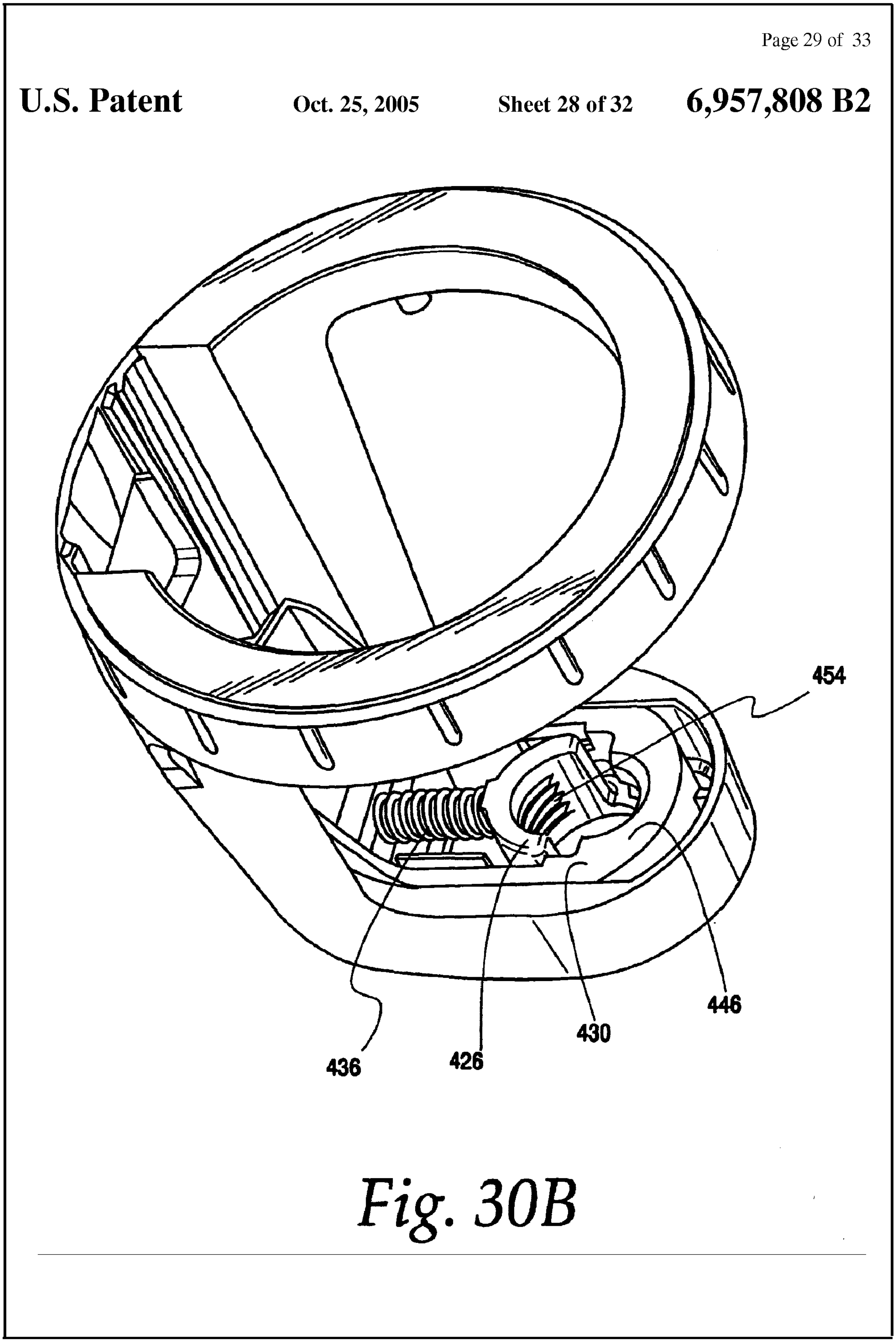
Figure 31B:
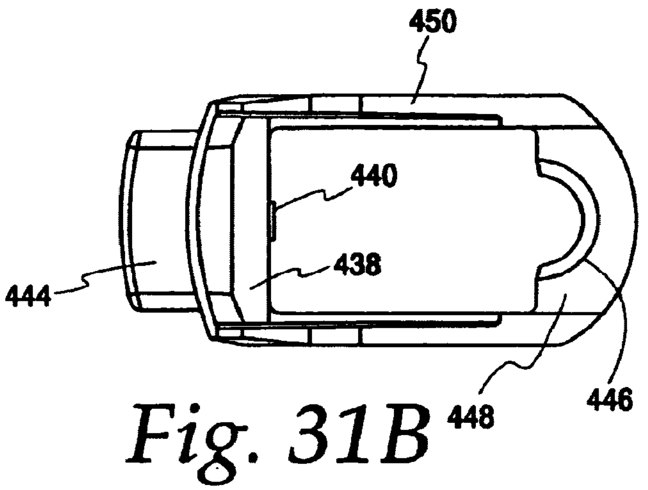
Figure 31A:
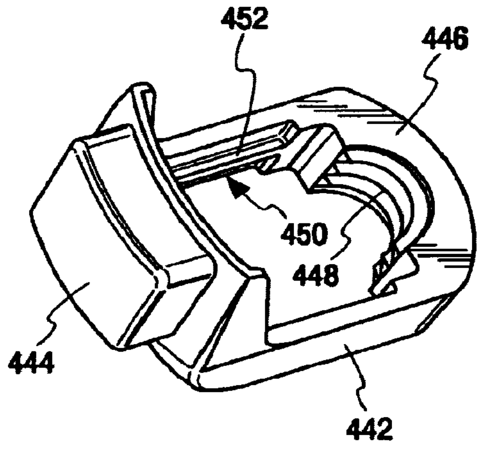
Figure 31C:
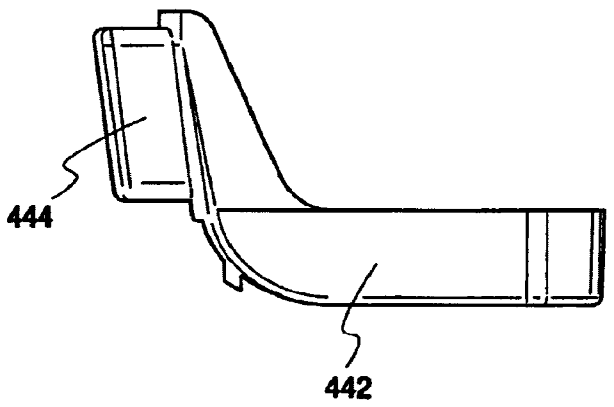
Figure 31D:
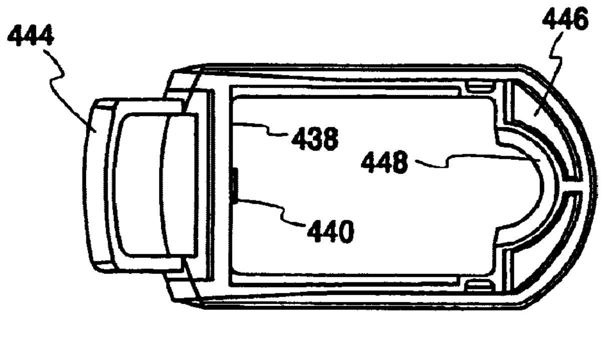
Figure 32:
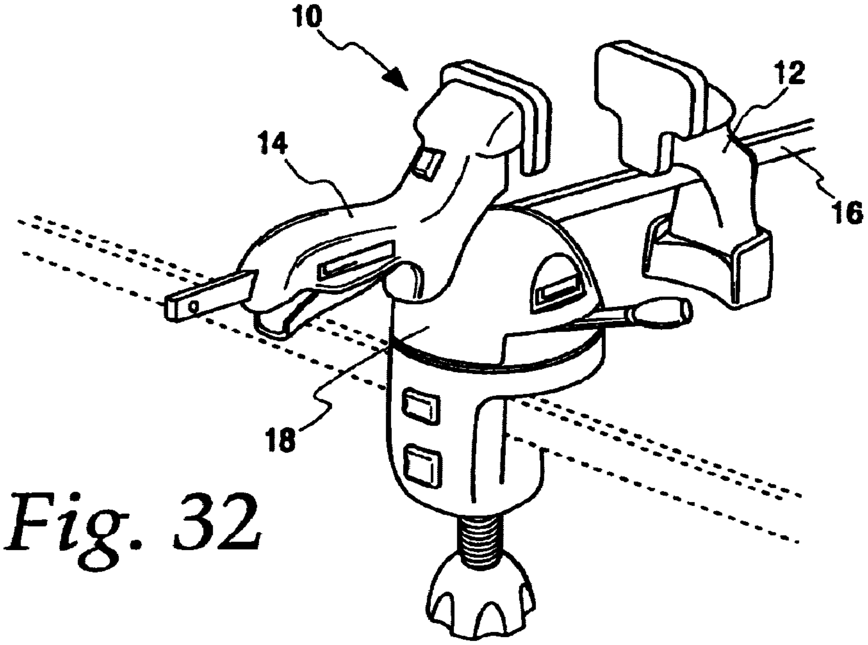
Figure 33:
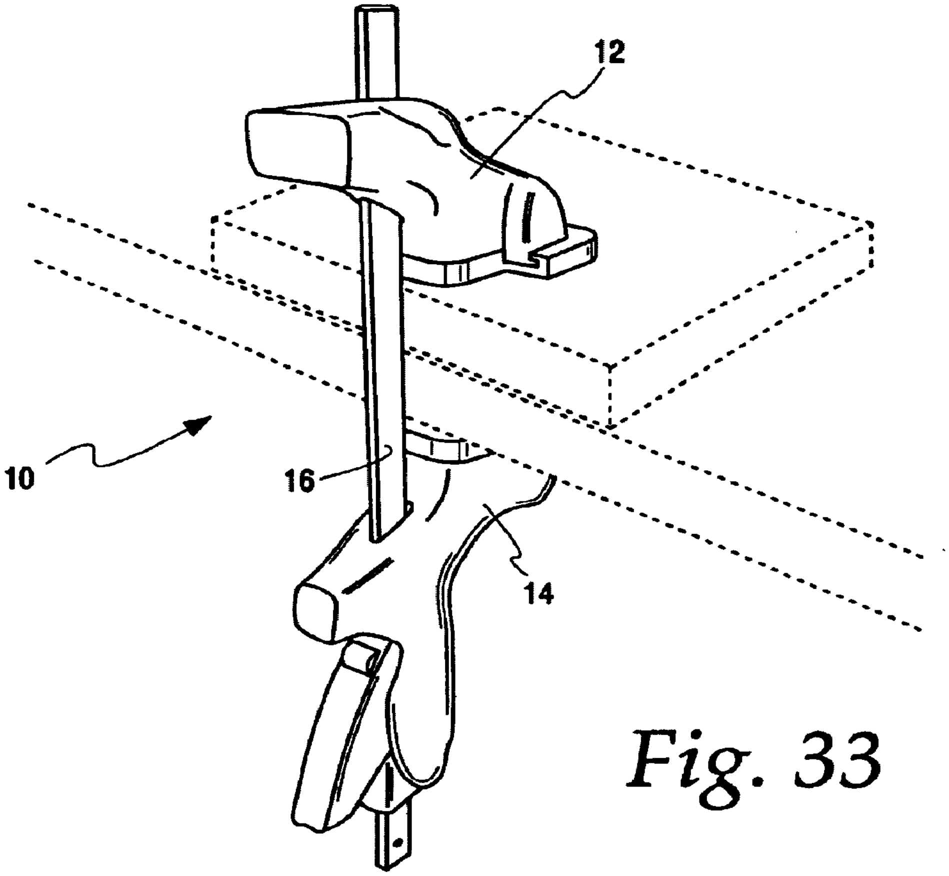
Figure 34:
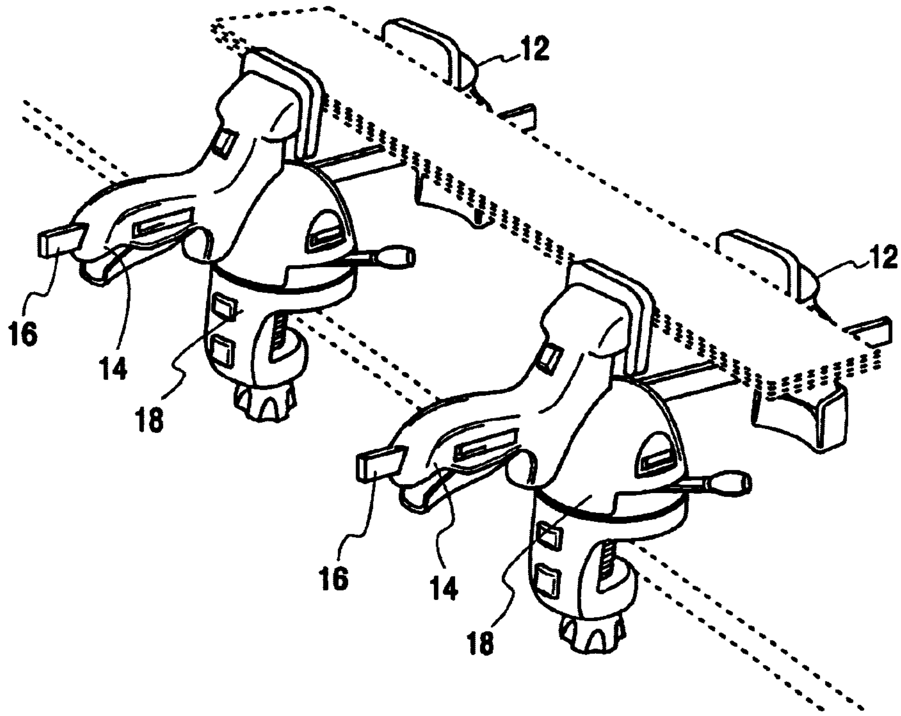
Figure 36:
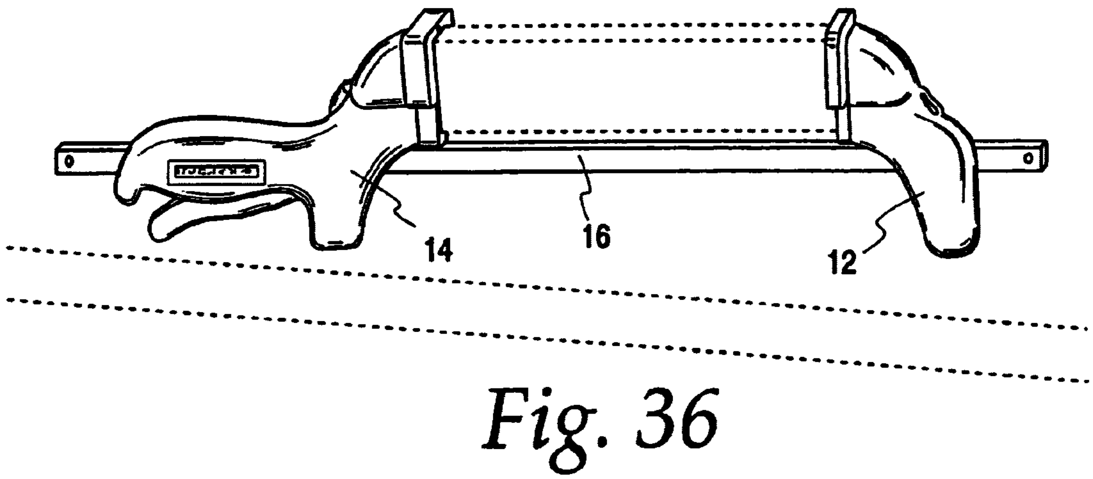
Figure 35A:
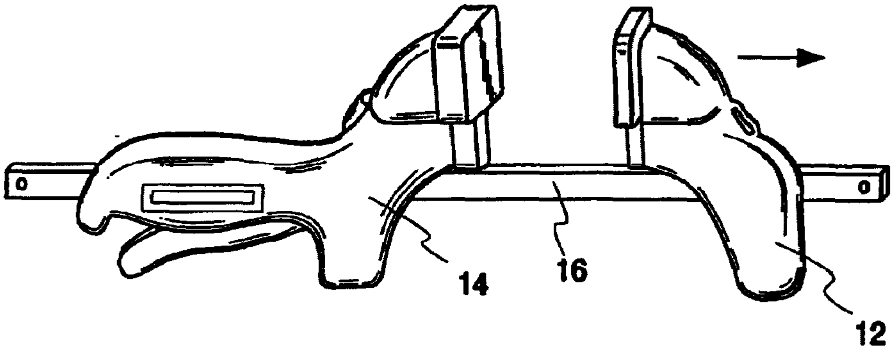
Figure 35B:
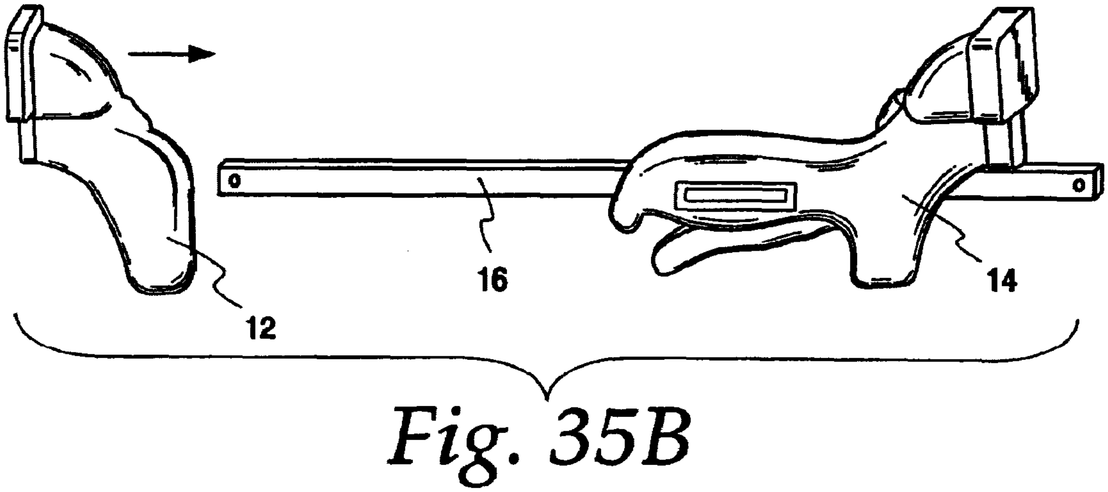
Figure 35C:
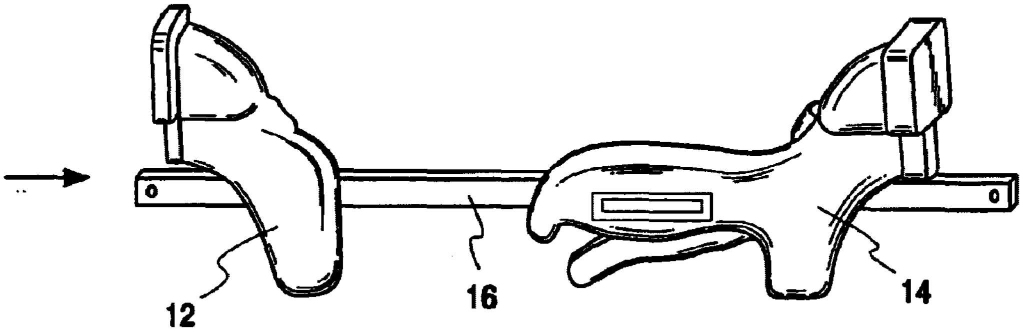

FIG. 36 shows a perspective view of the apparatus, wherein only the elongate member 16 and clamps 12 and 14 are used in a free standing bar clamp fashion. The clamps 12 and 14 are capable of being used in this free standing fashion due to the generally flat standing surfaces 102 and 194 located on the clamps 12 and 14, respectively.

Thus it is apparent that there has been provided, in accordance with the invention, an apparatus for securing a workpiece that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for securing a workpiece, the apparatus comprising:

a bar clamp having a first clamp member, a second clamp member, and a bar, wherein the clamp members are disposed about the bar and wherein the bar clamp can be configured to operate in at least one of a clamp mode and a spreader mode; and a base having a mating structure for mating with the bar of the bar clamp wherein one of the bar clamp and the base are removable from the other of said bar clamp and said base and wherein the bar clamp remains operable when removed from said base.

2. An apparatus according to claim 1, wherein the clamp members have generally flat standing surfaces which allow the bar clamp to be free standing and remain operable when removed from said base.

3. An apparatus according to claim 1, wherein at least one of the first clamp member, second clamp member, and base are contoured so as to rest generally flush against another of the first clamp member, second clamp member, and base in order to provide additional support for the apparatus.

4. An apparatus according to claim 1, wherein the first clamp member comprises a gripping portion located above the bar having a longitudinal axis generally parallel to the bar; and a trigger portion extending from the first clamp member below the bar and pivoting with respect to the first clamp member.

5. An apparatus according to claim 4, wherein the first clamp member further comprises a clamp jaw located above the bar for engaging a surface of a workpiece.

6. An apparatus according to claim 4, wherein the first clamp member comprises a brake that limits shifting of the first clamp member along the bar in at least one direction and a user operated actuator therefor located above the bar, proximate to the gripping portion, and operable to release the brake to allow the clamp to slide along the bar.

7. An apparatus according to claim 1, wherein at least a portion of the base comprises a generally flat support surface which allows the base to support at least a portion of a workpiece.

8. An apparatus for securing a workpiece, the apparatus comprising:

a bar clamp having a first clamp member, a second clamp member, and a bar, wherein the clamp members are disposed about the bar and wherein the bar clamp can be configured to operate in at least one of a clamp mode and a spreader mode;

a base having a mating structure for mating with the bar clamp wherein one of the bar clamp and the base are removable from the other of said bar clamp and said base and wherein the bar clamp remains operable when removed from said base; and a support structure for supporting at least one of the clamp members when the bar clamp is inserted on the base so that the supported clamp member can make contact with a work surface thereby offering additional support to the apparatus.

9. An apparatus according to claim 8, wherein the support structure is contoured so as to rest generally flush against at least one of the first clamp member, second clamp member, and base.

10. An apparatus for securing a workpiece, the apparatus comprising:

a bar clamp having a first clamp member, a second clamp member, and a bar, wherein the clamp members are disposed about the bar and wherein the bar clamp can be configured to operate in at least one of a clamp mode and a spreader mode;

a base having a mating structure for mating with the bar clamp wherein one of the bar clamp and the base are removable from the other of said bar clamp and said base and wherein the bar clamp remains operable when removed from said base; and wherein the second clamp member comprises a brake that limits shifting of the second clamp member along the bar in at least one direction and a user operated actuator therefor located above the bar proximate a gripping position and operable to release the brake to allow the clamp to slide along the bar.

11. An apparatus according to claim 10, wherein the gripping portion and the user operated actuator are configured so that the stationary clamp structure can be grasped and the user operator actuator can be simultaneously actuated so that the stationary clamp structure can be moved about the bar.

12. An apparatus for securing a workpiece, the apparatus comprising:

a bar clamp having a first clamp member, a second clamp member, and a bar, wherein the clamp members are disposed about the bar and wherein the bar clamp can be configured to operate in at least one of a clamp mode and a spreader mode;

a base having a mating structure for mating with the bar clamp wherein one of the bar clamp and the base are removable from the other of said bar clamp and said base and wherein the bar clamp remains operable when removed from said base, a lower base portion for mounting the base to a work surface, and an upper base portion for connecting the base and the bar clamp.

13. An apparatus according to claim 12, wherein the upper base portion is rotationally coupled to the lower base portion so that the upper base portion can rotate with respect to the lower base portion.

14. An apparatus according to claim 12, wherein the upper and lower base portions are rotationally coupled via an indexing mechanism capable of orienting the base in a plurality of different positions.

15. An apparatus according to claim 12, wherein the base comprises a rotation release mechanism for at least momentarily releasing the upper base portion from the lower base portion so the upper base portion is freely rotatable with respect to the lower base portion.

16. An apparatus according to claim 12, wherein the upper base portion comprises a bar securing mechanism which can be shifted from a bar securing position wherein the bar is secured to the base, to a bar releasing position wherein the bar is released from the base.

17. An apparatus according to claim 16, wherein the bar securing mechanism is shifted from one of the securing position and the releasing position to the other of said securing position and said releasing position by operating an actuating lever from a first position to a second position.

18. An apparatus according to claim 16, wherein the bar securing mechanism comprises a friction pad for frictionally engaging the bar when the actuating lever is in the second position; and a bar retention mechanism for retaining the bar and the base in engagement when the actuating lever is in the second position, wherein the friction pad and the retention mechanism assist one another in securing the bar to the base.

19. An apparatus according to claim 16, wherein the bar securing mechanism has a compensating mechanism which compensates for over travel of the bar securing mechanism.

20. An apparatus according to claim 19, wherein the compensating mechanism comprises one of a spring and resilient pad material which are capable of compensating for over travel of the bar securing mechanism.

21. An apparatus according to claim 12, wherein the lower base portion comprises a base securing mechanism for securing the base to a work surface so that the base is generally fixed thereto.

22. An apparatus according to claim 21, wherein the base securing mechanism comprises a threaded screw having a work surface engaging portion for contacting a lower surface of the work surface; and a nut which is at least partially threaded and through which the threaded screw passes and can be rotated to move the work surface engaging portion into and out of contact with the lower surface of the work surface.

23. An apparatus according to claim 22, wherein the lower base portion comprises a base securing release mechanism for releasing the threaded screw by disengaging the nut from the threaded screw.

24. An apparatus according to claim 22, wherein the base securing mechanism has a compensating mechanism which compensates for over rotation of the screw in order to prevent damage thereto.

25. An apparatus for securing a workpiece, the apparatus comprising:

first and second clamp members;

a transportable elongate member to which the clamp members are mounted for being shifted between clamped and unclamped positions to allow a clamped workpiece to be transported; and a base having a clamping portion for being clamped to a substantially stationary surface, and a connecting portion of the base which allows the transportable elongate member to be connected in a fixed position relative to the base to keep the clamped workpiece fixed relative to the stationary surface.

26. The apparatus of claim 25 wherein the connecting portion of the base includes a slot opening in which the elongate member is secured and a retaining member to fix the elongate member in the slot opening, and an actuator for shifting the retaining member to a release position to allow the elongate member to be removed from and inserted in the slot opening, and a retaining position in which the elongate member is captured in a fixed position with the slot.

27. The apparatus of claim 25 wherein the clamp members each include gripping portions having large, flat lower surfaces sized sufficiently large to allow the clamp members to be free-standing when disconnected from the base.

28. An apparatus for securing a bar to a base assembly comprising:

a first clamp member;

a second clamp member positioned opposite the first clamp member and movable with respect to the first clamp member from a bar engaging position wherein the clamp members engage and retain the bar, to a bar disengaging position wherein the clamp members disengage the bar;

an actuator connected to the second clamp member for moving the second clamp member from one of its bar engaging position and its bar disengaging position to the other of said bar disengaging position and bar engaging position; and a resilient member connected to the actuator which compensates for over travel of the second clamp member with respect to one of the bar and the first clamp member.

29. An apparatus according to claim 28, wherein the resilient member comprises a spring connected to an end of the actuator and the second clamp member, wherein over travel of the second clamp member is compensated for by compressing the spring between the end of the actuator and the second clamp member thereby allowing the actuator to travel to its bar engaging position.

30. An apparatus according to claim 28 wherein the resilient member comprises at least one resilient pad connected to the actuator via at least one of the first and second bar clamps thereby allowing the actuator to travel to its bar engaging position.

31. An apparatus for securing a base assembly to a work surface comprising:

a first clamp member;

a second clamp member positioned opposite the first clamp member and movable with respect to the first clamp member from a work surface engaging position wherein clamp members engage the work surface to which the apparatus is mounted, to a work surface releasing position wherein the work surface is released from the clamps;

an actuator connected to the second clamp member for moving the second clamp member from one of the work surface engaging position and the work surface releasing position to the other of said work surface releasing position and work surface engaging position; and a quick release mechanism connected to the actuator for disengaging the actuator and rapidly shifting the actuator to the work surface releasing position.

32. An apparatus according to claim 31 wherein the actuator comprises a threaded bolt which can be rotated in a first direction to move the second clamp member to one of the work surface engaging position and the work surface releasing position, and rotated in a second direction to move the second clamp to the other of said work surface releasing position and work surface engaging position.

33. An apparatus according to claim 32 wherein the quick release mechanism comprises a switch coupled to at least a portion of a nut through which the threaded bolt is disposed, wherein the switch moves at least a portion of the nut from a bolt engaging position wherein the bolt is capable of being thread through the nut, to a bolt disengaging position wherein the bolt is prevented from being thread through the nut and the actuator is rapidly shifted to its work surface releasing position.

* * * * *

UNITED STATES PATENT AND TRADEMARK OFFICE

CERTIFICATE OF CORRECTION

PATENT NO. : 6,957,808 B2
DATED : October 25, 2005
INVENTOR(S) : Robert E. Varzino et al.

It is certified that error appears in the above-identified patent and that said Letters Patent is hereby corrected as shown below:

Drawing sheets 1-33, including informal drawing Figures 34 and 36 on sheets 31 and 33, respectively, should be replaced with the attached formal drawing sheets 1-32 including formal drawing Figures 1-36.

Signed and Sealed this

Fourteenth Day of March, 2006

JON W. DUDAS
*Director of the United States Patent and Trademark Office*